(12) United States Patent
Soave

(10) Patent No.: US 11,906,044 B2
(45) Date of Patent: *Feb. 20, 2024

(54) GEAR SEEKING POLYSTABLE SHIFTER

(71) Applicant: Kuster North America, Inc., Troy, MI (US)

(72) Inventor: Christopher Soave, Oxford, MI (US)

(73) Assignee: Kuster North America, Inc., Troy, MI (US)

( * ) Notice: Subject to any disclaimer, the term of this patent is extended or adjusted under 35 U.S.C. 154(b) by 120 days.

This patent is subject to a terminal disclaimer.

(21) Appl. No.: 17/713,567

(22) Filed: Apr. 5, 2022

(65) Prior Publication Data
US 2022/0325791 A1 Oct. 13, 2022

Related U.S. Application Data

(60) Provisional application No. 63/208,721, filed on Jun. 9, 2021, provisional application No. 63/172,384, filed on Apr. 8, 2021.

(51) Int. Cl.
*F16H 61/32* (2006.01)
*F16H 61/24* (2006.01)
(Continued)

(52) U.S. Cl.
CPC ........... *F16H 61/32* (2013.01); *F16H 59/105* (2013.01); *F16H 61/24* (2013.01);
(Continued)

(58) Field of Classification Search
CPC ........ F16H 61/32; F16H 59/105; F16H 61/24; F16H 2061/241; F16H 2061/247;
(Continued)

(56) References Cited

U.S. PATENT DOCUMENTS 7,610,137 B2 10/2009 Kwon
8,000,865 B2 8/2011 Conlon et al.
(Continued)

FOREIGN PATENT DOCUMENTS

CN 108730499 A 11/2018
KR 10-2011-0006923 A 1/2011
(Continued)

OTHER PUBLICATIONS

International Search Report and Written Opinion for PCT Application No. PCT/US2022/020678 dated Jun. 30, 2022, 10 pages.

(Continued)

*Primary Examiner* — Victor L MacArthur
(74) *Attorney, Agent, or Firm* — Dinsmore & Shohl LLP

(57) ABSTRACT

A gear seeking shifter including a housing containing a shift lever with a rotatable base and outer tube supporting a depressible inner push rod. A CAM shaft component is driven by a gear seeking motor. An upwardly biased gate pawl located in the inner push rod contacts with any of PRND shifter position gates configured along an opposing underside of the housing. At least one detent cartridge contains a pawl supported within the rotatable base of the shift lever in biasing contact with a detent plate profile configured upon an opposing inside surface of the housing. The CAM shaft component, upon being rotated by the motor, includes each of a first profile for retracting the gate pawl and a second profile for inwardly displacing the detent pawl away from the detent plate profile to permit the CAM component to rotate the shift lever to a desired gear position.

22 Claims, 59 Drawing Sheets

(51) Int. Cl.
  *F16H 59/10* (2006.01)
  *F16H 61/28* (2006.01)
(52) U.S. Cl.
  CPC .. *F16H 2061/241* (2013.01); *F16H 2061/247* (2013.01); *F16H 2061/2869* (2013.01); *F16H 2061/2892* (2013.01); *F16H 2061/326* (2013.01)
(58) Field of Classification Search
  CPC ..... F16H 2061/2869; F16H 2061/2892; F16H 2061/326; F16H 61/22; F16H 2059/026; F16H 2059/0282; F16H 2061/223; F16H 59/10
  See application file for complete search history.

(56) References Cited

U.S. PATENT DOCUMENTS

| | | | |
|---|---|---|---|
| 9,334,949 | B2 | 5/2016 | Fett et al. |
| 10,030,763 | B2 | 7/2018 | Sawada et al. |
| 10,088,040 | B2 | 10/2018 | Mitteer et al. |
| 10,677,344 | B2 | 6/2020 | Wang et al. |
| 10,927,946 | B2 | 2/2021 | Heo et al. |
| 11,603,926 | B2 * | 3/2023 | Soave ............... F16H 59/10 |
| 2004/0226801 | A1 | 11/2004 | De Jonge et al. |
| 2006/0016287 | A1 | 1/2006 | Grossman et al. |
| 2009/0217782 | A1 | 9/2009 | Wang |
| 2014/0155221 | A1 | 6/2014 | Conlon et al. |
| 2017/0114892 | A1 | 4/2017 | Abe |
| 2017/0219095 | A1 | 8/2017 | Beattie et al. |
| 2018/0320780 | A1 | 11/2018 | Heo et al. |
| 2019/0219166 | A1 | 7/2019 | Krishnam E.N.V et al. |
| 2020/0003300 | A1 | 1/2020 | Yang |
| 2020/0096100 | A1 | 3/2020 | Cha |
| 2020/0149626 | A1 | 5/2020 | Nakagawa |

FOREIGN PATENT DOCUMENTS

| | | | |
|---|---|---|---|
| WO | 2008006021 A2 | 1/2008 | |
| WO | WO-2018047701 A1 * | 3/2018 | ............. B60K 20/02 |

OTHER PUBLICATIONS

International Search Report and Written Opinion for PCT Application No. PCT/US2022/023576 dated Jul. 27, 2022, 9 pages.

* cited by examiner

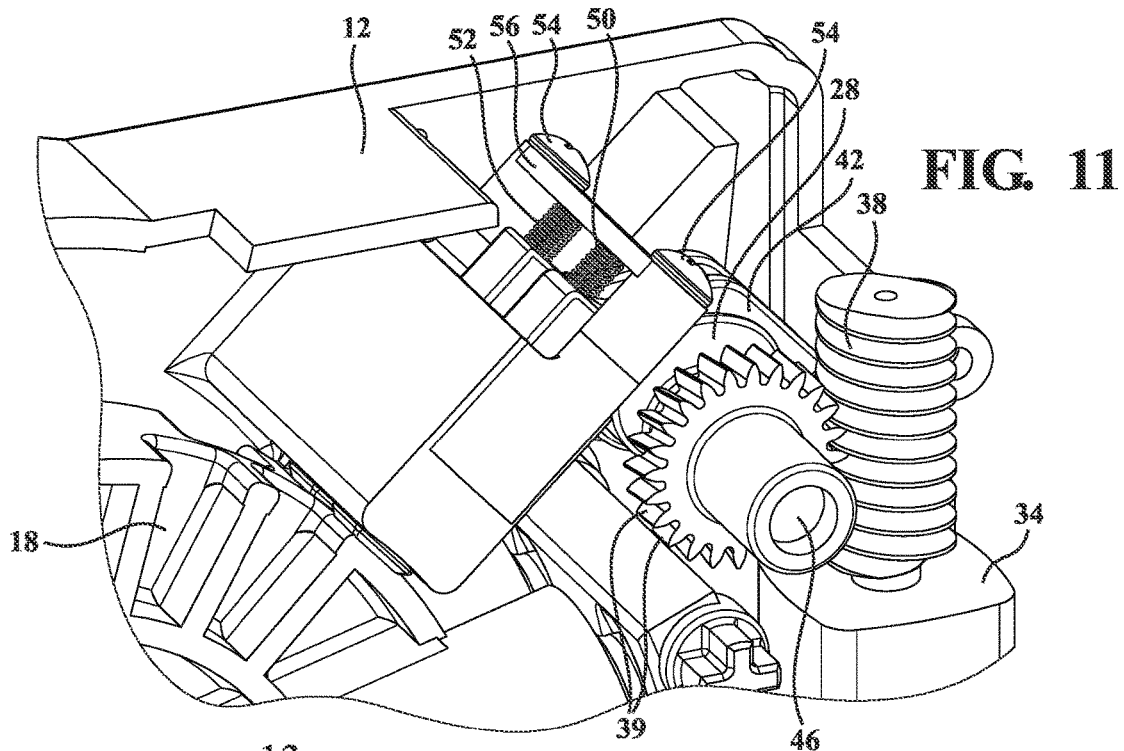
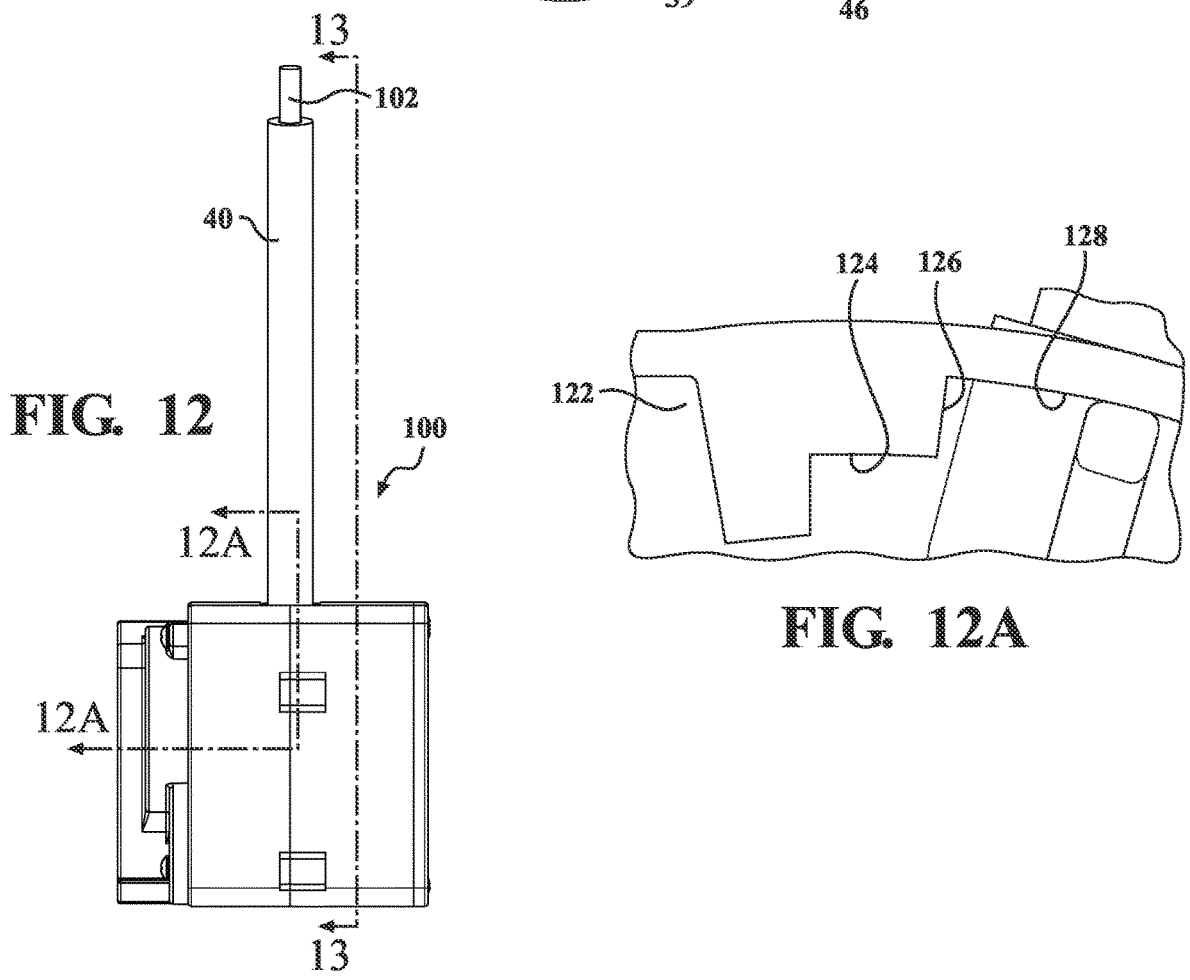
FIG. 11
FIG. 12
FIG. 12A

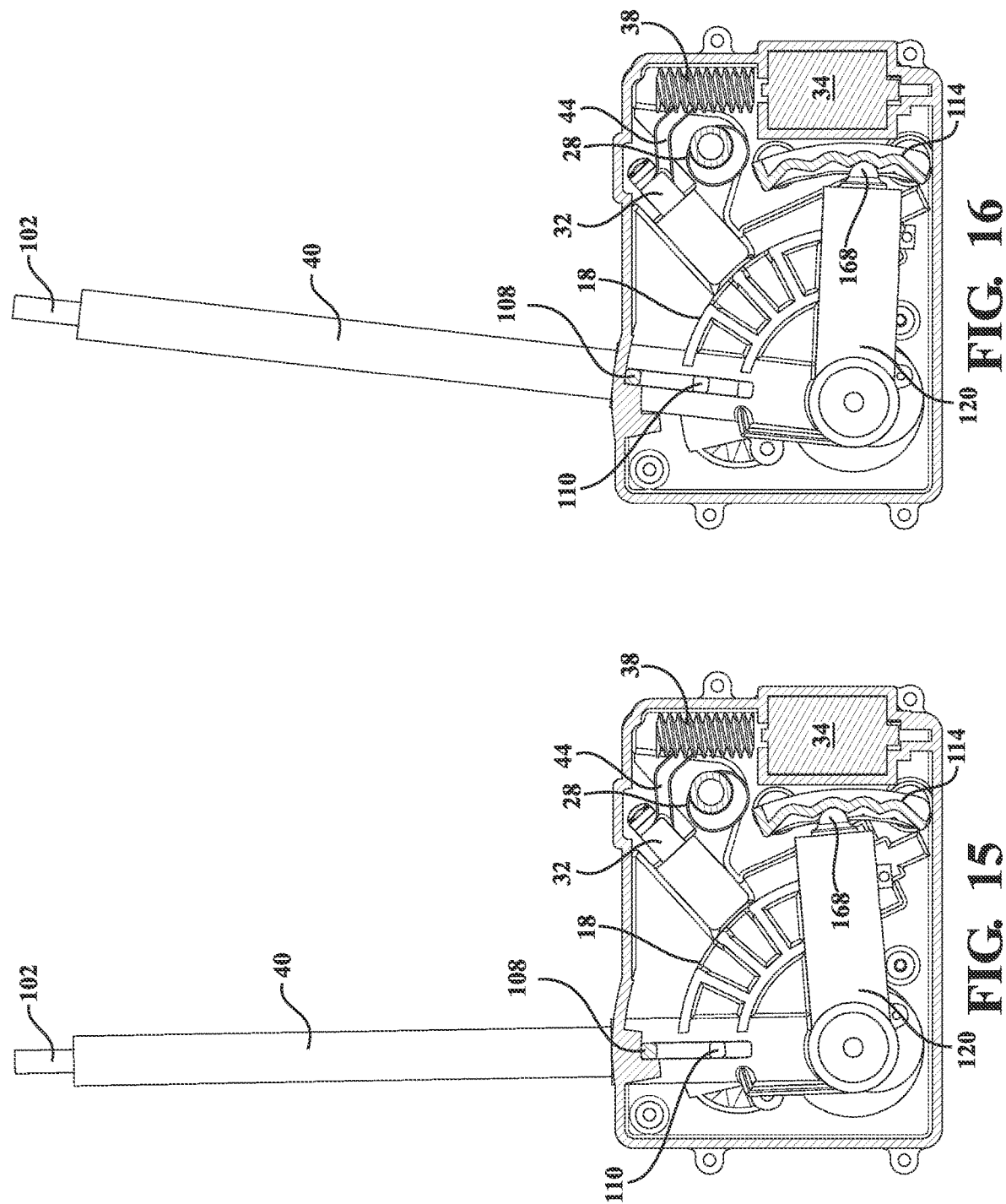

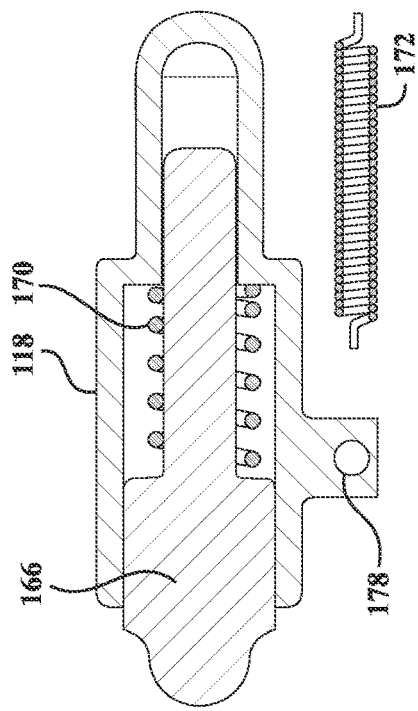
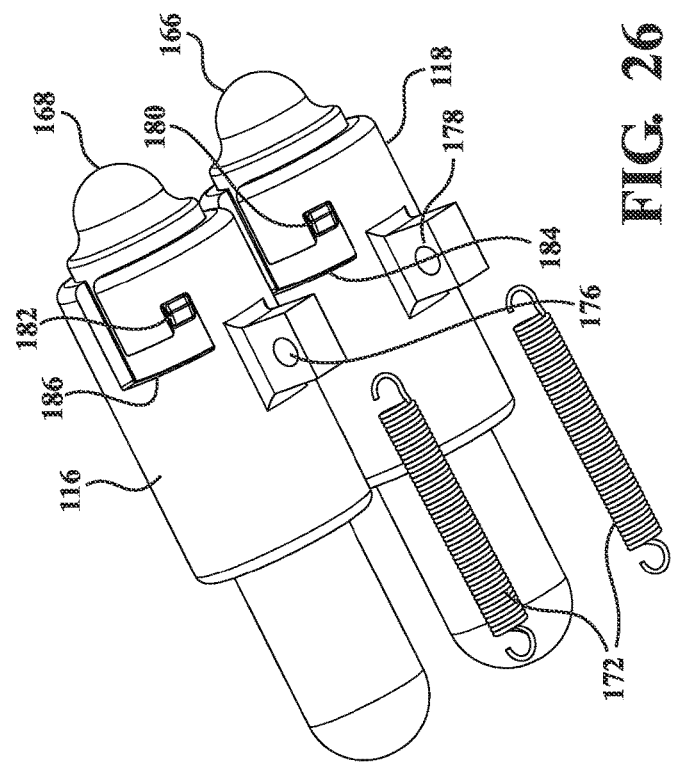
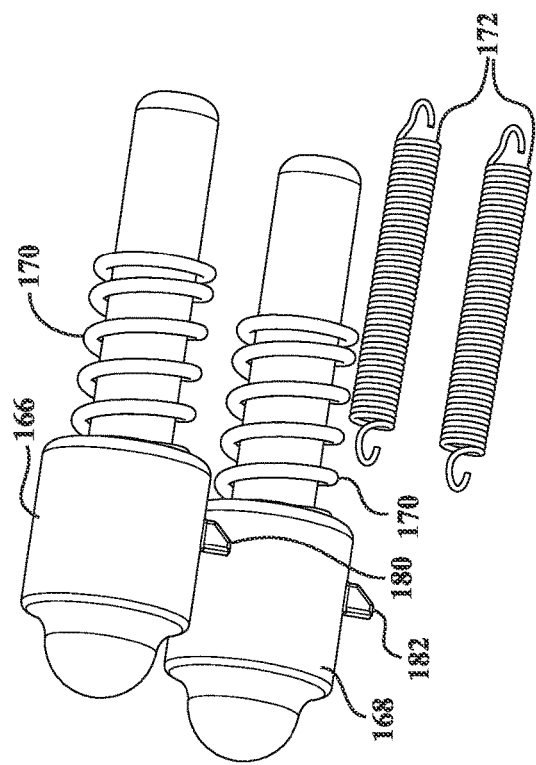
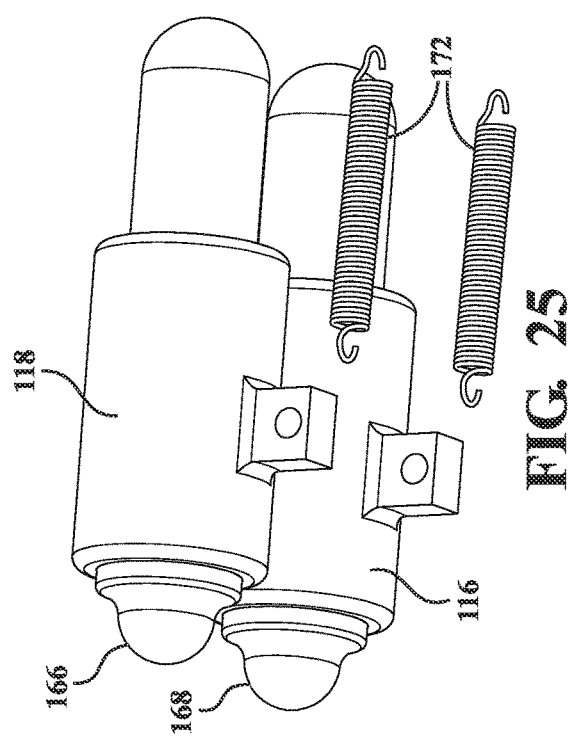

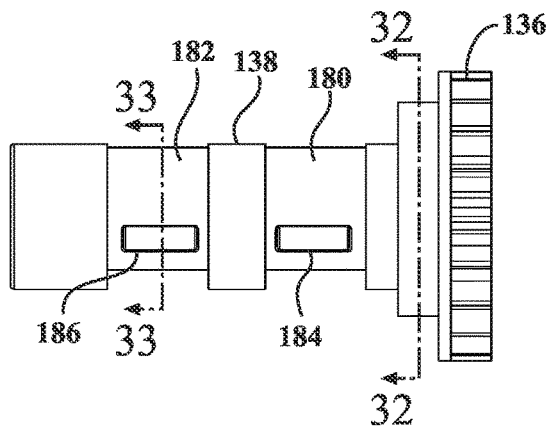
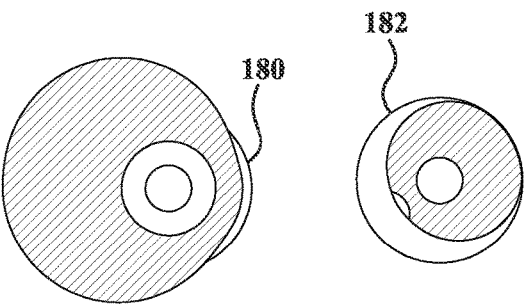
FIG. 31  FIG. 32  FIG. 33
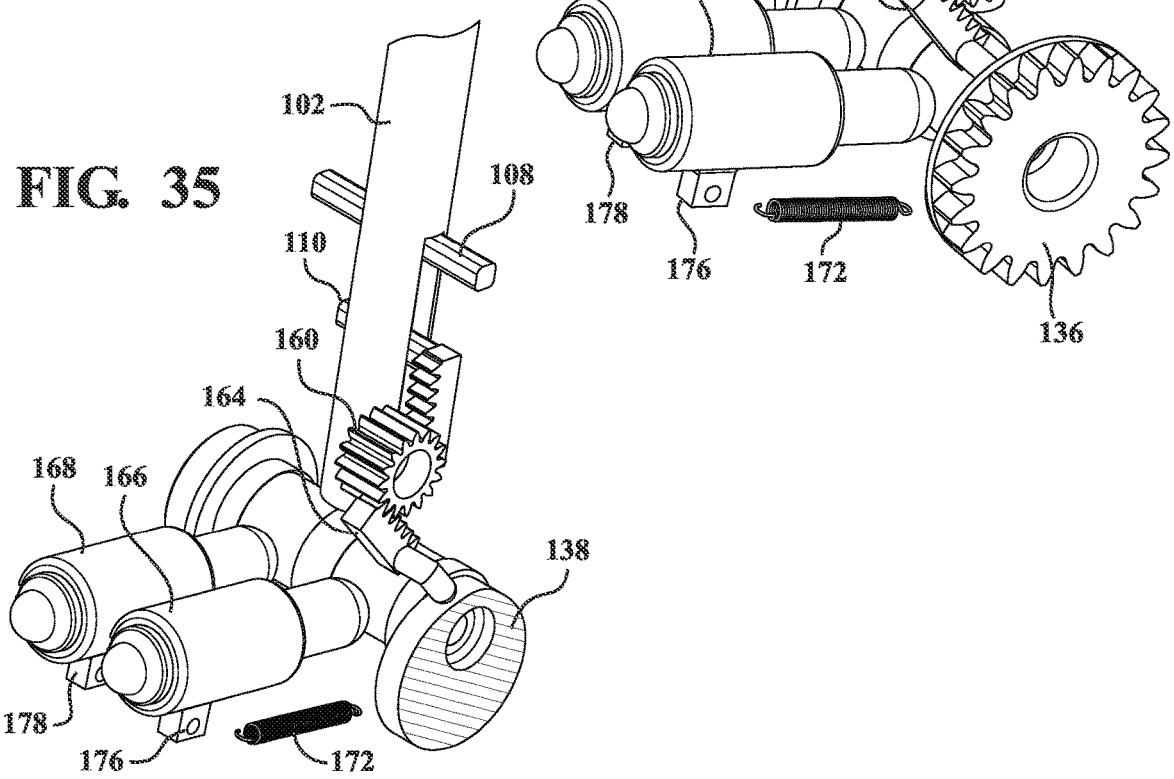
FIG. 34
FIG. 35

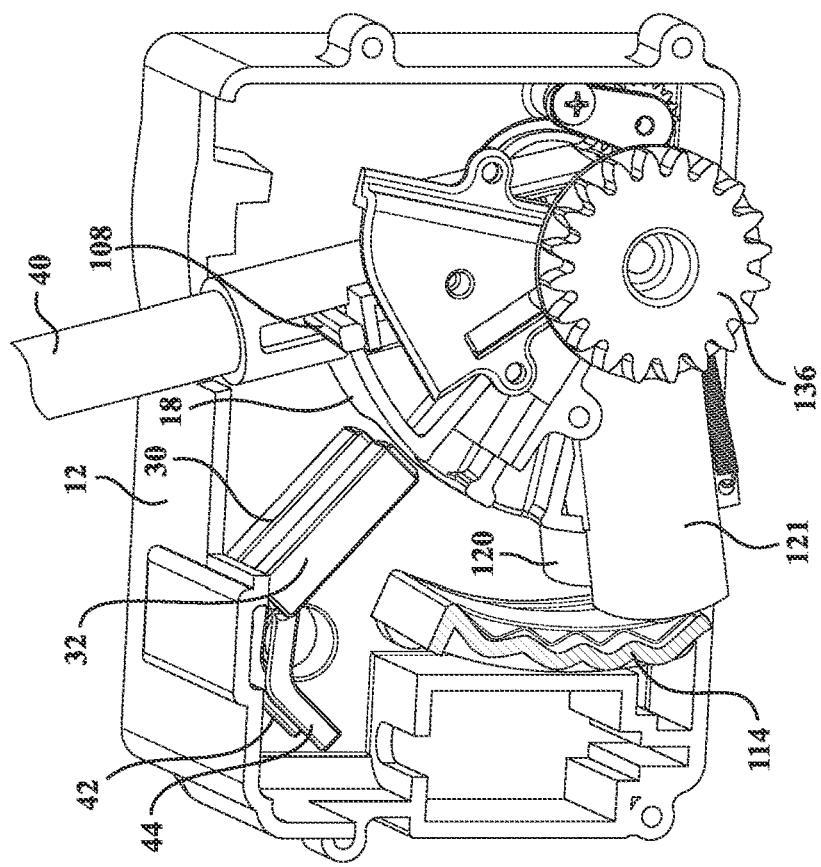
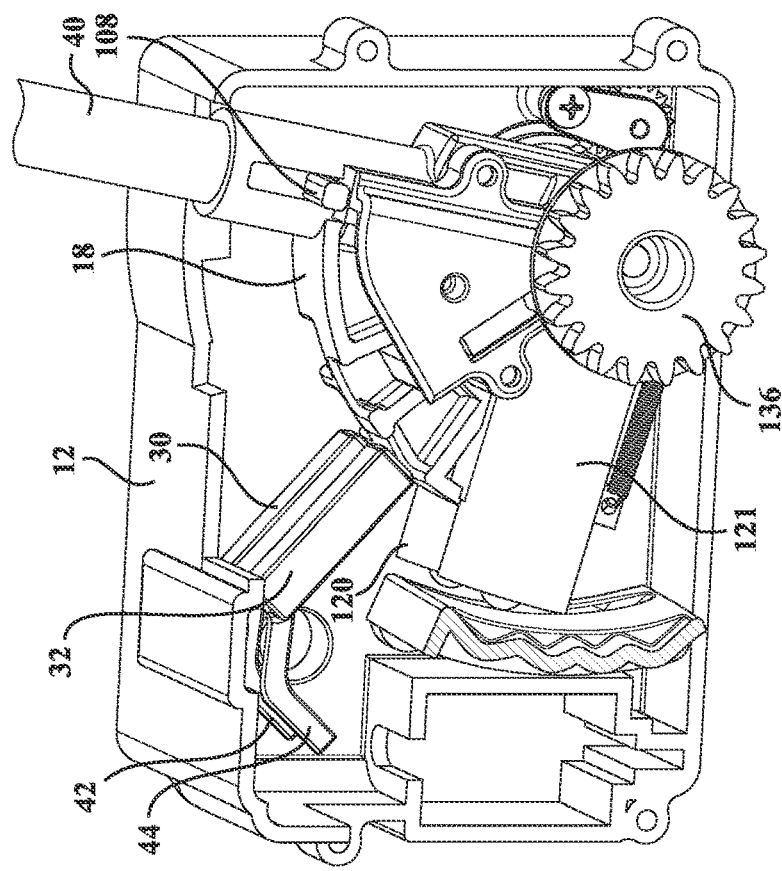

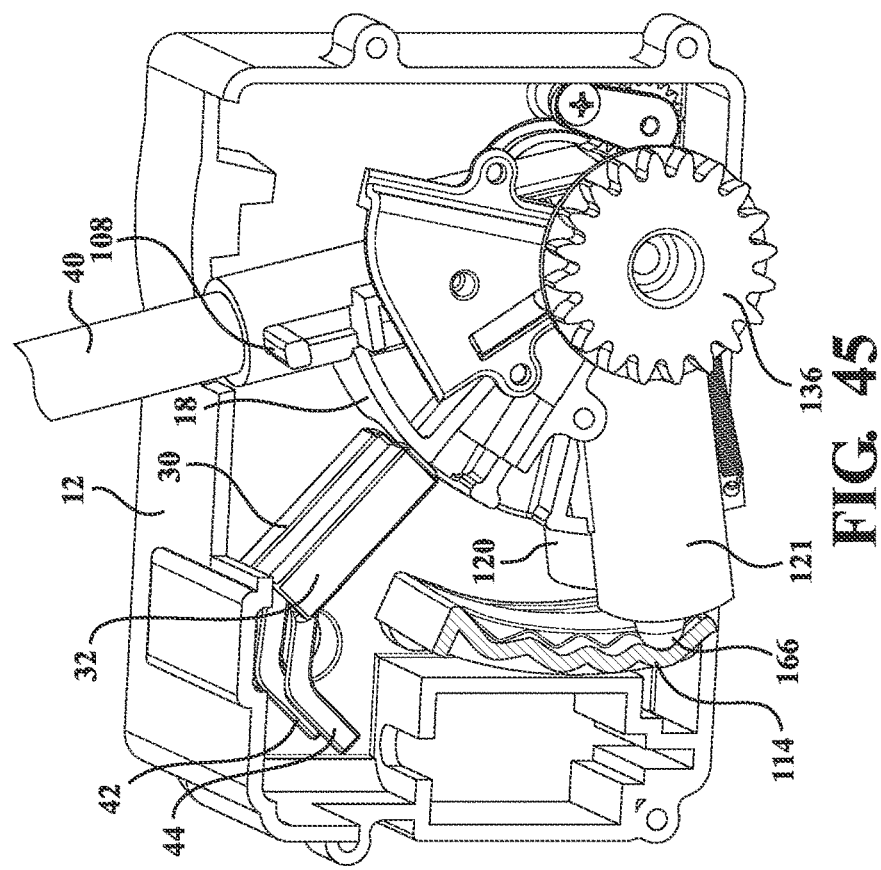
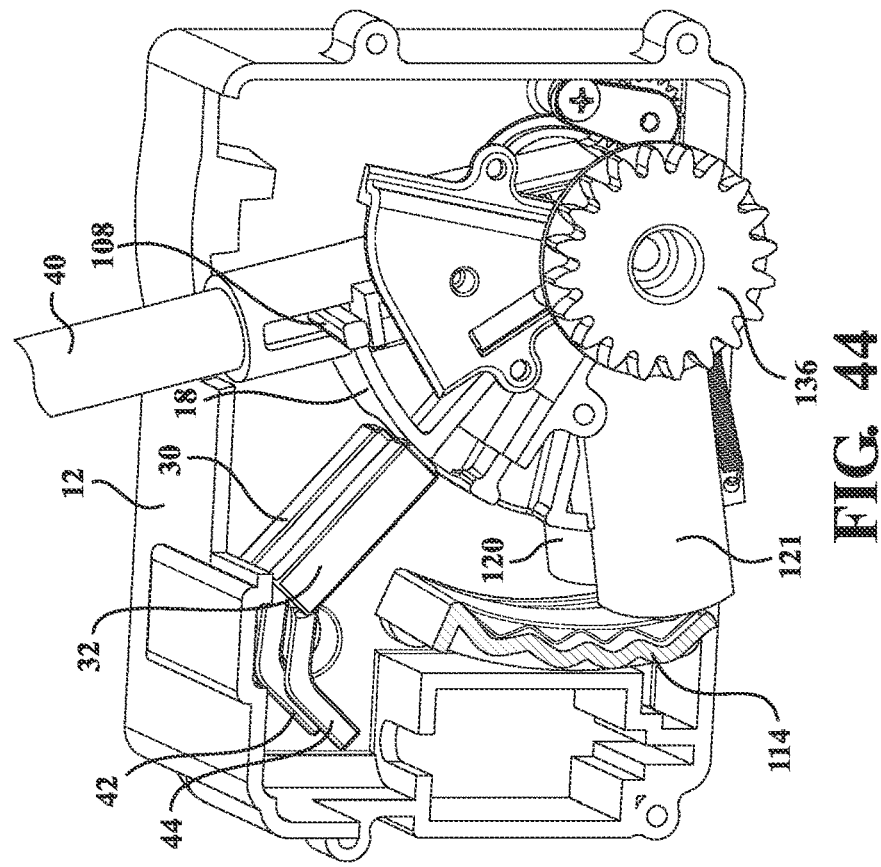

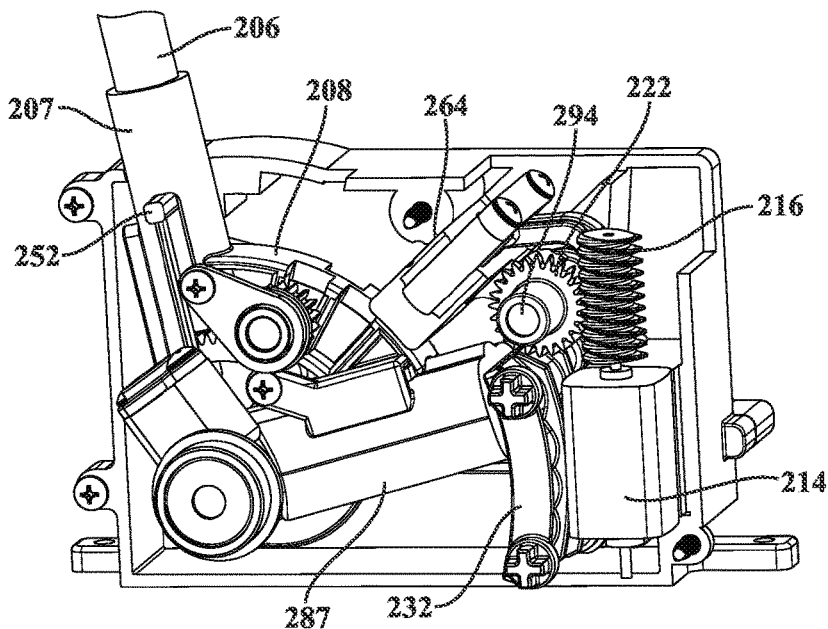
FIG. 54
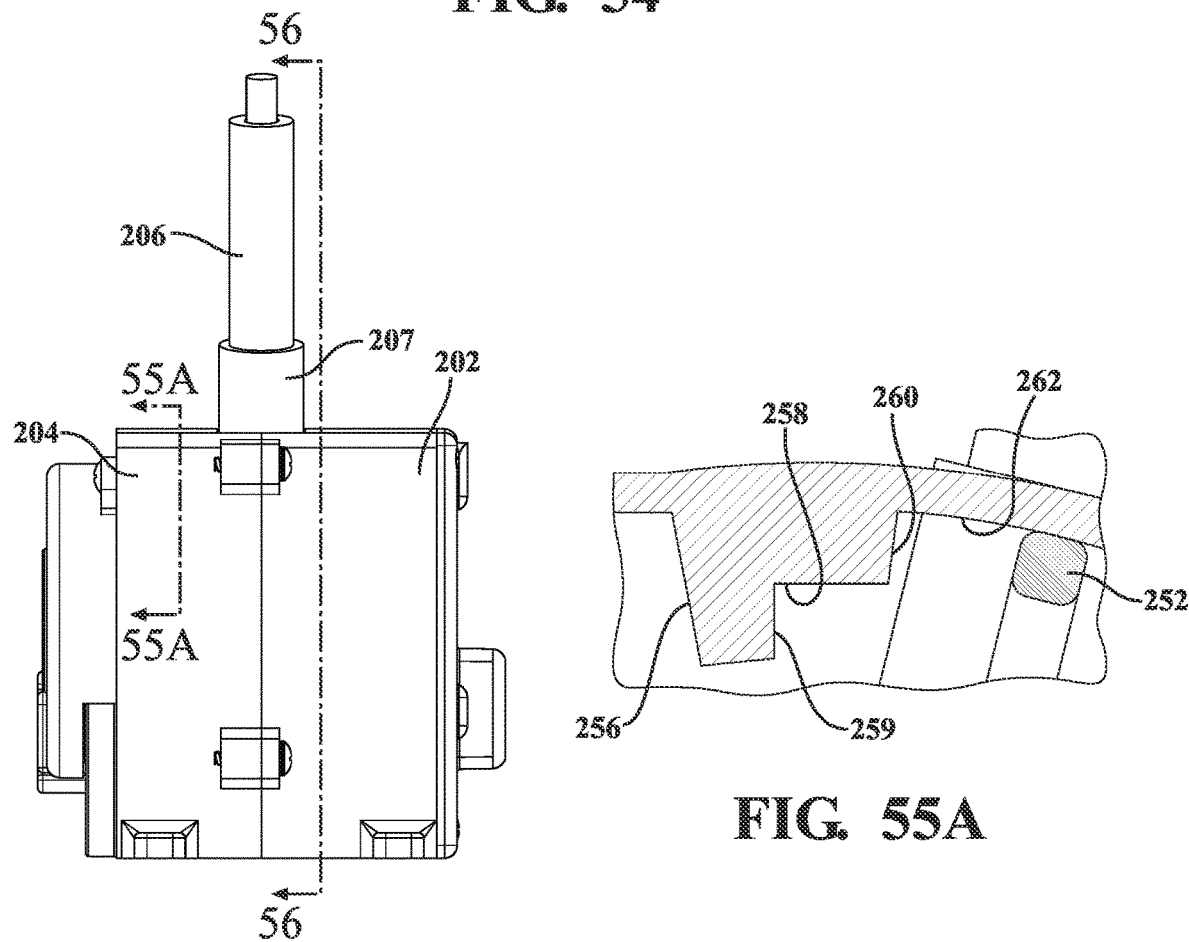
FIG. 55
FIG. 55A

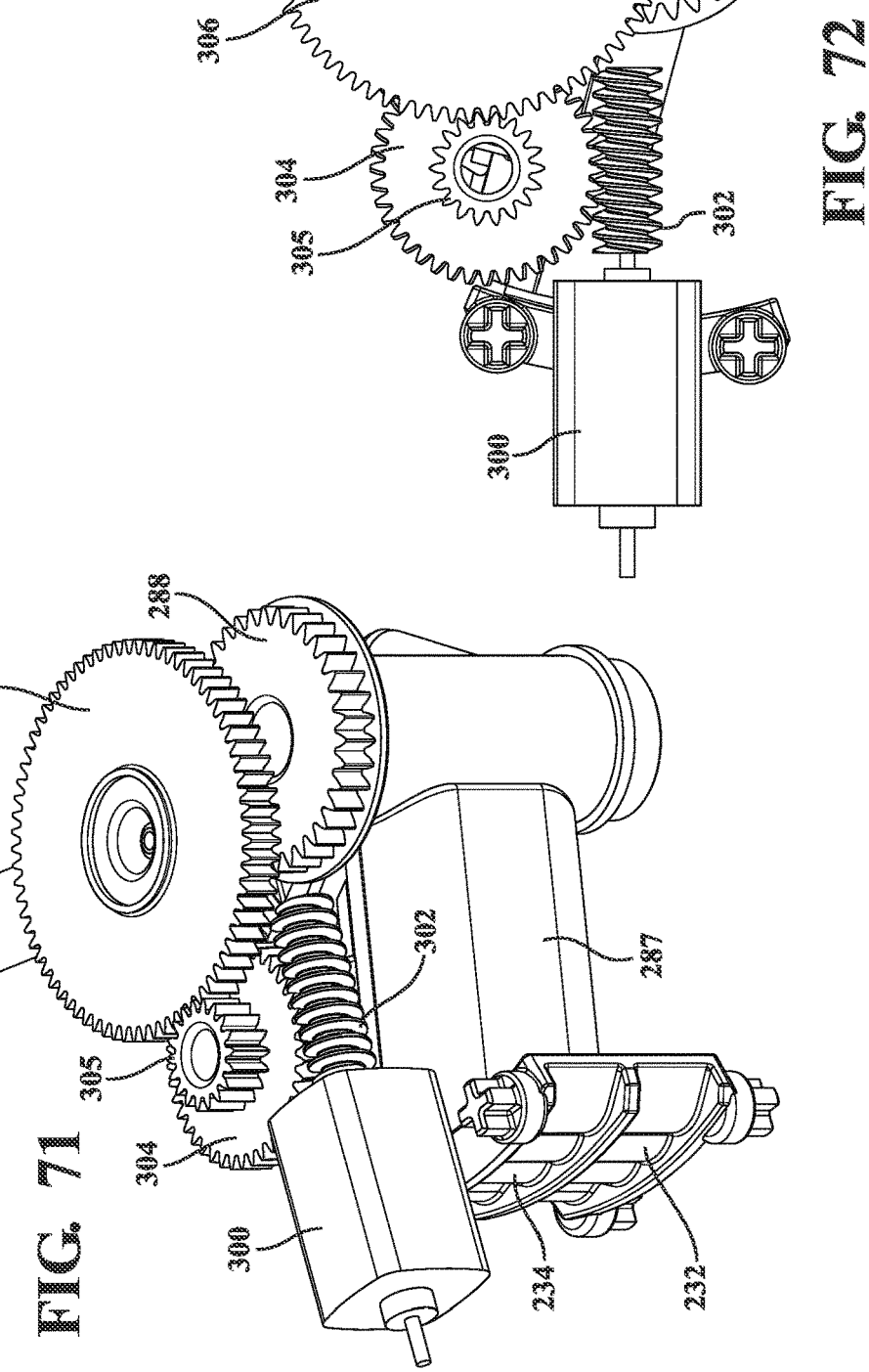

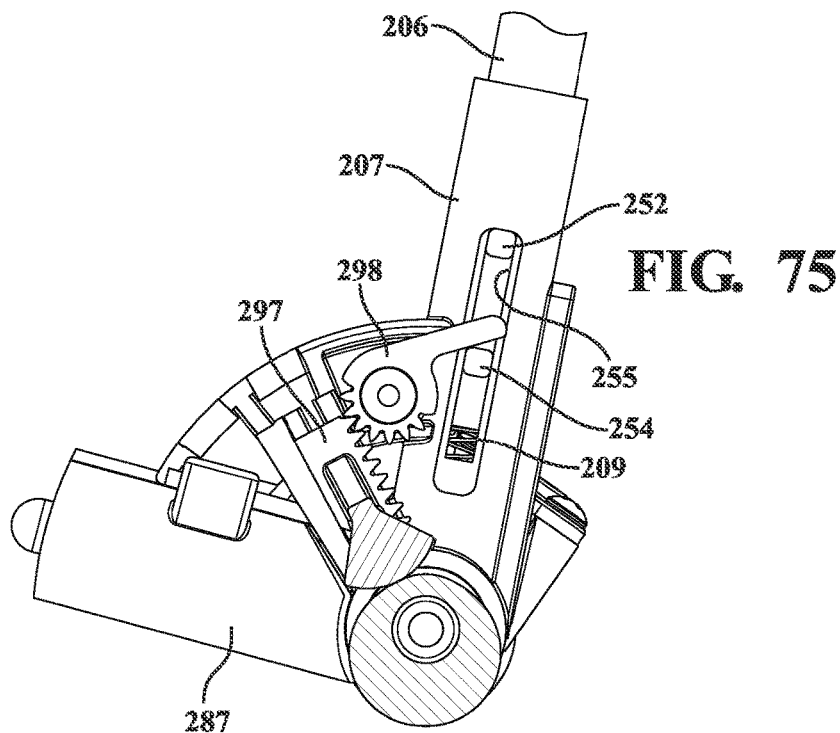
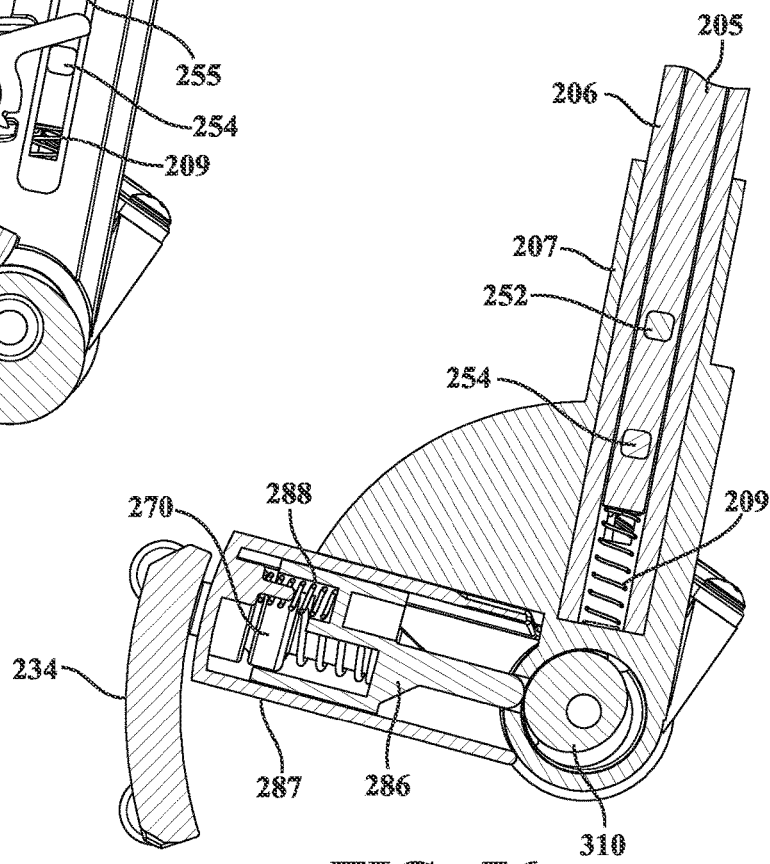
FIG. 75
FIG. 76
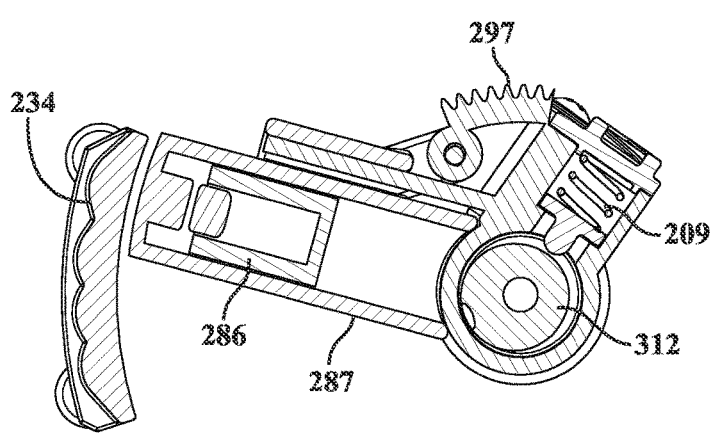
FIG. 77

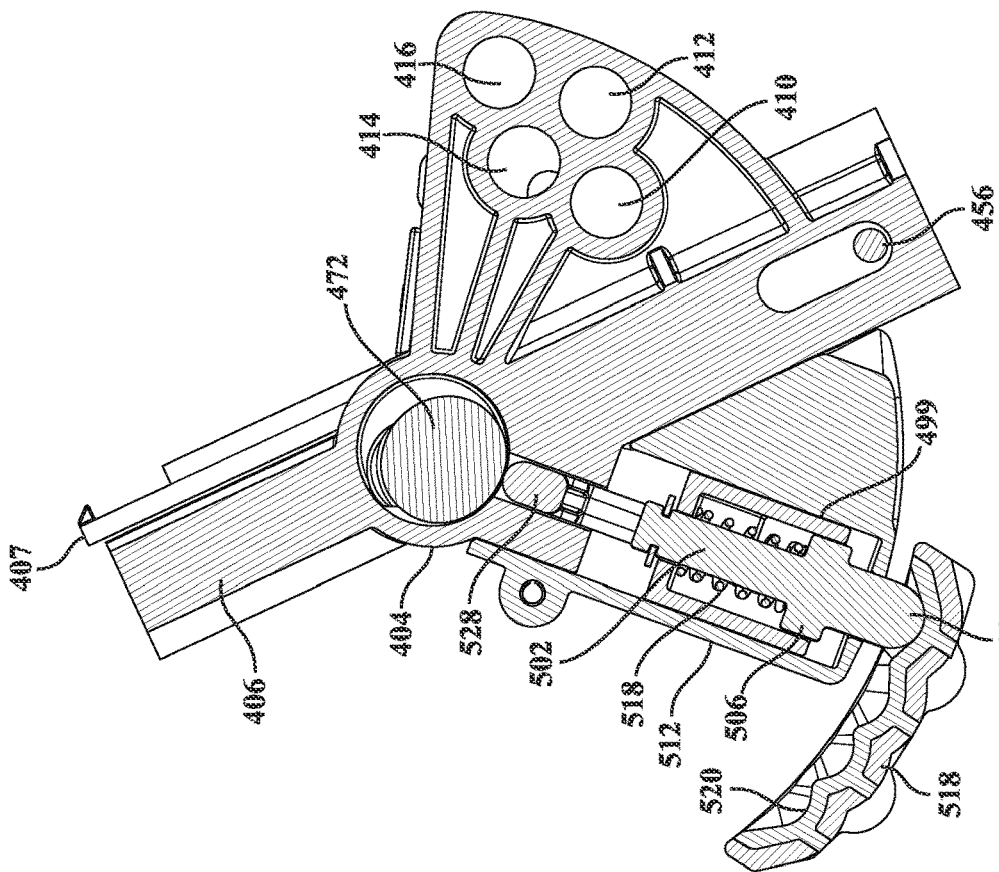
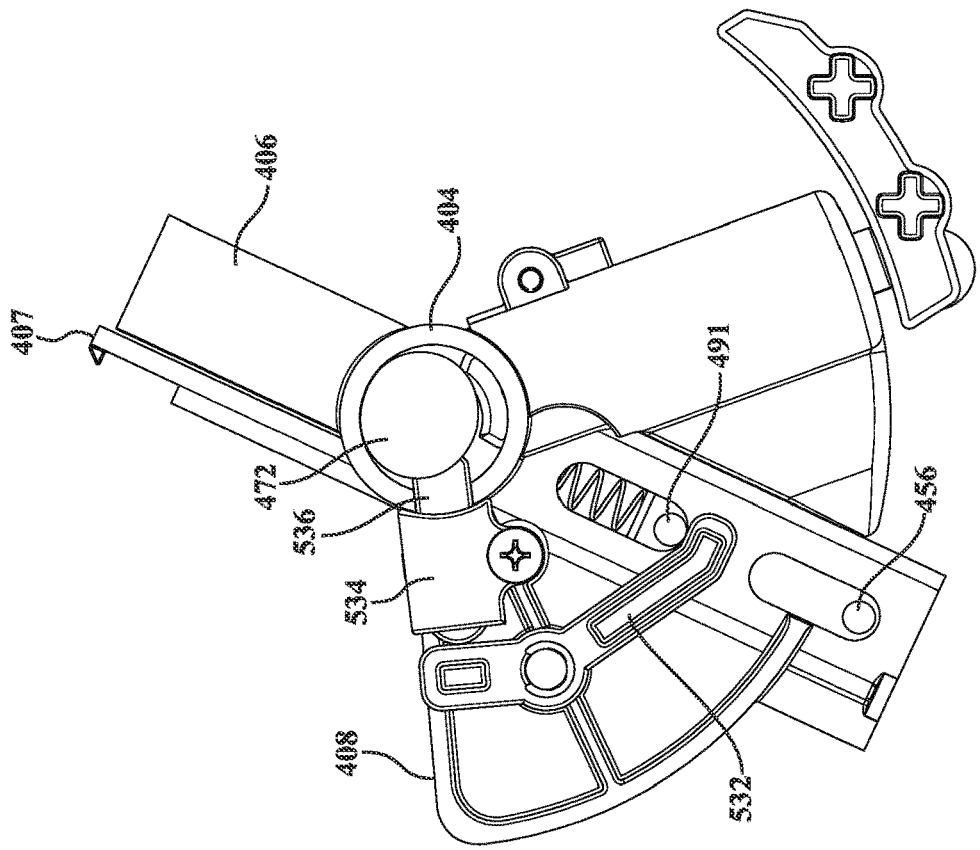
FIG. 113
FIG. 112

GEAR SEEKING POLYSTABLE SHIFTER

The present application claims the priority of U.S. Ser. No. 63/208,721 filed Jun. 9, 2021. The present application also claims the priority of U.S. Ser. No. 63/172,384 filed Apr. 8, 2021.

FIELD OF THE INVENTION

The present invention relates generally to shifter assemblies and, more particularly, to a gear seeking shifter having retracting retracing detent cartridges and gate pawls for allowing selecting of a vehicle gear to occur without motor overload in the instance of lever obstruction and in addition to allowing variable shift distances between each of the gear positions (Park to Reverse, Reverse to Neutral, Neutral to Drive and Drive to Motor), and as opposed to equidistant gear positions as required by the prior art. Other features include provision of a spring biased lock arm, which is restricted by a motor actuated rotating cam profile, in order for the lock arm to be pushed into a matching lock recess configured in a surface of the shifter in order to prevent movement of the shift handle. The present invention further provides both low and high shift point versions, along with the ability to bias multiple lock arms with a single rotating cam, when needed.

BACKGROUND OF THE INVENTION

Most shifters in the market do not possess the ability to gear seek, when commanded by the transmission. This results in the transmission and gear shifter having the potential to be out of synchronization with each other, resulting in the driver being required to move the shift lever to the transmission position manually when desynchronization occurs, this leading to potential confusion or safety concerns.

Additionally, current gear seeking shifters utilize motor driven systems that do not prevent instances of overload or stall of the motor or which result in ratcheting of the detent profile, thus requiring a three hundred and sixty degree detent pattern configured into the shifter support housing, and which requires all gears positions to be equidistant. In this fashion, most traditional shifters have a different distance between Park to Reverse, as compared to from Reverse to Neutral, or from Neutral to Drive. Furthermore, and with a three hundred and sixty degree detent pattern, the shifter size and mass is not optimal, as a wheel is required to maintain the pattern in those designs, which then defines the minimum size of the shifter.

The prior art also discloses other gear driven shifter assemblies, such as depicted in U.S. Pat. No. 10,927,946. Most existing systems having gear seeking ability do not have a polystable knob style shifting interface, so resets can be controlled by purely resetting the gear position by changing LED indication of the gear.

Polystable knob style gear seeking shifters found in the market have motor systems that drive the shift knob to positions, but also require high stall loads of the motor to manage instances of obstruction with the knob, or utilize detent profiles and springs to provide the interference for driving the shift knob to the proper position.

The use of the standard detent profile and spring in a gear seeking assembly to provide the resistance for returning the knob to position results in loud noises as the detents are jumped when an obstruction exists, as well as requiring a tight balance between shift effort and motor driving effort to prevent jumping of the detents during unobstructed gear seeking. Additionally, the prior art polystable knob gear seeking shifters require the distance or angular position between park and reverse to be equal to the distance between reverse and neutral, and neutral and drive, not providing the driver with a tactile difference to indicate that shifting is occurring between park and reverse versus other gear positions.

Prior art polystable systems further require high strength parts or increased part counts to manage the systems, leading to high mass, high cost and large size shifter assemblies, with a high number of failure modes to consider in design.

Also, current locking mechanisms incorporate a solenoid and a motor. An example of this is depicted in the auto return to park rotary shifter of U.S. Ser. No. 10/677,344 to Kuster and which includes a solenoid 92 including an extending portion 98 which engages a recessed annular location 94 of a rotatable stopper disk 90. The solenoid can be energized in order to retract the linear portion 98 out of engagement with the stopper disk.

Shortcomings of conventional solenoid locking mechanisms include the large size and cost requirements in order to provide proper response time and travel at all temperature and supply voltage ranges. Additionally, solenoids are only monitored by on or off positions, as well as being limited as to load limitations of the solenoid piston, such requiring the use of either additional mechanisms to move the loading to other parts of mechanism, or by limiting the load against which the solenoid acts. Additionally, existing motor systems drive and position the plunger assemblies but do not have the ability to position multiple pistons.

SUMMARY OF THE PRESENT INVENTION

The present invention discloses a gear seeking shifter including a housing containing a shift lever with a rotatable base and fixed outer tube supporting an upwardly extending and depressible inner push rod. A CAM shaft component is driven by a gear seeking motor. An upwardly biased gate pawl located in the inner push rod contacts with any of PRND shifter position gates configured along an opposing underside of the housing.

At least one detent cartridge contains a pawl supported within the rotatable base of the shift lever in biasing contact with a detent plate profile configured upon an opposing inside surface of the housing. The CAM shaft component, upon being rotated by the gear seeking motor, includes each of a first profile for retracting the gate pawl and a second profile for engaging and inwardly displacing the detent pawl away from contact with the detent plate profile and to permit the CAM shaft component to rotate the shift lever to a desired gear position.

Other features include a shift position sensor gear with end support magnet rotatably slaved to the CAM shaft component, a printed circuit board assembly (PCBA) is mounted within the housing in proximity to the sensor gear and includes a sensor opposing a shaft end supported magnet of the sensor gear for instructing rotation of the gear seeking motor. The CAM shaft component further includes first and second valleys for receiving the detent cartridges and for providing resistance between the shift lever and the detent cartridges and the CAM shaft component to allow the shift lever to move to a commanded gear position.

The detent cartridges each further include a detent housing containing a detent spring loaded pawl biased in a direction toward the detent plate, the detent housing being biased in an opposite direction by extension springs toward the gear seeking CAM shaft. A gate pawl retraction pin is secured to the push rod below said upwardly biased gate pawl, a push rod spring is seated within a pocket in the outer tube for upwardly biasing the gate pawl and push rod.

The gear seeking motor includes a worm engaging a gear seeking worm gear for driving the gear seeking CAM shaft. The housing further includes inter-assemblable left and right housing portions.

The rotatable base of said shift lever further includes a plurality of notches or recesses configured within an arcuate surface and corresponding to the PRND positions. A CAM lock motor is configured to rotate a shaft supported eccentric cam for actuating at least one plunger having an extending portion aligning with a selected one of the notches and such that, upon rotation of the cam by the motor, the plunger being caused to displace to a disengaged position to permit gear seeking rotation of the shift lever.

The lock motor further includes a worm shaft actuating a worm gear, the eccentric cam including an extending end in slaved relationship with the bevel gear so that actuation of the motor causes rotation of the cam. The at least one plunger further includes each of a first plunger in aligning relationship with a first pair of the notches defining Park and Neutral shifter locations and a second plunger in aligning relationship with a second pair of notches defining Reverse and Drive positions associated with the lever shifter rotatable base.

First and second coil springs are provided for biasing the first and second plungers in an engaged position relative to the shifter. Each of the plungers further includes an integral boomerang shaped portion influenced by the eccentric cam for linearly actuating the plungers relative the shifter position notches. A magnet is supported upon an end of the shaft supported eccentric cam and, in response to rotation relative to a proximately located sensor, for detecting a position of the cam.

BRIEF DESCRIPTION OF THE DRAWINGS

Reference will now be made to the attached drawings, when read in combination with the following detailed description, wherein like reference numerals refer to like parts throughout the several views, and in which:

FIG. 11 is a further rotated view illustrating a cam shaft end supported magnet which, in combination with a proximately located PCBA mounted sensor, provides a processor feedback as to a detected position of the cam;

FIG. 12 is an assembled view of the gear seeking polystable shifter of FIG. 1;

FIG. 12A is a cutaway view taken along line 12A-12A of FIG. 12 and illustrating the gate profile configured on both the left and right housing upper undersides;

FIG. 15 is a succeeding view to FIGS. 13-14 with the shift lever rotated to the Reverse position, with the gate pawl blocked by the gate wall between the Reverse and Park positions;

FIG. 16 is a further succeeding cutaway illustration depicting the shifter in the Neutral position with the gate pawl blocked by the gate wall between the Neutral and Reverse positions;

FIG. 23 is a subset exploded view of the gear seeking detent pawls which are spring loaded to provide resistance for shifting the shift lever;

FIG. 24 is a length cutaway of a selected detent pawls shown in FIG. 23 and better depicting the configuration of the spring and pawl components loaded into the detent housing, thus forming the detent cartridge;

FIG. 25 is a rotated and exploded perspective of the pair of detent cartridges also shown as a section in FIG. 24;

FIG. 26 is a reverse rotated perspective of the detent cartridges in FIG. 25 and by which the spring loaded pawl is shown retained in the detent housing by physical restriction which includes inserting the pawl and compressing the spring, quarter turning the pawl, and subsequently releasing the pawl to allow a side projecting tab portion thereof to seat within a defined keyway location of the detent housing;

FIG. 31 is a side plan view of the cam shaft which exhibits both first and second circumferential and eccentric profiles, these further referenced at each of first cutaway 32-32 for FIG. 32 and second cutaway 33-33 for FIG. 33, the first cutaway interacting with the gate pawl retraction pin to pull the push rod/gate pawl inward to clear the shifter position gates, with the second cutaway interacting with the detent pawl housing cartridges, the cam profiles as further shown including valleys to receive the detent cartridges and to provide resistance between the shift lever/detent cartridge and the cam shaft to allow the shift lever to move to the position being commanded;

FIGS. 34 and 35 provide largely overlapping views of detent cartridges, cam, rack, gate pawl, gate pawl retraction spur gear and gate retraction pin;

FIG. 42 succeeds shown in FIG. 41 and, upon the PCBA recognizing the cam shaft being in the proper position (i.e. again through the identified positioning of the magnet relative to the PCBA mounted hall sensor), the gate and detent pawls are both retracted (i.e. the detent pawls seat within the cam shaft valleys) and the gear seeking motor is deactivated, following which the lock motor unlocks the shift lever;

FIG. 43 is an illustration showing the gear seeking motor again being actuated to rotate in either direction (with the right plunger unlocked and left plunger retracted) to move the shift lever from a current position to a further position directed by the vehicle transmission/ECU, at which point both the cam shaft and shift lever rotate to the desired position, such as moving from the Park to the Dive position and which, upon the PCBA recognizing that the shift lever is at the desired position (again through interfacing of the magnet/Hall effect sensor), following which the gear seeking motor is deactivated;

FIG. 44 further depicts the lock system being reengaged (through cam rotated re-engagement of the plungers so that the right plunger is reestablished upon the outer diameter of the shift lever and the left plunger as shown) and in order to stop shift lever assembly movement;

FIG. 45 presents another view of the gear seeking shifter assembly and showing the gear seeking motor actuated to rotate the cam shaft to the reset the position of the detent pawls and gate pawl and which, upon the PCBA recognizing that the CAM is at the reset (standard shift operating) position, the gear seeking motor is deactivated, thereby completing the gear seeking operation;

FIG. 54 is a rotated view of magnet supported upon the end of the CAM interface;

FIG. 55 is an assembled view of the gear seeking polystable shifter of FIG. 46;

FIG. 55A is a cutaway view taken along line 55A-55A of FIG. 55 and illustrating the gate profile configured on both the left and right housing upper undersides;

FIG. 71 is a perspective view of the gear seeking train including worm to worm gear profile which has a smaller spur gear profile at the other end, which interfaces to a large diameter spur gear profile on, which has a smaller spur gear profile on the other end (not shown), which interfaces with the CAM shaft spur gear profile;

FIG. 72 is a rotated plan view of FIG. 71;

FIG. 75 is a subset illustration of the gear seeking CAM shaft in standard operating position in which the gate pawl is in an engaged position, the gate retraction pin is in the up position and the rack is in the down position;

FIG. 76 is a further cutaway view of FIG. 75 and depicting the detent housing cartridge interface condition with the CAM shaft;

FIG. 77 is a further cutaway view depicting the shift lever pawl not engaged and not interfering with the CAM shaft;

FIG. 112 is a subset illustration of the gear seeking CAM shaft in standard operating position in which the gate pawl is in an engaged position, the gate retraction pin is in the down position and a separate rocker arm also in the down position;

FIG. 113 is a rotated view of FIG. 112 and showing, in further cutaway, the detent pawls engaged with the detent plates;

DETAILED DESCRIPTION OF THE PREFERRED EMBODIMENTS

With reference to the attached illustrations, the present invention discloses a gear seeking shifter having retracting gate and pawl functionality for allowing seeking of a desired gear shift position. As will be further described, a rotatable CAM component, in combination with retractable detent cartridges and gate pawls, allows gear seeking to occur without motor overload in the instance of lever obstruction, in addition to allowing a variable shift distance between the gear positions (Park to Reverse, Reverse to Neutral, Neutral to Drive and Drive to Motor), and as opposed to equidistant gear positions as required by the prior art. Other features include a spring biased lock arm, restricted by a cam profile, for requiring the cam profile of the CAM component to be rotated (by an electric motor or other means) in order to allow the lock arm to push into a matching lock recess to prevent movement of the shifter handle. The present invention also provide the ability to bias multiple lock arms with a single rotatable CAM component.

Figure 1:
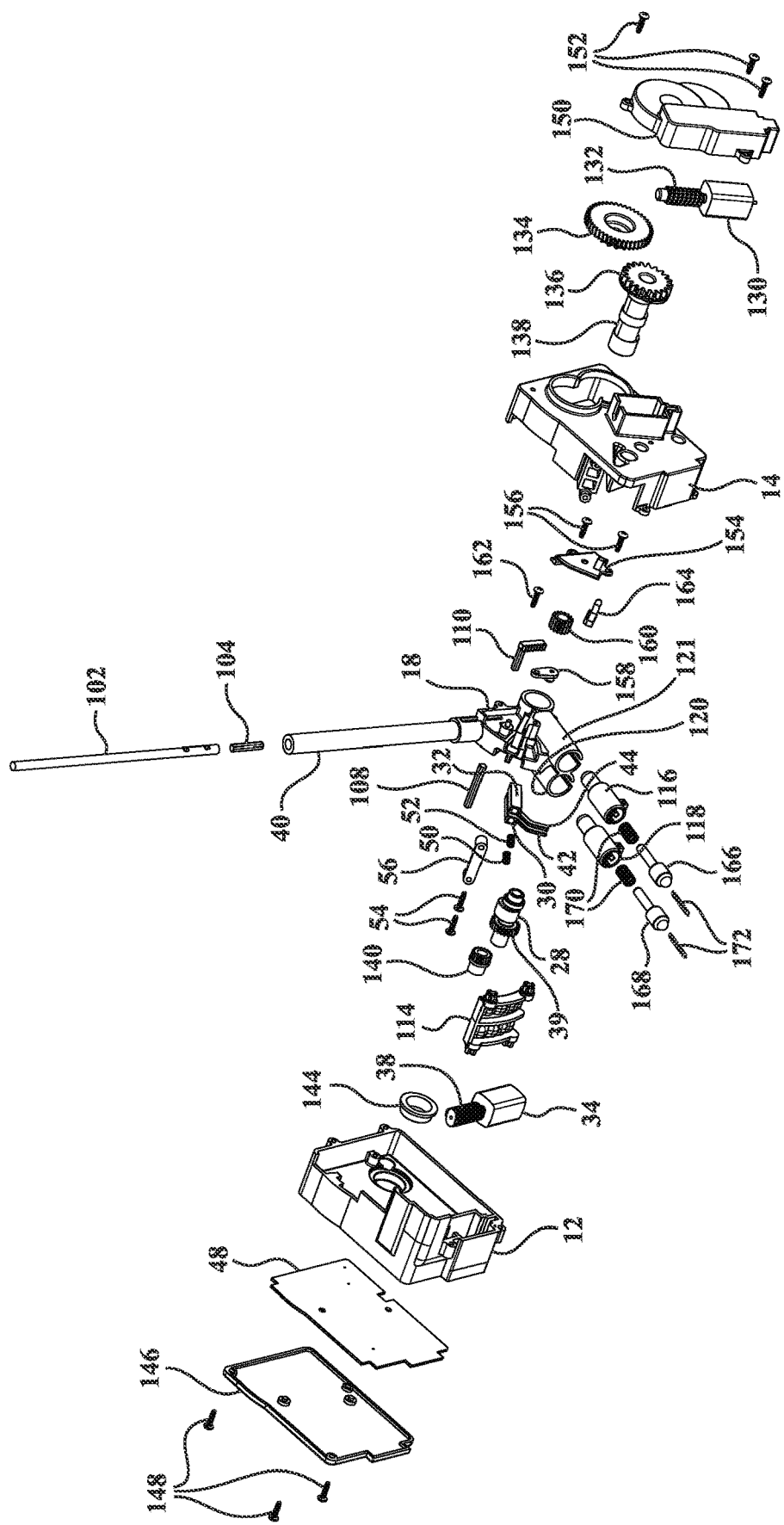
FIG. 1 is an overall exploded view of the gear seeking polystable shifter assembly and which combines the plunger lock mechanism, shifting mechanism including retractable detent and pawl cartridges, and gear seeking subassembly with gear seeking cam, worm gear and motor.

FIG. 1 presents an overall exploded view of the gear seeking polystable shifter assembly which combines the plunger lock mechanism, shifting mechanism including retractable detent and pawl, and gear seeking subassembly with gear seeking motor, worm gear, rotatable cam shaft, and centrally disposed shift lever assembly. A detailed description will be initially provided of the plunger lock mechanism, with successive descriptions for provided for each of the shifting and gear seeking mechanisms forming components of the present invention.

Figure 2A:
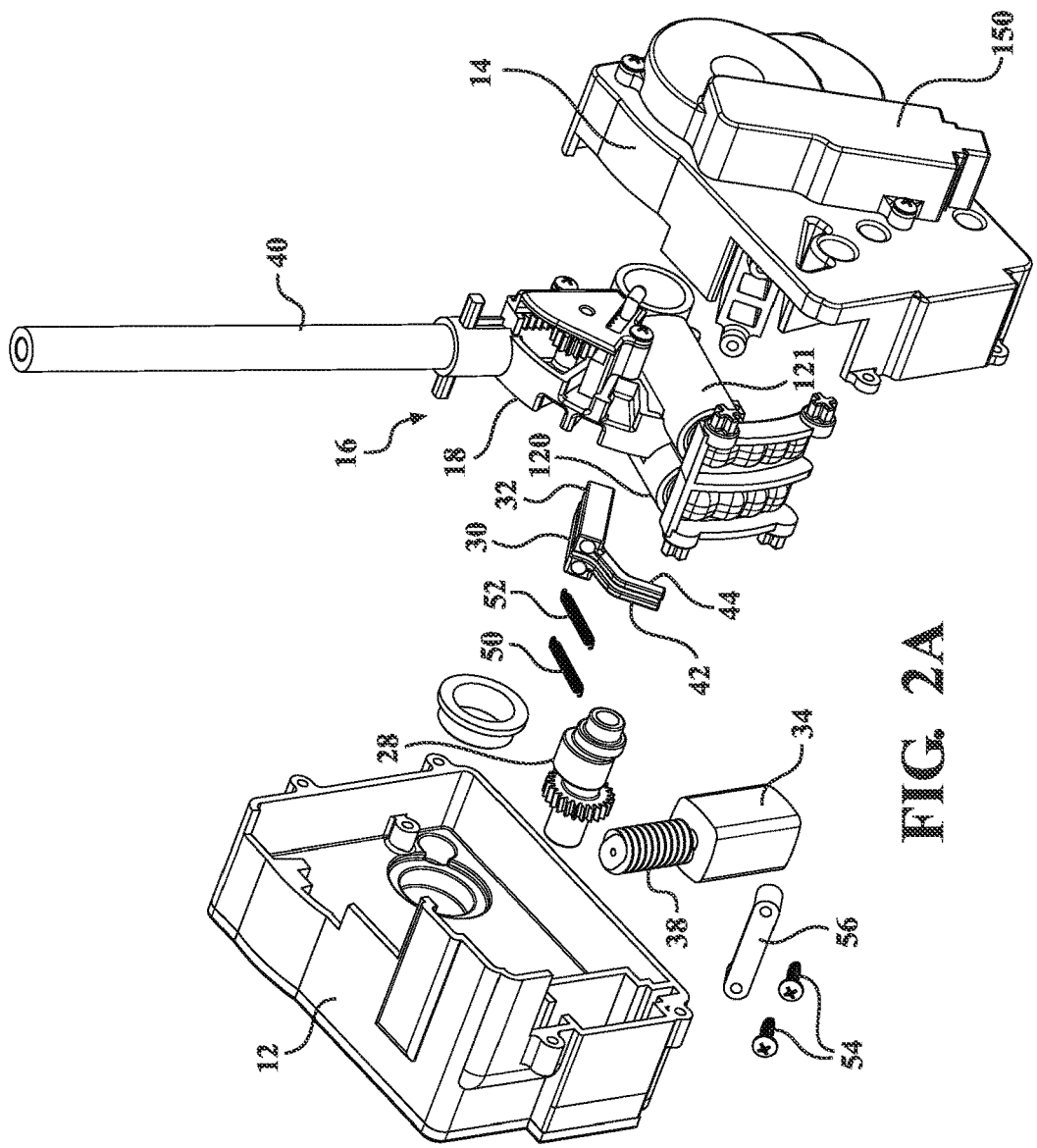
FIG. 2 is an assembled perspective and FIG. 2A an exploded view of the plunger lock mechanism according to one non-limiting embodiment of the present invention and depicted incorporated into a lever style shifter, in which a motor and gear assembly rotates a lock cam shaft for actuating a pair of locking arms or plungers between a spring loaded engaged position with recess and shifter positioned defined bores in the lever and a retracted/disengaged position for permitting rotation of the shift lever.
Figure 2:
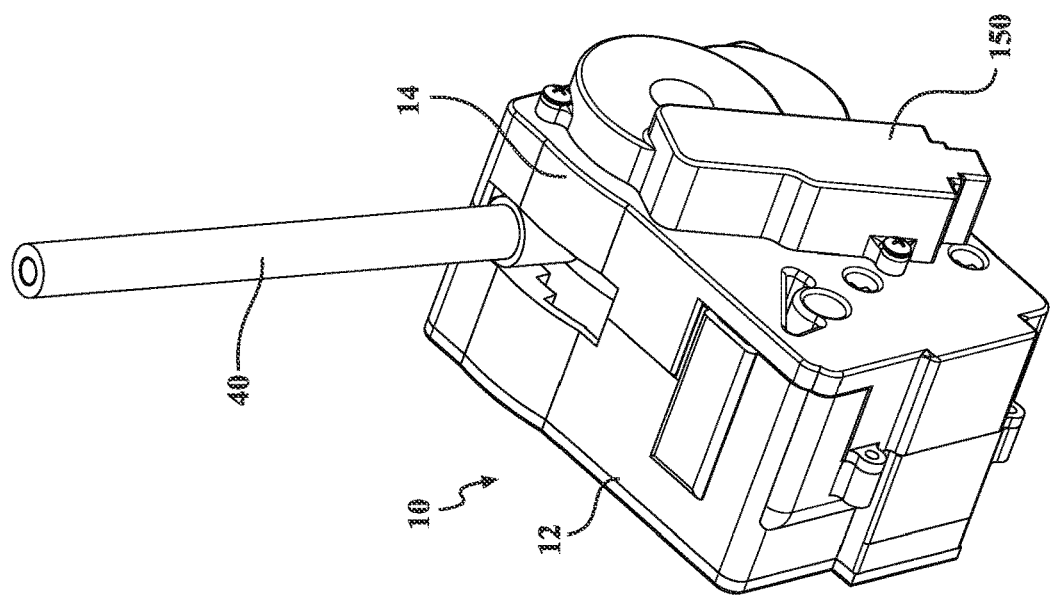

Referring again to FIG. 1 and initially to FIGS. 2 and 2A in combination, a pair of assembled and exploded views are provided of the plunger lock mechanism (see generally at 10 in FIG. 2), this again forming a first component of the gear seeking polystable shifter of the present invention and which is shown incorporated into a lever style shifter assembly. The assembly includes a pair of outer left hand 12 and right hand 14 housings, between which is defined a package interior space for receiving and supporting a rotationally supported component 16 which, in the illustrated embodiment, includes a shift lever sub-assembly having a rotatable disk shaped base component 18 exhibiting plurality of recessed notches for engagement by the plungers or lock arms. A more detailed description of the shifter and gear seeking mechanisms will be had with subsequent reference to FIG. 20 et seq.

Figure 9:
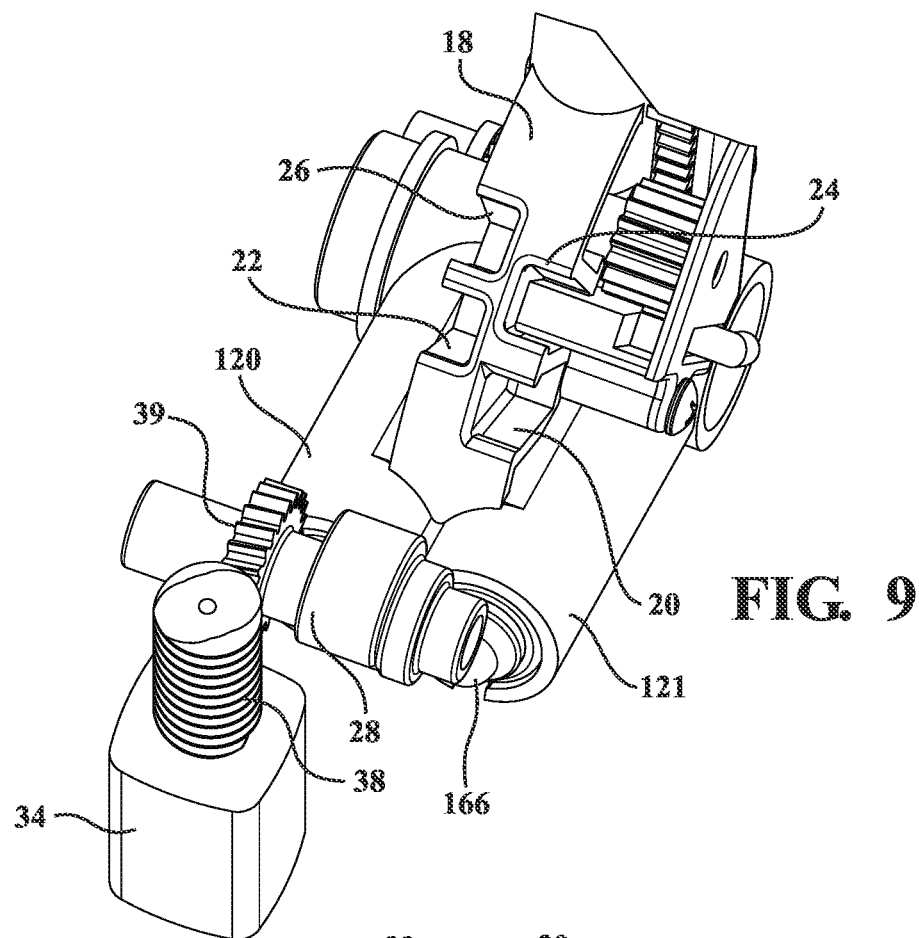
FIG. 9 presents a further illustration with the plungers or lock arms removed and better showing recessed notches in the shifter lever corresponding to each of Park, Reverse, Neutral and Drive positions.

As best shown in FIG. 9, the notches are defined in an arcuate surface of the shifter base component and which correspond to each of Park Position (notch 20), Reverse Position (notch 22), Neutral Position (notch 24) and Drive position (notch 26). As further shown, the Park and Neutral shifter positions are in rotary directed alignment, as are the Reverse and Drive shifter positions.

Also provided in the main package space are accommodations within the left hand 12 and right hand 14 mating housings for locating and supporting each of a lock cam shaft 28, (distinguishable from a gear seeking cam shaft) and at least one lock arm or plunger (a pair of which being depicted at 30 and 32 and which denote left and right individual plungers). An electric motor 34 is provided which seats within a supporting pocket 36 configured in the right hand housing 14. A rotatable output worm shaft 38 of the motor 34 actuates a meshing worm gear 39 configuration upon the rotatable lock cam shaft 28.

Prior to reference to the succeeding illustrations, an overall description of the lock system function includes the motor 34 establishing a position of the lock arms or plungers 30/32 (such as which are spring loaded into either of a normally engaged or disengaged position relative to the mating recess notches 20, 22, 24, and 26 in the shift lever). The elongated shift lever again includes the lower fixed portion 40 which secures to and extends upwardly from the lower disk shaped body 18, such that the shift lever 40 is rotated to a given shifter PRND position, at which a corresponding one of the recess notches is aligned with the left/right plungers 30/32.

Figure 6:
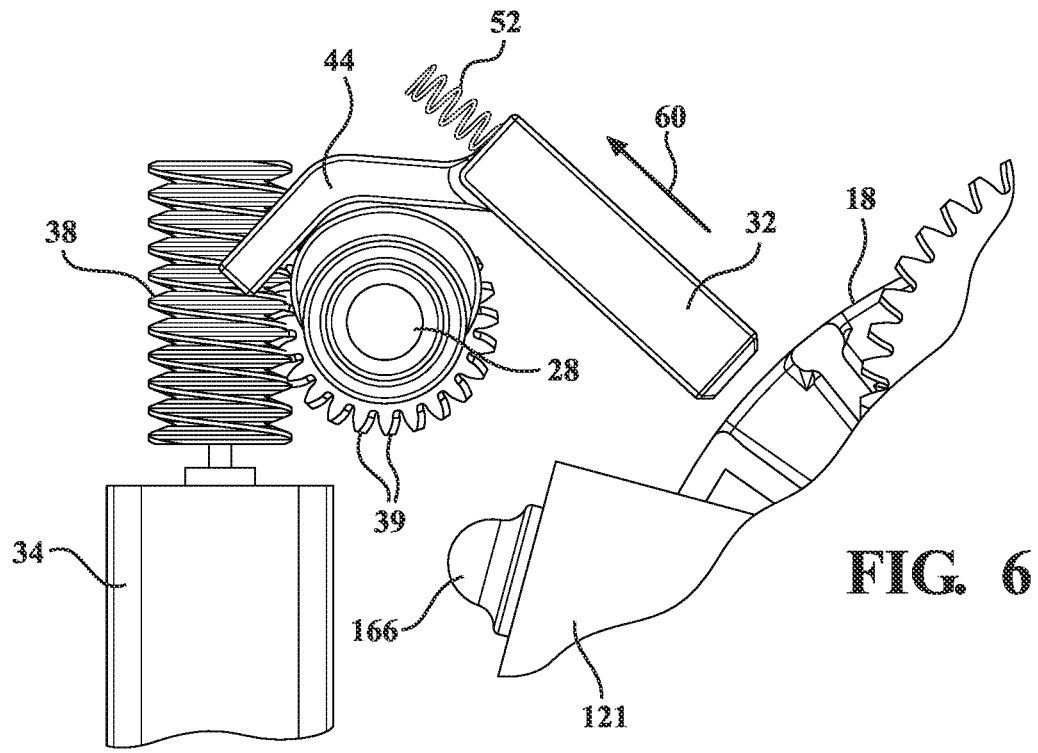
FIG. 6 is a succeeding view to FIG. 5 and depicting the rotation of the cam against the plungers, resulting in a counter-biasing and retracting motion exerted on the plungers in order to disengage from the shift lever.

In the illustrated variant, and upon the locking cam shaft 28 being rotated into engagement with the plungers 30/32 (by example as shown in FIG. 6), the plungers retract from the shift lever recesses, thereby permitting movement (e.g. rotation) of the shifter handle or lever 40. When the locking cam shaft 28 is rotated in the opposite (released) position as shown in FIG. 45, the plungers or lock arms 30/32 are permitted to mate with the selected recessed notch or bore in the shifter handle to thereby prevent movement of the shifter.

As further shown in FIGS. 4-8, each of the left 30 and right 32 plungers include an integrated and boomerang shaped portion (respectively at 42 and 44), which interface with the eccentric profile of the lock cam shaft 28, such that rotation of the shaft causes the boomerang shaped portions to in turn linearly displace the plungers relative to the aligning shifter position notches in the lower disk shaped body 18.

In one non-limiting application (with subsequent reference to FIGS. 7-8 in particular) the dual plunger arrangement allows for the first or left plunger 30 to lock the lever into either of the rotary aligning Reverse or Drive positions (notches 22 or 26), with the other right side plunger 32 being alternately configured to lock the shifter lever in either of the likewise rotary aligning Park or Neutral (notches 20 and 24) positions. Additional applications include the use of only a single plunger (corresponding to 32) in the event only Park or Neutral positions are required.

As further described in FIG. 11, a position sensor (not shown) can be arranged in proximity to an end positioned magnet 46 associated with the end of the lock cam shaft 28, and by which the sensor communicates with a processor component (such as associated with a PCBA board assembly at 48 in FIG. 1) for detecting the position of the lock cam shaft 28. Without limitation, any arrangement of sensors (external and otherwise) can be provided in combination with the PCBA 48 such as for providing any or park lock, neutral lock or return to park functionality.

Figure 3:
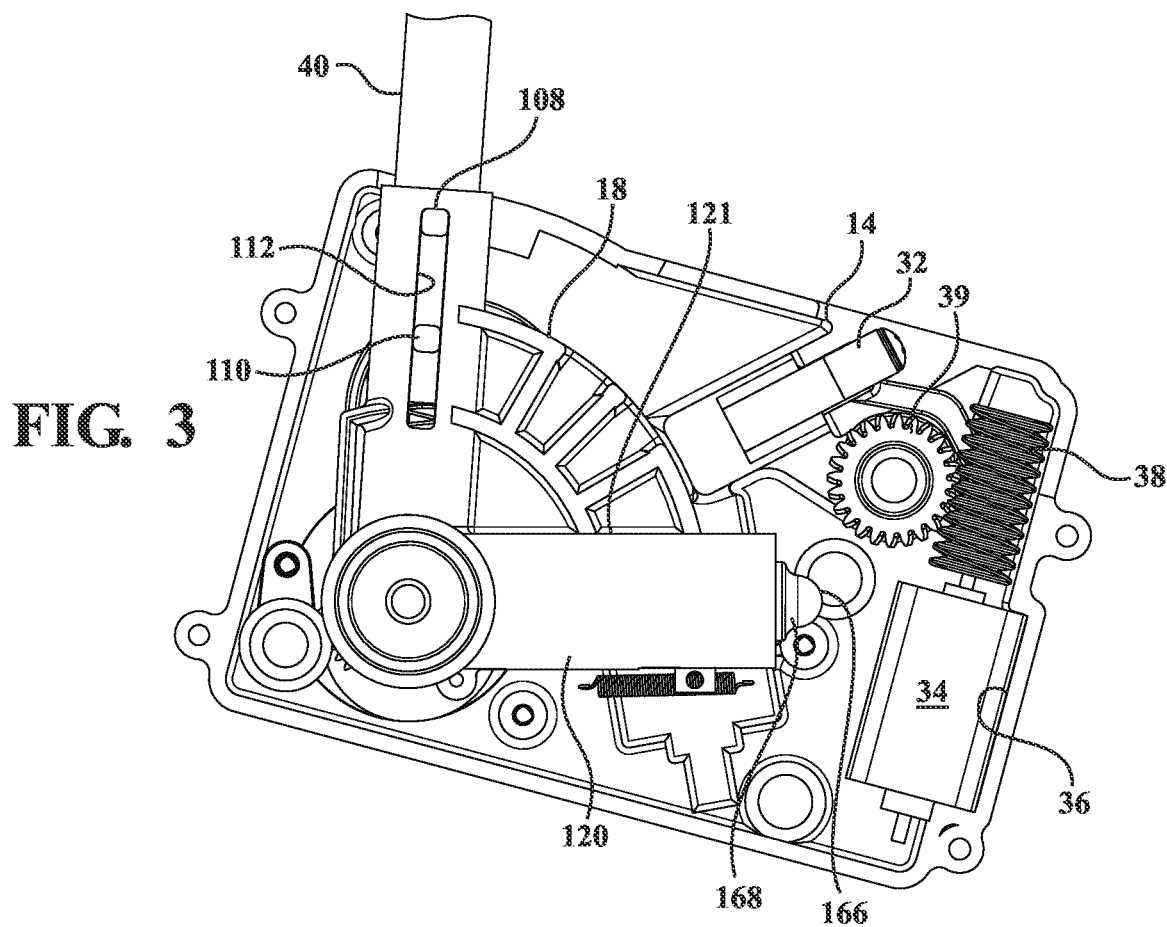
FIG. 3 is a partially assembled perspective view of the motor and gear assembly, lock cam and plungers within the left hand assembly, the plungers being in engagement with a rotatable base of the shift lever.

Referring to FIG. 3, a partially assembled perspective view is shown of the motor 34 and gear assembly (worm shaft 38 and meshing worm gear configuration 39 formed in the lock cam shaft 28), and left and right plungers (on the right side positioned plunger 32 being shown in plan illustration, with the components are supported within the left hand assembly (see at 12 in FIG. 1), with the plungers being in engagement with a rotatable base of the shift lever 18 as shown.

Figure 4:
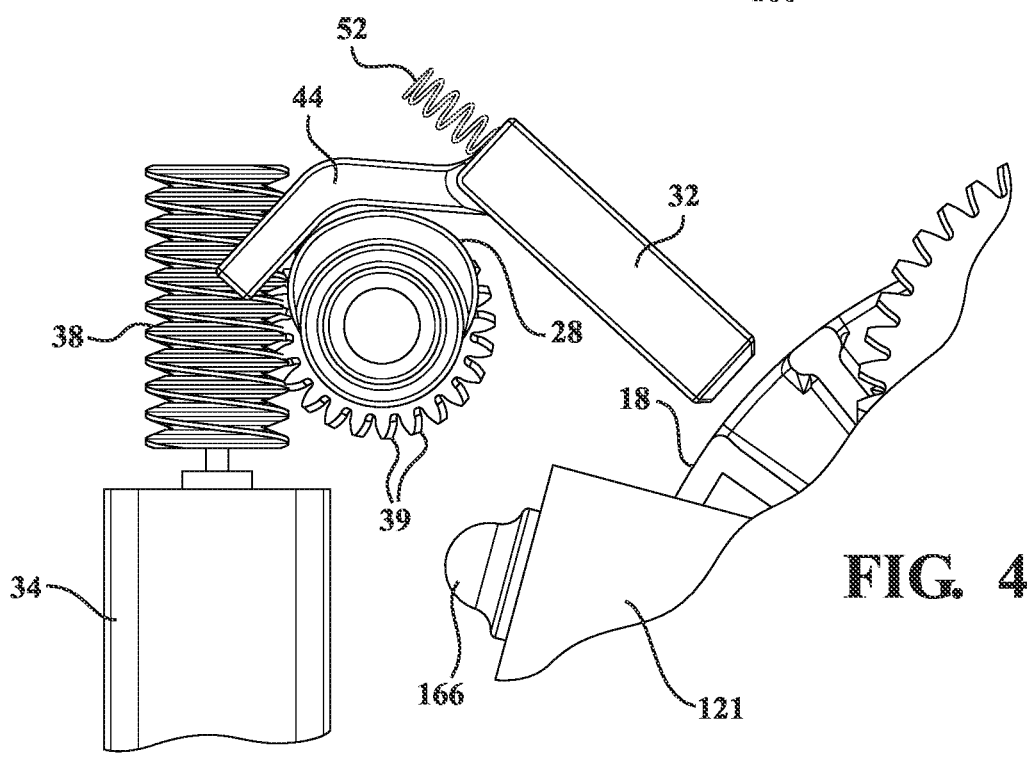
FIG. 4 is a further perspective illustrating the cam interface relationship with the plungers and which, upon rotation of the cam by the motor, results in the cam counter-biasing the spring loaded engagement of the plungers within the matching lock recesses of the shift handle in order to counter-bias retract the plunger out of engagement with the shift lever.

FIG. 4 is a further perspective illustrating the cam interface relationship with the plungers (left 30 and right 32) and which, upon rotation of the lock cam shaft 28 and associated worm gear threads 39 by the motor 34 and worm gear 38, results in the cam shaft 28 counter-biasing the spring loaded engagement of the plungers (see springs 50 and 52 positioned in alignment with the matching lock recesses of the shift handle) in order to counter-bias retract the plungers 30/32 out of engagement with the shift lever.

Figure 10:
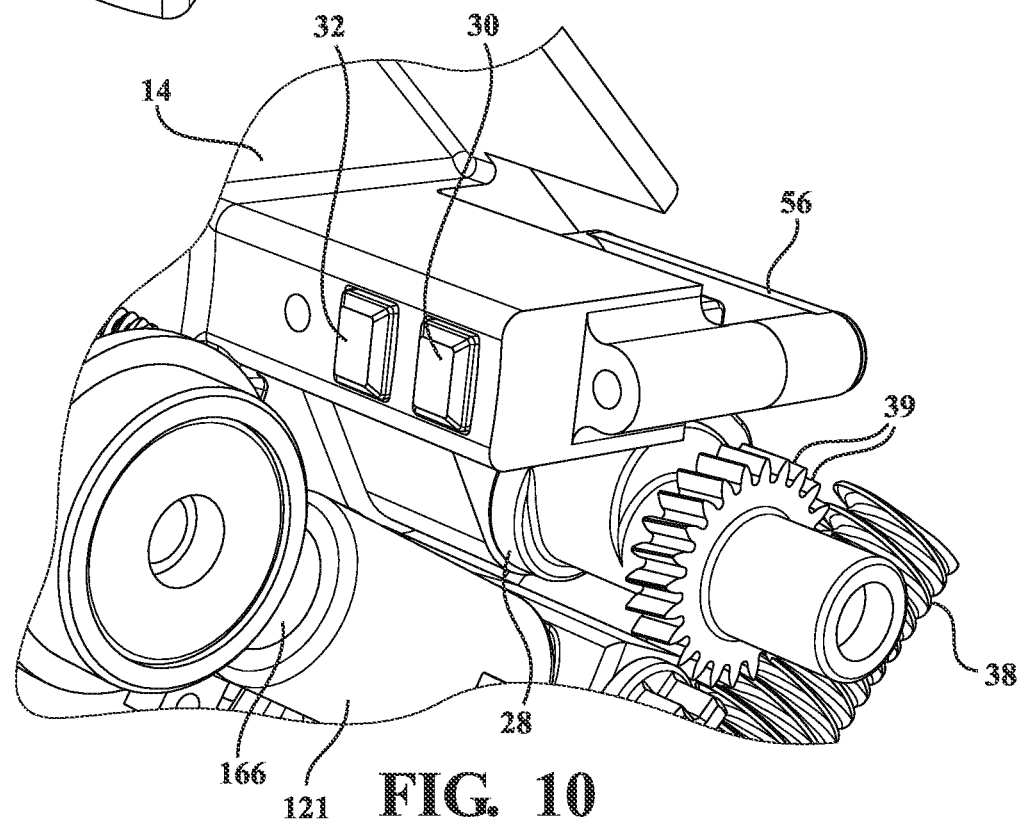
FIG. 10 provides a further sectional perspective illustrating the manner in which the plungers are displace-ably supported within the right hand housing relative to the shift lever or handle and for actuation by the cam.

Also depicted in FIG. 1 are lock plunger cover screws 54 which secure proximately located lock plunger cover 56 also depicted in FIG. 1 to the right housing 14 as best depicted in FIG. 10 for biasingly and displace-ably mounting the plungers 30/32 and associated springs 50/52 within the housing in opposing proximity to the central rotating disk 18 of the shift lever and associated shifter position recesses (left side) 22/26 and (right side) 20/24. As previously described, an alternate arrangement (not illustrated) contemplates the plungers 30/32 being spring loaded in a normally disengaged condition relative to the shifter notches, with actuation of the lock cam shaft 28 being required to seat or engage the plungers.

Figure 5:
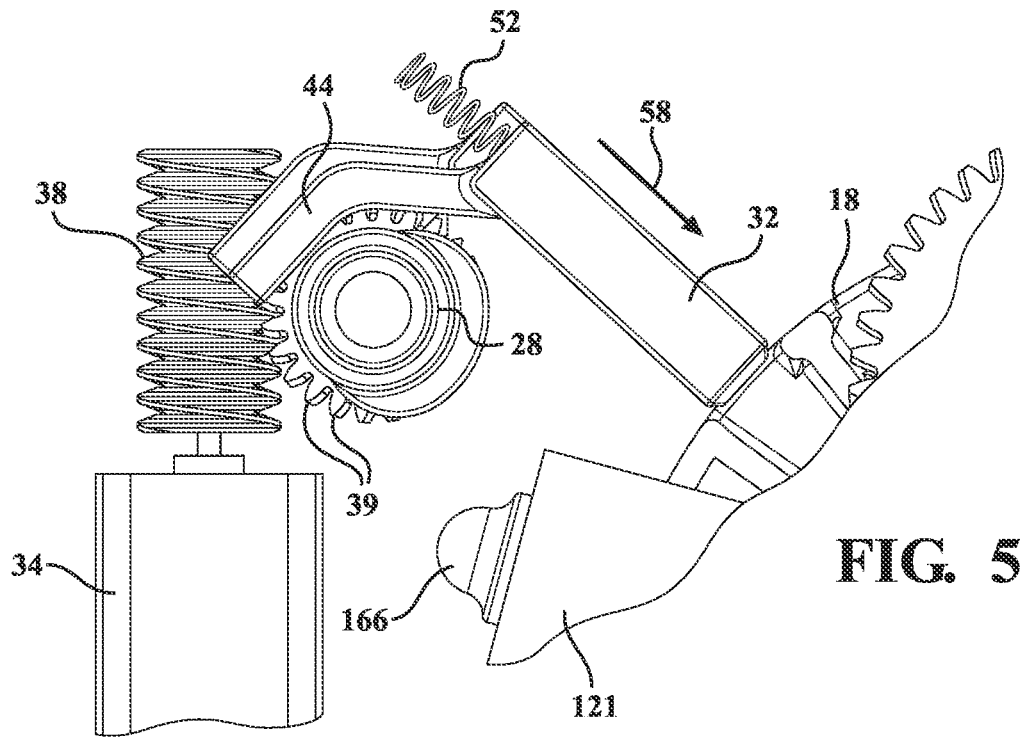
FIG. 5 depicts the interior component of the assembly without the motor and gear, and in order to better show the plungers or lever arms in the locked/engaged position within the mating recesses defined in the shift lever or handle prior to engagement by the cam.

FIG. 5 depicts the interior component of the assembly to better show the plungers or lever arms (a single one being depicted again at 32 corresponding to the Park 20 and Neutral 24 positions) in the locked/engaged position within the mating recesses defined in the shift lever or handle prior to engagement by the lock cam shaft 28. As previously described, the integrated boomerang shaped projections 42/44 associated with the plungers or lock arms coacts against the eccentric surface of the lock cam shaft 28, and which is depicted in each of FIGS. 5-8. As further shown, the corresponding springs 50/52 bias against a rear edge of the indicated plungers 30/32 in order to bias the same into engaging contact with the selected shifter notch recess.

As shown in FIG. 5, the plungers 30/32 are normally spring biased (see directional arrow 58) into the corresponding recesses configured into the disk shaped base 18 of the shift lever. Proceeding to FIG. 6, a succeeding view to FIG. 5 is shown and depicts the rotation of the lock cam shaft 28 eccentric surface against the plungers (left 30 and right 32), resulting in a counter-biasing and retracting motion (arrow 60) exerted on the plungers in order to disengage from the shift lever 18. As compared to FIG. 5, the lock cam shaft 28 is rotated in either of clockwise or counter-clockwise directions in order to actuate the plungers (again shown at 32) via its boomerang shaped projection 44, and in order to retract the plunger in the unseating direction to clear the surface surrounding the selected notched recesses in the shift lever, at which point the lever can be rotated.

Figure 7:
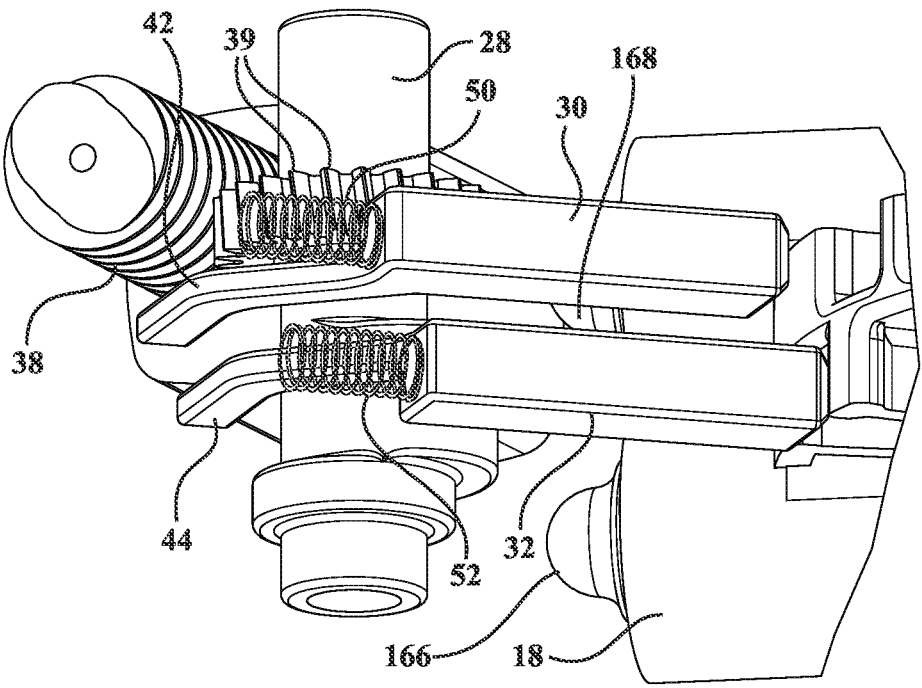
FIG. 7 presents a further rotated view of the dual plunger arrangement shown in combination with stepped recesses configured in the shift lever for mating with the plungers corresponding to given shifter positions.
Figure 8:
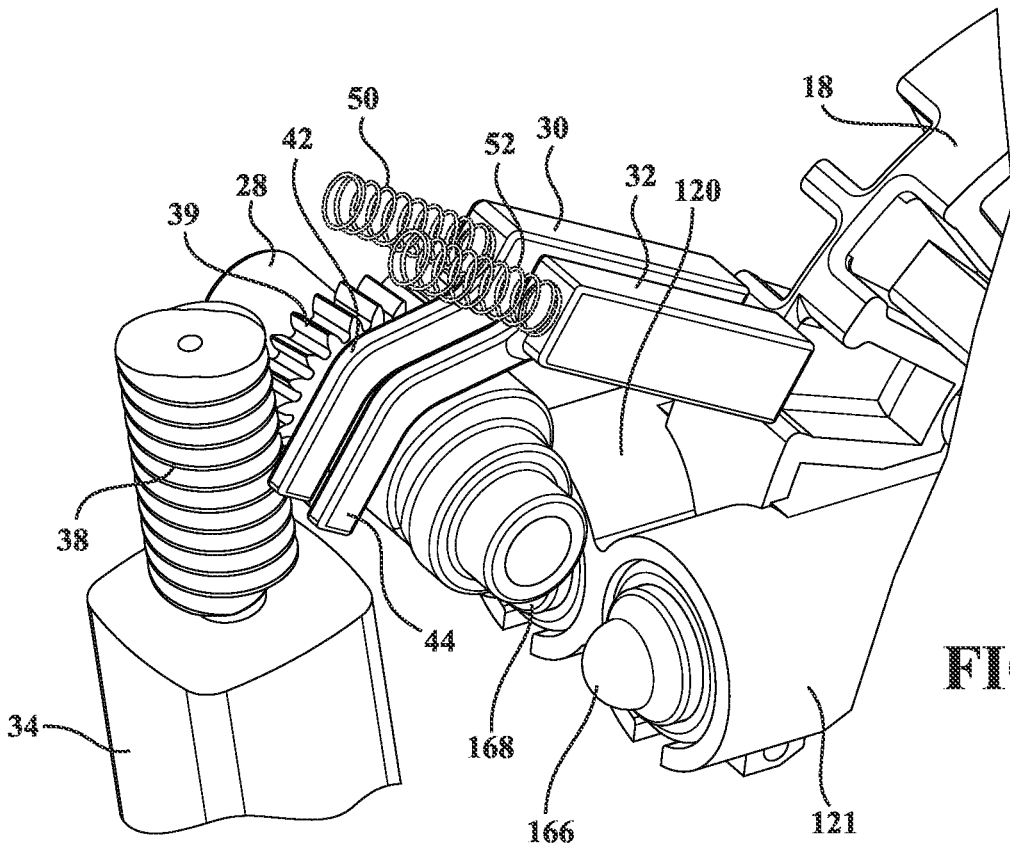
FIG. 8 is a substantial repeat of FIG. 7 and better showing cam interface position of FIG. 6 for retracting the plungers out of spring biased engagement within the mating recesses configured into the shift lever or handle.

FIG. 7 presents a further rotated view of the dual plunger arrangement 30 and 32 shown in combination with the offset stepped recesses (again Park 20 and Neutral 24 for plunger 32 and Reverse 22 and Drive 26 for plunger 30), again configured in the shift lever for mating with the plungers corresponding to given shifter positions. FIG. 8 is a substantial repeat of FIG. 7 and better showing lock cam shaft 28 position for retracting the plungers 30/32 out of spring biased engagement within the mating recesses configured into the shift lever or handle.

FIG. 9 again presents a further illustration with the plungers or lock arms removed and better showing recessed notches in the shifter lever, again corresponding to each of Park (20), Reverse (22), Neutral (24) and Drive (26) positions. FIG. 10 provides a further sectional perspective illustrating the manner in which the plungers 30/32 are displaceably supported within the left hand housing 12, these further referenced by locating pockets though which displaces the plungers relative to the shift lever or handle, again upon actuation by the lock cam shaft 28. FIG. 11 presents a further rotated view illustrating a cam shaft end supported magnet 46 which, in combination with a proximately located PCBA sensor, provides a processor feedback as to a detected position of the lock cam shaft 28.

Referring now to FIG. 12, an assembled view is generally shown at 100 of the gear seeking polystable shifter depicted in exploded fashion in FIG. 1 and incorporating the plunger lock mechanism 10 along with the various shifting, gating and gear seeking mechanisms. Additional components of the shift lever assembly 16 include each of a push rod 102 and push rod spring 104 which are seated with the fixed outer tube 40. Other features include an upper gate pawl 108 and a lower gate pawl retraction pin 110 which are affixed in crosswise extending fashion through lower inserting end locations of the push rod 102.

The outer tube 40 again secures to the rotatable disk shaped base component 18 (see as best shown in FIG. 3) and includes a rectangular window (see closed perimeter defining edge 112) which extends from the lowermost end of the outer tube and adjoining location of the base 18 for seating both the laterally projecting upper gate pawl 108 and lower gate pawl retraction pin 110. Upon depressing an upper projecting button end of the push rod 102 projecting from the outer tube 40, the lower gate pawl retraction pin 110 acts against the push rod spring 104 in order to downwardly displace the upper gate pawl 108 (as will be further described in order to unseat from a top underside gate location configured into the underside of the housing, this further including at least the underside lid of the main left side housing 12 as well as matching gate locations configured into the underside of the right side attachable housing 14 not shown).

Figure 17:
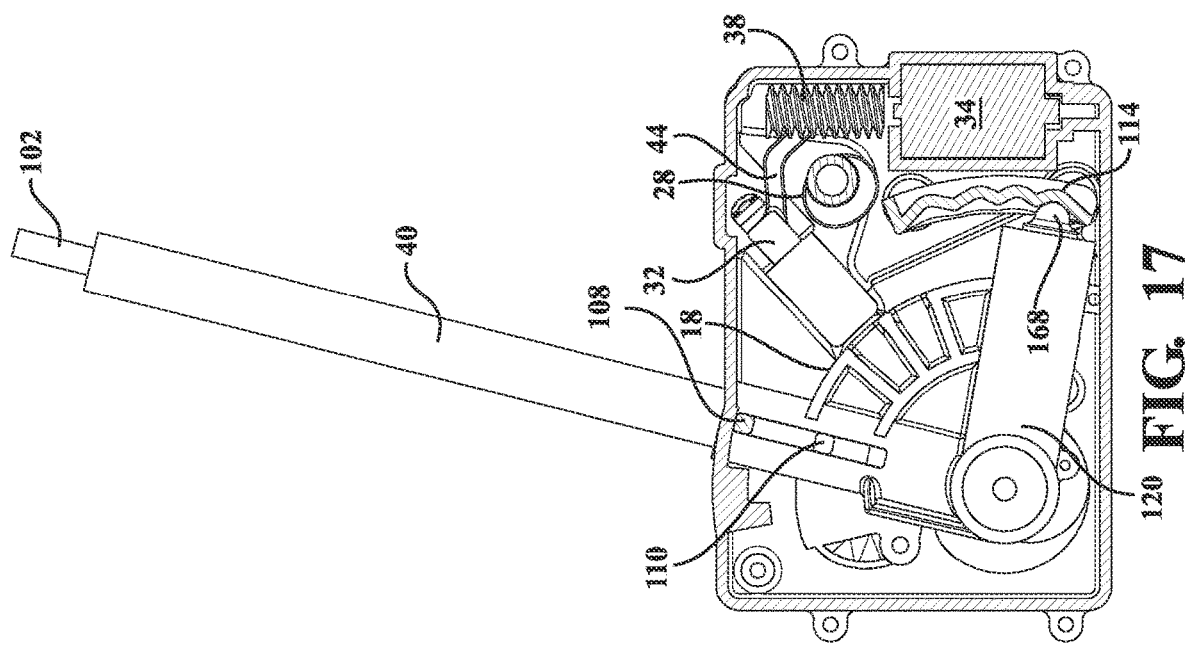
FIG. 17 presents a yet further illustration of the shifter in the Drive position, with no blockage of the gate pawl between the Neutral and Drive positions.

A detent plate 114 exhibits an undulating surface profile is mounted within the assembled left and right side housings and which, when in biased contact with a pair of detent cartridges 116 and 118 (see also FIG. 26) mounted within a pair of perpendicular lower extending integrated portions 120 and 121 of the shifter lever assembly extending from the disk portion 18, assists in haptic engagement of the shift lever gate pawl 108 against the selected underside configured gate location configured in the left 12 and (not shown) right 14 mating housings. These correspond to each of Park gate position 122 (see gear position as depicted in underside gate profile illustration in FIG. 12A as well as shown by corresponding position in FIG. 13), Reverse gate position 124 (see FIG. 12A and FIG. 15), Neutral gate position 126 (FIG. 12A and FIG. 16) and Drive gate position 128 (FIG. 12A and FIG. 17).

Figure 13:
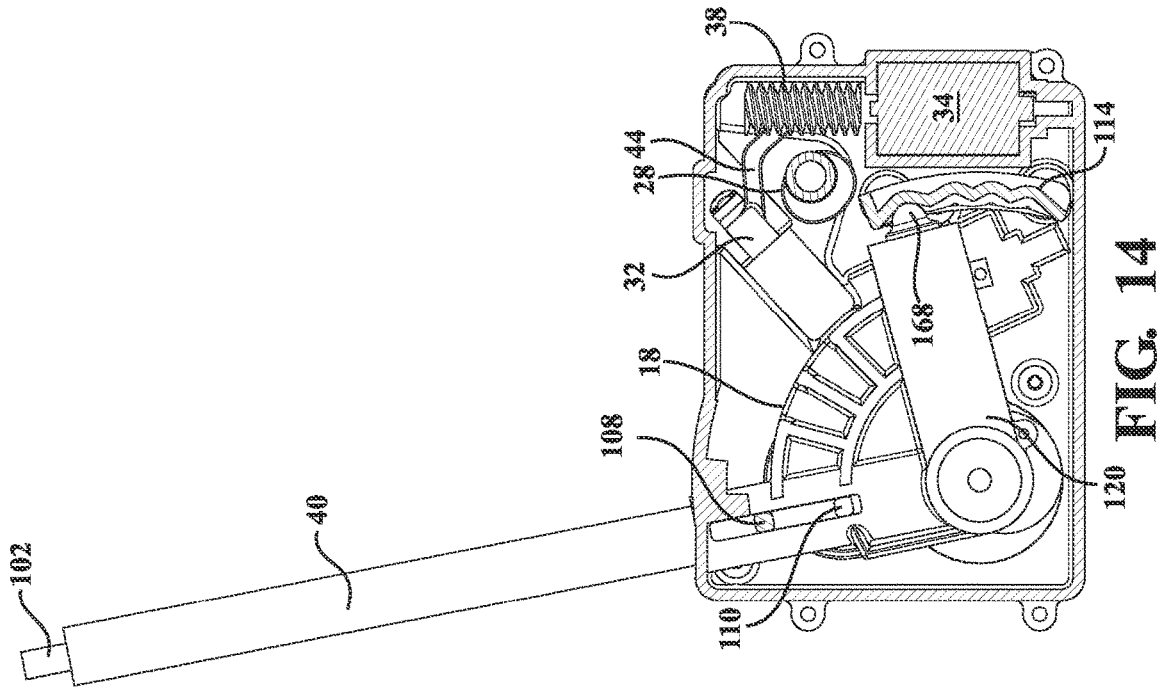
FIG. 13 is a cutaway taken along line 13-13 in FIG. 12 and depicting the shifter in the Park position with the upper gate pawl blocked by the shifter gate.

FIG. 13 is a cutaway taken along line 13-13 in FIG. 12 and depicting the shifter in the Park position with the upper gate pawl blocked by the shifter gate. The gate pawl 108 in this position is connected to the push rod 102.

Figure 14:
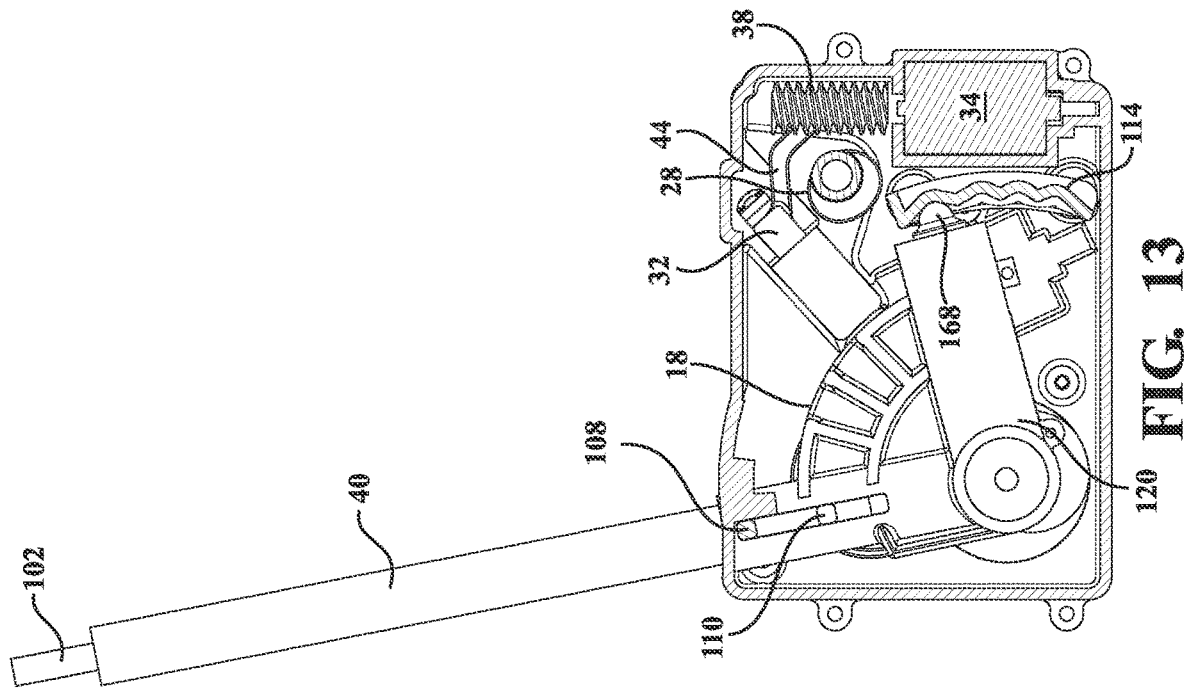
FIG. 14 is a succeeding view to FIG. 13 and showing the shifter in the Park position, with gate pawl not blocked by the gate resulting from the shift knob button being pressed, pushing down on the shift rod so that the gate pawl clears the gate wall.

FIG. 14 is a succeeding view to FIG. 13 and showing the shifter in the Park position, with the gate pawl 108 not blocked by the underside located gate position 122 resulting from the shift knob button being pressed, pushing down on the shift rod 102 so that the gate pawl clears the gate wall.

FIG. 15 is a succeeding view to FIGS. 13-14 with the shift lever 40 rotated to the Reverse position 124, with the gate pawl 108 blocked by the gate wall between the Reverse 124 and Park 122 positions. In this position, the underside gate profile allows or restricts shift lever motion, depending on whether or not the shift button is pressed. The push rod spring 104 biases the push rod outward without depressing the button, forcing the gate pawl 108 to also bias toward the outside of the shifter.

FIG. 16 is a further succeeding cutaway illustration depicting the shifter in the Neutral position, with the gate pawl 108 blocked by the gate wall between the Neutral 126 and Reverse 124 positions. Finally, FIG. 17 presents a yet further illustration of the shifter in the Drive gate position 128, with no blockage of the gate pawl 108 between the Neutral 126 and Drive 128 positions. In each case, the shifting effort is dependent on the profile of the detent plate(s) 114, along with the spring rate of the detent springs 170 (see again FIG. 1). Material differences can also contribute to variation in friction between the detent pawls 166/168 and the detent profile on the detent plates 114, A gear seeking motor 130 with extending worm 132 (see FIG. 1) is provided separate from the cam lock motor 34 with worm 38. The gear motor worm 132 engages an enlarged annular diameter gear profile of a gear seeking worm gear 134 which inter-engages with a circumferential array of gear teeth 136 configured upon a gear seeking cam shaft 138.

Figure 18:
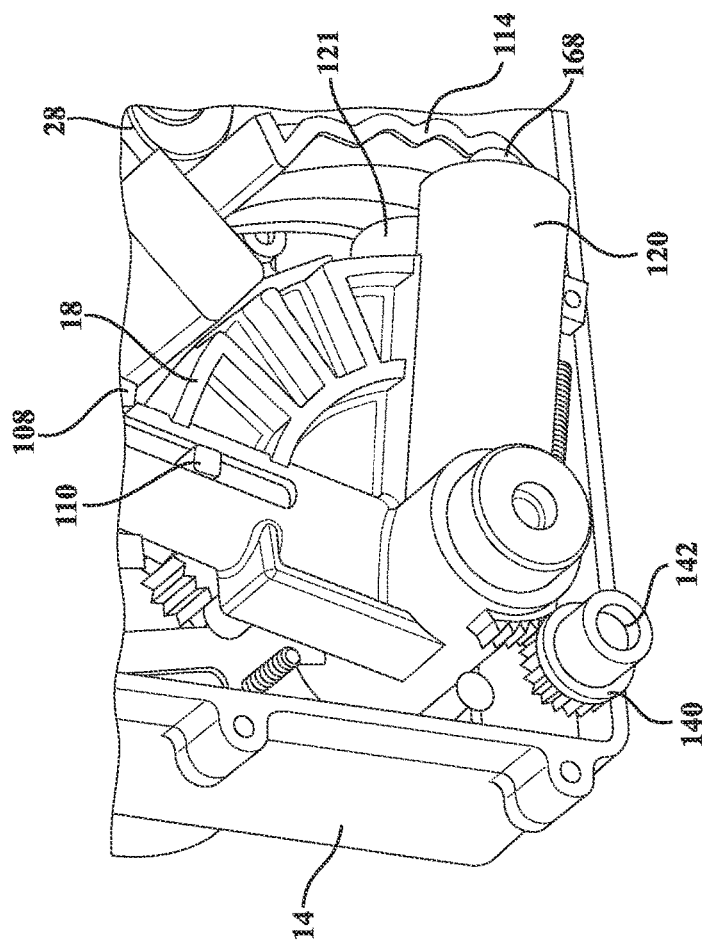
FIGS. 18 and 19 present first and second rotated and cutaway illustrations of a shift position sensing assembly including a sensor gear with an axis supported rotatable magnet positioned over a Hall effect sensor arranged on proximately positioned PCBA for monitoring and communicating the position of the shift lever.
Figure 19:
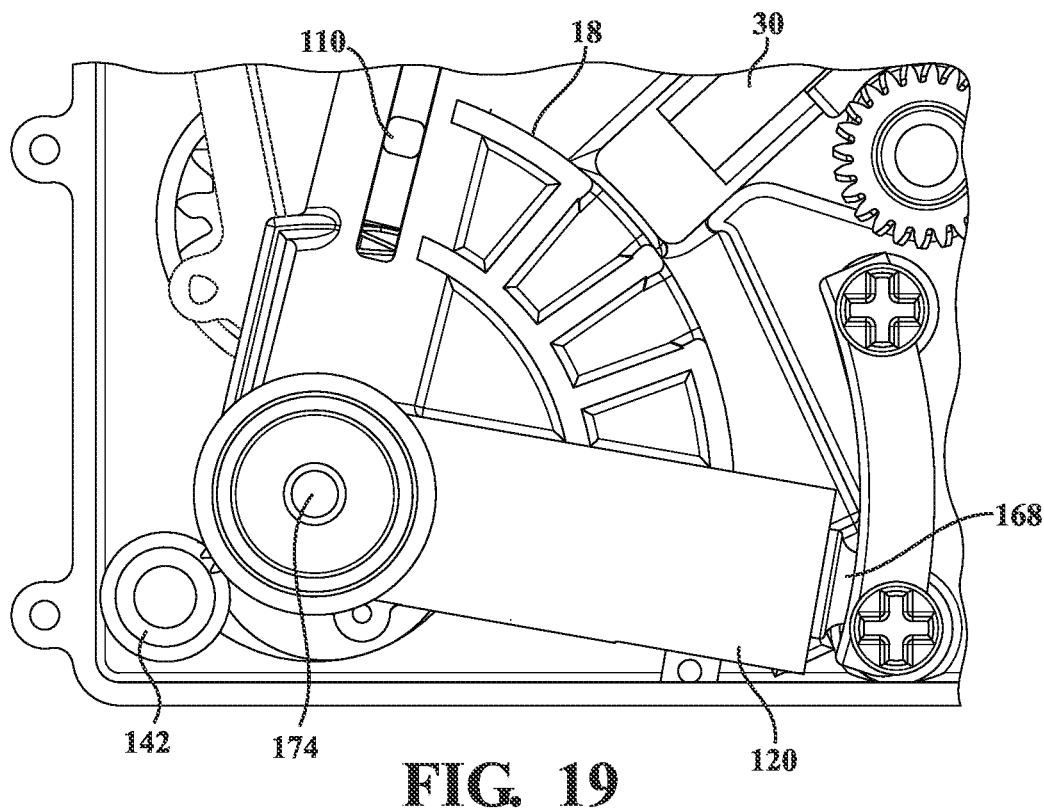

FIGS. 18 and 19 present first and second rotated and cutaway illustrations of a shift position sensing assembly including a sensor gear 140 with an axis supported rotatable magnet 142 positioned over a Hall effect sensor (not shown) arranged on proximately positioned PCBA 48 for monitoring and communicating the position of the shift lever. As the shifter rotates, the sensor gear likewise rotates with the Hall effect sensor on the PCBA 48 monitoring and communicating the position of the shift lever corresponding to a change of voltage read by the sensor.

Additional components referenced in FIG. 1 include a shift axis bushing 144 supporting the cam shaft 138, outer PCBA cover 146 and screws 148 for attaching to the PCBA cover 146 to the left housing 12, enclosing the PCBA 146 within the left housing 12. Securing of the package assembly is further provided at a left exterior with a motor cover 150 and associated screws 152 for securing the motor cover to the right housing at the right exterior of the assembly.

Other features shown in FIG. 1 (further described below) include each of a gate pawl retraction gear cover 154 and associated screws 156, shift position gear cover 158, gate pawl retraction spur gear 160, shift position gear cover screw 162 and gate pawl retraction rack 164. Additional features include a pair of detent pawls 166 and 168 which seat within the outer housings 116 and 118 of the pair of detent cartridges. Also shown in FIG. 1 are pairs of each of detent springs 170 and extension springs 172 arranged at opposite ends of the detent pawls 166/168.

A description will now be made as to the gear seeking functionality which is performed based on a vehicle or transmission command (such as from an ECU unit). In order to gear seek, the shifter must have the ability to perform the action when commanded. Example conditions for vehicle commanded gear seeking includes, without limitation, autonomous driving modes such as parallel parking which require the shifter gear position to mirror the transmission gear position during the autonomous parking operation.

Also, and in the instance of transmission problems. The vehicle may command the shifter to move to a safe state, such as Park or Neutral gear.

Other considerations include the customer preferring that no detent sounds are heard during gear seeking. As such, the detent pawl and detent plate interface must either move together, be disconnected from one another or remain stationary while the shifter lever rotates to the commanded position. In the present invention, the detent pawls 166/168 are retracted by the profile of the gear seeking cam shaft 138 interfacing the features on the extension springs 172 loaded detent pawl cartridges, and which when rotated allows room for the pawls to be pulled inward by the extension spring force (with reference again to FIG. 26 below), for retracting the pawls so that they do not interface with the detent profile, with no shift/bump sound as the shift lever rotates between the positions.

The physical gating mechanism prevents shifting without the shift knob button being depressed, with a means to override this gating also being provided. The cam profile on the gear seeking cam shaft 138 is also used to interact the rack/gear system as further described in FIGS. 34-39, and which is in turn coupled to the gate pawl retraction pin 110. In this fashion, and upon rotation of the cam shaft 138, the rack 164 is pushed outward, rotating the gate pawl retraction spur gear 160 which then pulls the pin 110 inward, moving the push rod 102 inward and also moving the gate pawl 108 inward to clear the physical gates (see again FIG. 12A) configured in the left/right assemblable portions 12/14 of the shifter housing.

The shift lever is further held in position utilizing the lock mechanism previously described to allow the gear seeking motor system to rotate the gear seeking cam shaft 138, retracting the detent pawls 166/168 and the gate pawl 108. When the locks are released, the gear seeking motor 130 continues to rotate the worm 132 and move the shift lever to the commanded position which, once found, dispenses with the need for further autonomous commands. At this point, the lock plunger 30/32 is engaged into whichever gear the lever is positioned relative to, and the cam shaft 138 is rotated to reset the engagement of the gate pawl 108 and detent pawls 166/168, thereby ending the gear seeking operation and restoring standard shift functionality.

Figure 20:
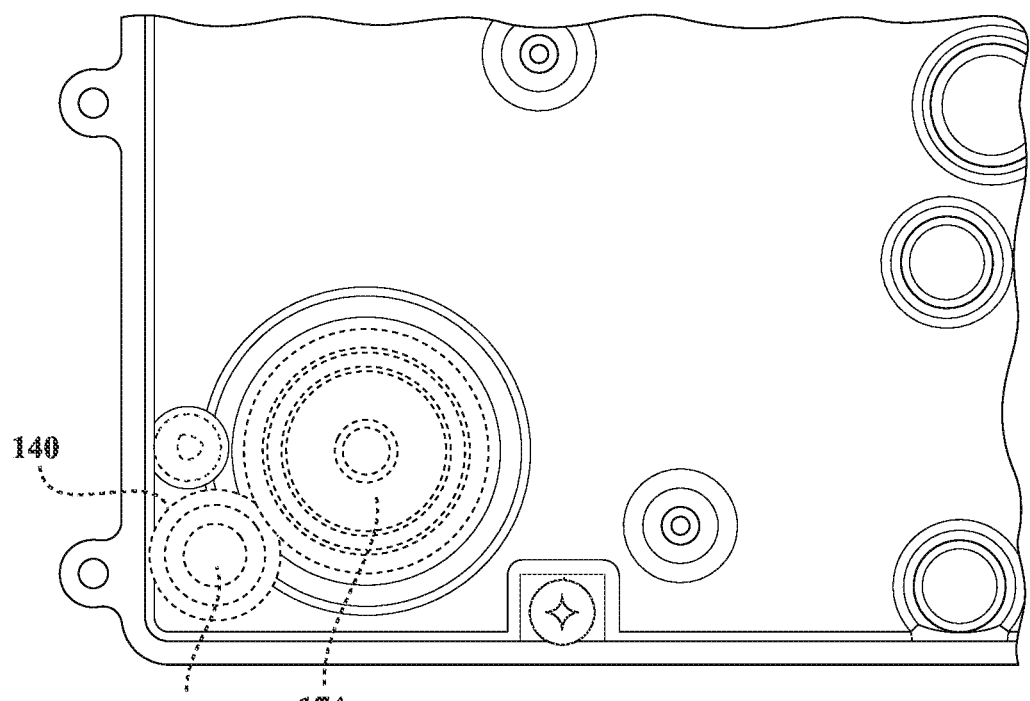
FIG. 20 is an illustration of the gear seeking shifter mechanism similar to FIG. 19 and, in combination with succeeding FIG. 21, further depicting a gear seeking cam shaft having an end positioned magnet additional to that included with the sensor gear and located over a hall effect sensor located on the PCBA for monitoring and providing positioning of the cam shaft for coordinating motor activity for pawl retracting/reset operations.
Figure 21:
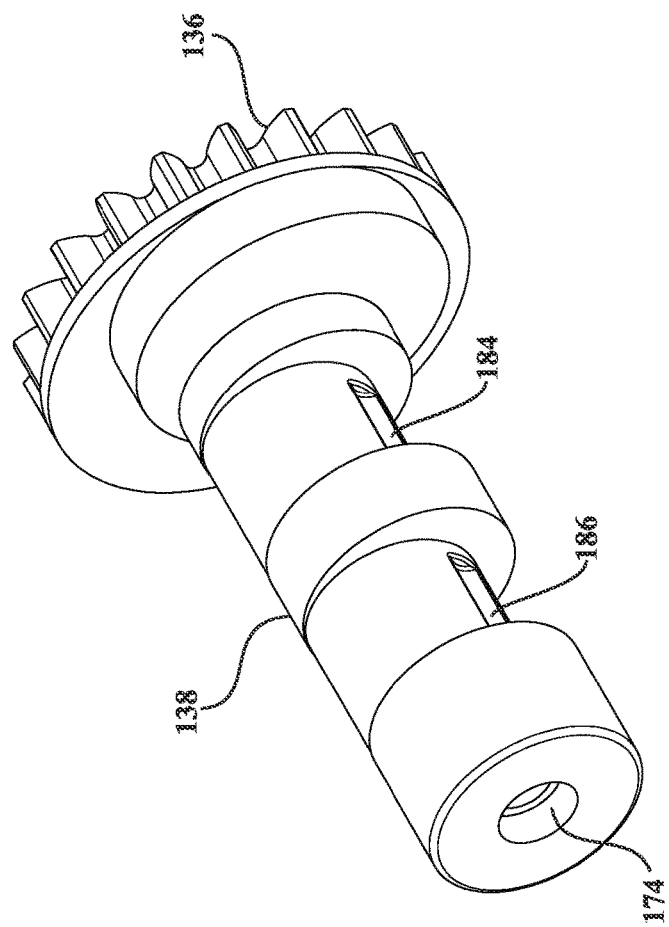

Proceeding now to FIG. 20, an illustration is provided of the gear seeking shifter mechanism similar to FIG. 19 and, in combination with succeeding FIG. 21, further depicting the gear seeking cam shaft 138 having an end positioned magnet 174 additional to that included with the sensor gear (previously at 142 in FIG. 18) and located over a Hall effect sensor located on the PCBA 48 for monitoring and providing positioning of the cam shaft 138 for coordinating motor activity for pawl retracting/reset operations. The shift lever assembly has a through hole in the center rotation axis, where the gear seeking CAM shaft 138 is inserted.

Figure 22:
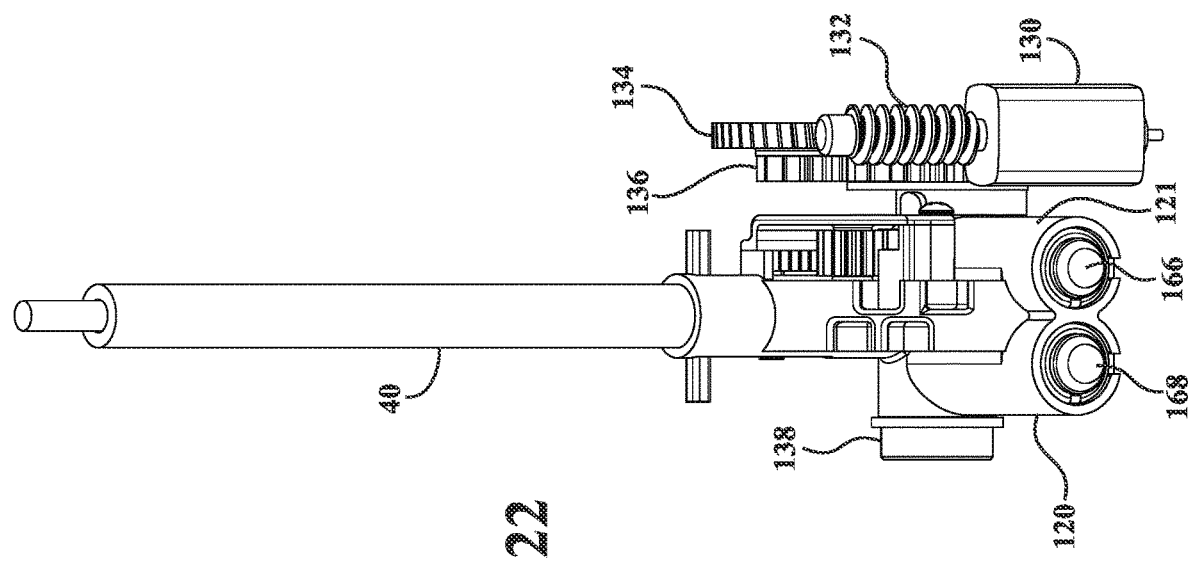
FIG. 22 is a frontal perspective of the shift lever assembly and gear seeking cam shaft components shown in FIG. 1.

FIG. 22 is a frontal perspective of the shift lever assembly and gear seeking cam shaft components shown in FIG. 1, with FIG. 23 providing a subset exploded view of the gear seeking detent cartridges (also previously shown at 116 and 118 in FIG. 1) which are integrated into the subset housing portions 120/121 and which support the biased pawls 166/168, as well as again showing the detent springs 170, and the detent pawls 166/168 (generally also seen in the assemblies of FIGS. 25-26 as well as the sectional view of FIG. 24). This is in order to provide resistance for shifting the shift lever.

Also shown are the extension springs 172 which, as better shown in FIG. 26, seat within detent cartridge holes (see further at 176 and 178). Potential redesigns are also envisioned to include, without limitation, eliminating the extension springs and replacing with a compression spring (not shown) which would sit inside the shift lever double barrels and push the detent housing toward the CAM shaft 138 (this would further eliminate the slots in the shift lever barrels, along with the tabs 176/178).

FIG. 24 is a length cutaway of a selected detent cartridge shown in FIG. 23 and better depicting the configuration of the spring and pawl components loaded into the detent housing. FIG. 25 depicts another rotated and exploded perspective of the pair of detent cartridges, also as shown in FIG. 23. FIG. 26 provides a reverse rotated perspective of the detent cartridges in FIG. 25, and by which the spring loaded pawl is shown retained in the detent housing by physical restriction, which includes inserting the pawl 166/168 and compressing the spring 170, quarter turning the pawl, and subsequently releasing the pawl to allow a side projecting tab portion (at 180 and 182) thereof to seat within a defined keyway location (see further at 184 and 186) of the detent housing.

Figure 27:
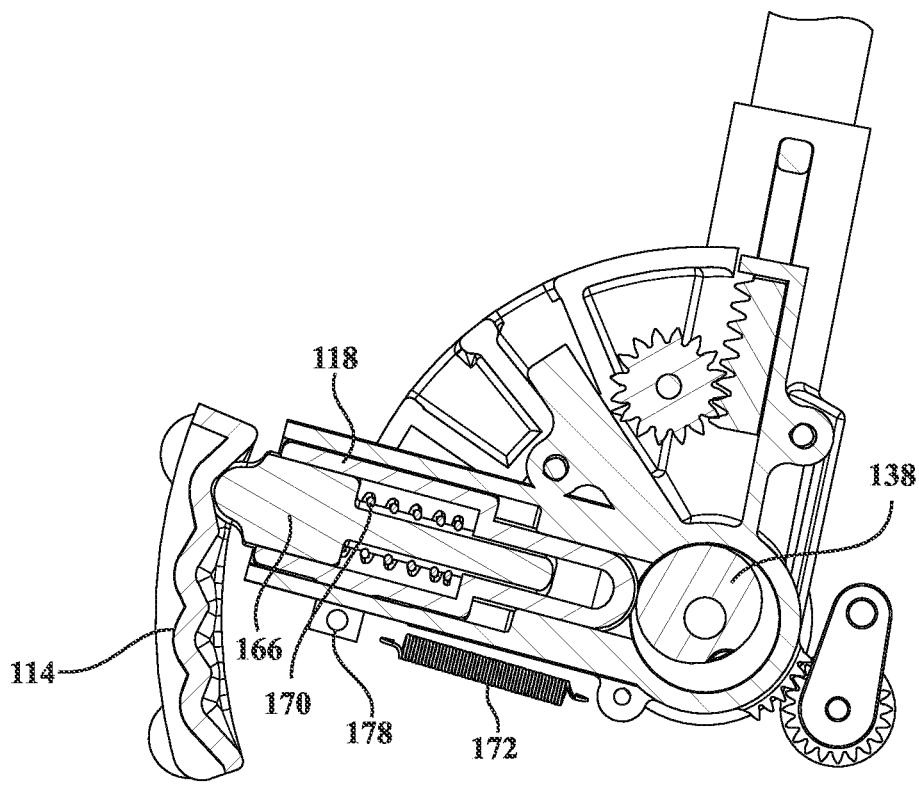
FIG. 27 provides an interior cutaway depicting the detent cartridge biased against the eccentric profile of the gear seeking cam shaft and, depending upon the rotational position of the cam shaft, either seating against or retracting away from the opposing detent profile configured on the interior of the housing.

FIG. 27 provides an interior cutaway depicting the detent cartridge biased against the eccentric profile of the gear seeking cam shaft 138 and, depending upon the rotational position of the cam shaft, either seating against or retracting away from the opposing detent profile configured on the interior of the housing.

Figure 28:
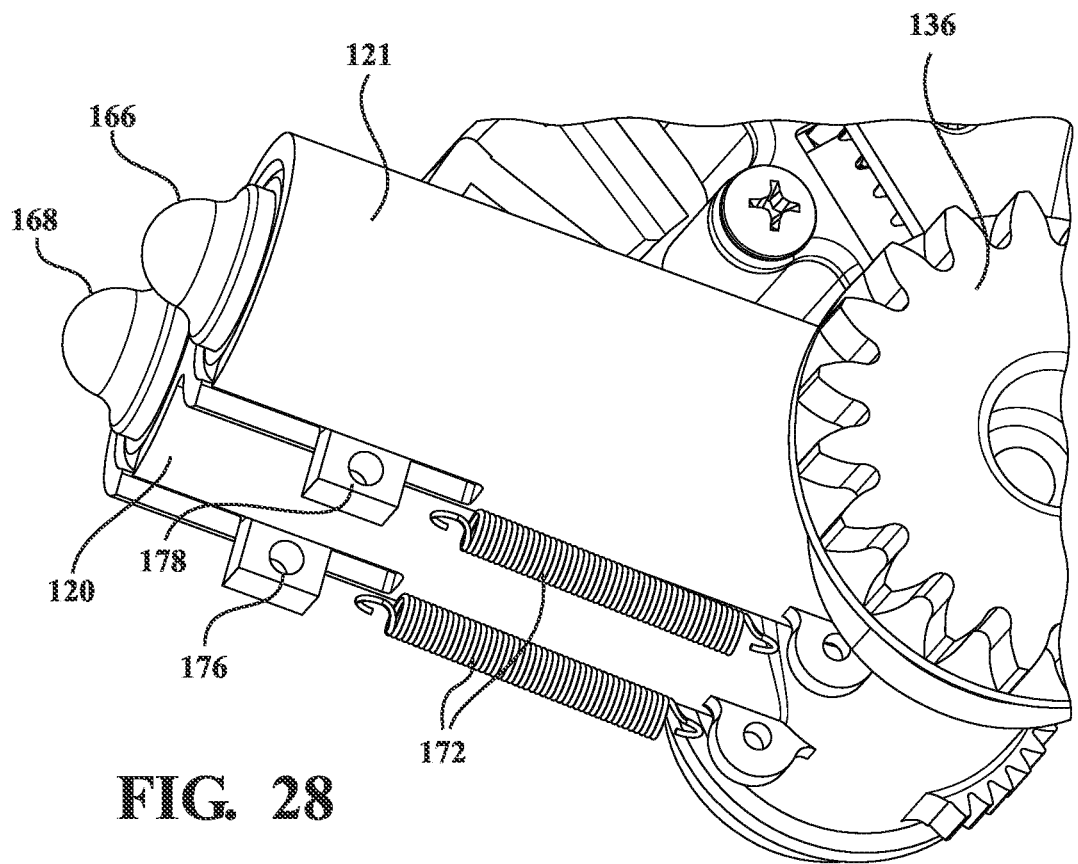
FIG. 28 is a further partially assembled perspective showing the cartridges inserted into the shift lever assembly, then connected to the extension springs to bias the cartridges toward the of the shift axis in order to press against the gear seeking cam shaft in the manner shown in FIG. 27.

FIG. 28 is a further partially assembled perspective showing the pawls 166/168 (along with the supporting cartridges 116/118 depicted in FIG. 1) inserted into the shift lever assembly, then connected to the extension springs 172 to bias the cartridges toward the of the shift axis in order to press against the gear seeking cam shaft 138 in the manner shown in FIG. 27.

Figure 30:
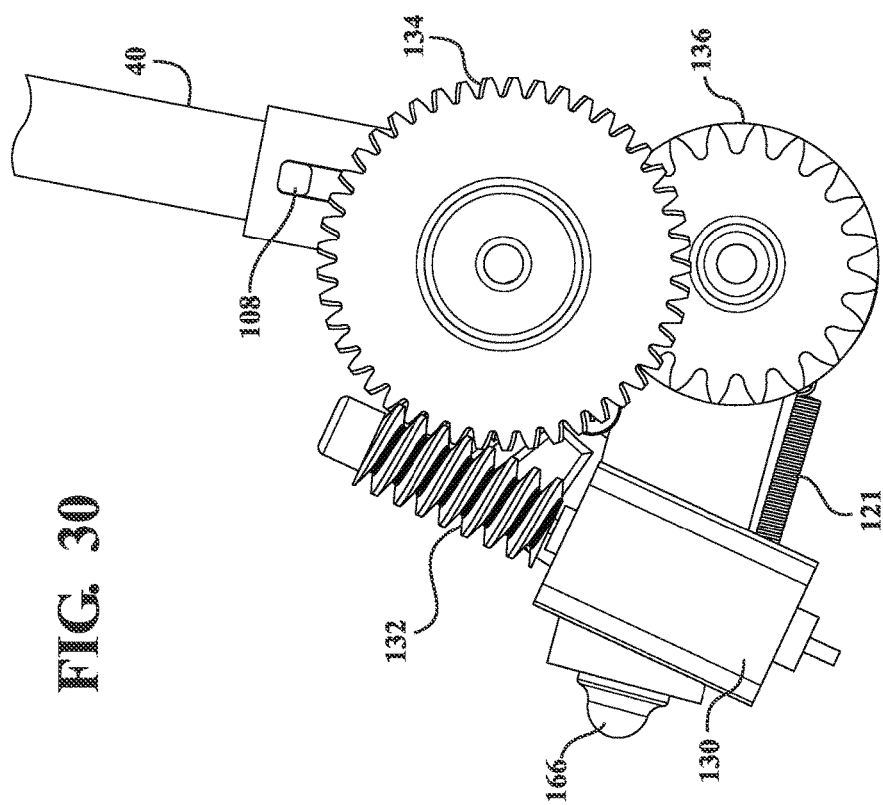
Figure 29:
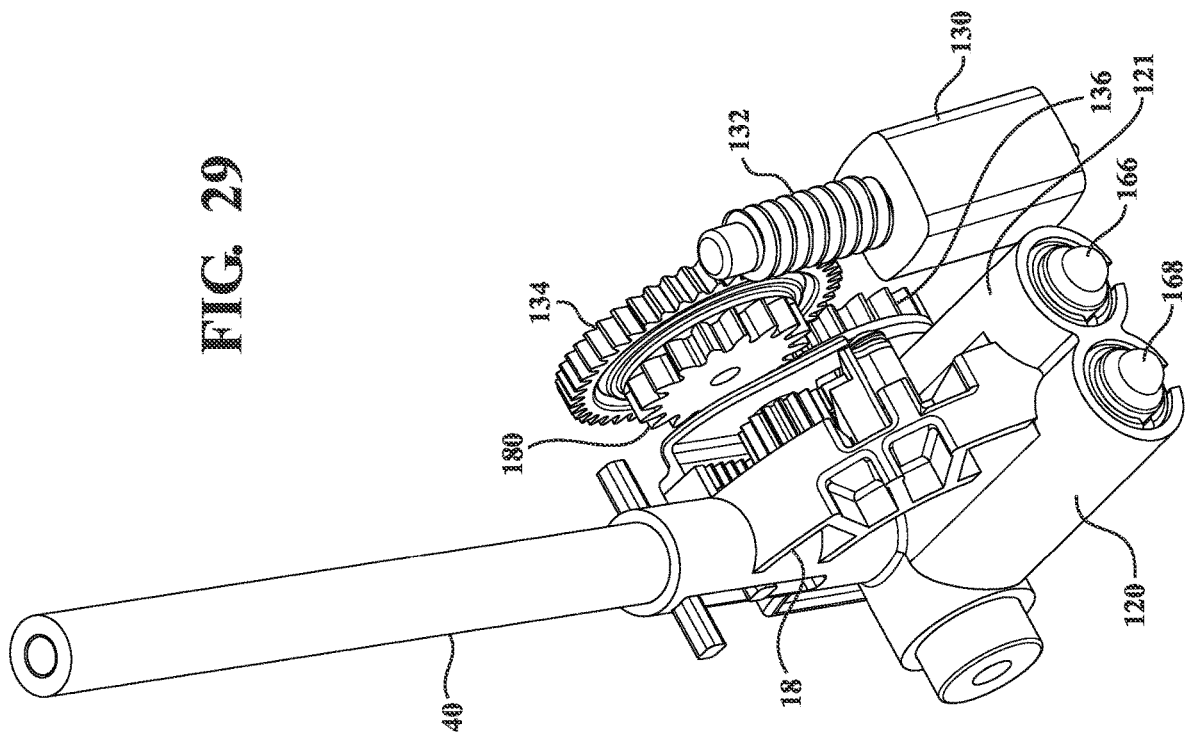
FIG. 29 is a partially rotated perspective of the shift lever assembly and gear seeking cam shaft components also in FIG. 22 and, in combination with the end plan view of FIG. 30, depicting the inter-engagement of the cam shaft connected to the gear seeking worm gear, the latter having a spur gear profile at one end which interfaces with the cam shaft, with a worm gear profile located on a large outer diameter end which interfaces with the worm on the gear seeking motor assembly and such that, upon the motor being activated, the gear seeking worm is rotated to in turn rotate the cam shaft in either rotational direction.

FIG. 29 is a partially rotated perspective of the shift lever assembly and gear seeking cam shaft 138 components also in FIG. 22 and, in combination with the end plan view of FIG. 30, depicting the inter-engagement of the cam shaft 138 connected to the gear seeking worm gear 134, the latter having a spur gear profile (see at 180 in FIG. 29) at one end which interfaces with the large diameter gear profile 136 located on a large outer diameter of the cam shaft 138. The worm gear also includes a larger diameter profile (again shown at 134) in worm gear engagement with the gear seeking worm 132 such that, upon the motor being activated, the gear seeking worm gear 134 is rotated to in turn rotate the cam shaft 138 in either rotational direction.

FIG. 31 is a side plan view of the cam shaft 138 which exhibits both first (also at 180 in FIG. 32) and second (also at 182 in FIG. 33) circumferential and eccentric profiles, these further referenced at each of first cutaway 32-32 for FIG. 32 and second cutaway 33-33 for FIG. 33. The first cutaway interacting with the gate pawl retraction pin 110 to pull the push rod/gate pawl 108 inward to clear the shifter position gates (122, 124, 126, 128), with the second cutaway interacting with the detent pawls 166/168 (supported within the cartridges 116/118 in FIG. 1). The cam profiles 180/182 as further shown including valleys, see at 184 and 186, to receive the detent cartridges and to provide resistance between the shift lever/detent cartridge and the cam shaft 138 to allow the shift lever to move to the position being commanded.

FIGS. 34 and 35 provide largely overlapping views of detent pawls 166/168, cartridges 116/118, cam 138, rack 164, gate pawl 108, gate pawl retraction spur gear 160 and gate retraction pin 110.

Figure 36:
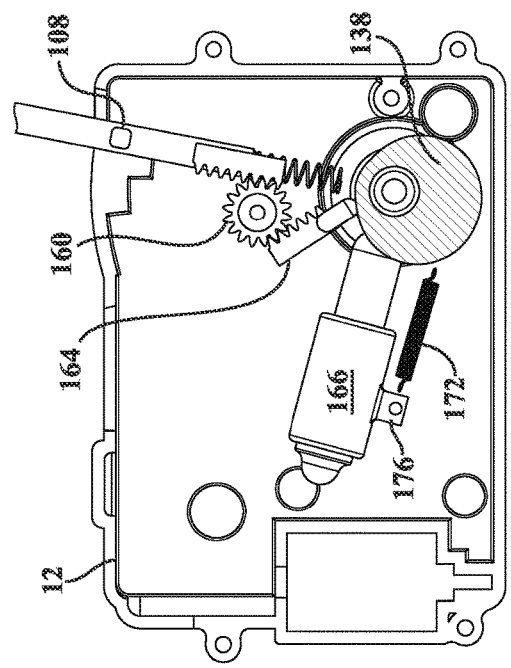
FIG. 36 is an illustration of the components of FIGS. 34-35 positioned within the left side housing and depicting a gate pawl interface condition with the cam shaft in which the gear seeking cam shaft is in a standard operating position (normal shift function) and with the rack down, the gate retraction pin up and the gate pawl in an engaged position.

FIG. 36 is an illustration of the components of FIGS. 34-35 positioned within the left side housing 12 and depicting a gate pawl 108 interface condition with the cam shaft 138 in which the gear seeking cam shaft is in a standard operating position (normal shift function) and with the rack 164 down, the gate retraction pin 110 up and the gate pawl 108 in an engaged position.

Figure 37:
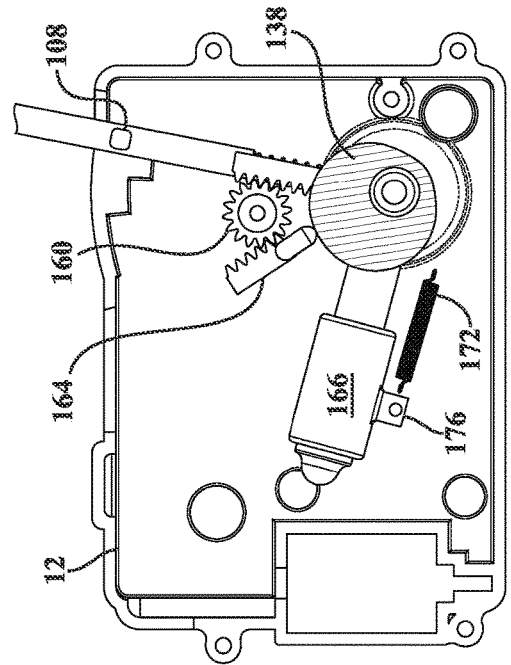
FIG. 37 is a succeeding illustration to FIG. 36 and showing the gear seeking cam shaft in position with the detent cartridge and gate pawl retracted and the gate retraction pin down.

FIG. 37 is a succeeding illustration to FIG. 36 and showing the gear seeking cam shaft 138 in position with the detent cartridge and gate pawl 108 retracted and the gate retraction pin 110 down.

Figure 38:
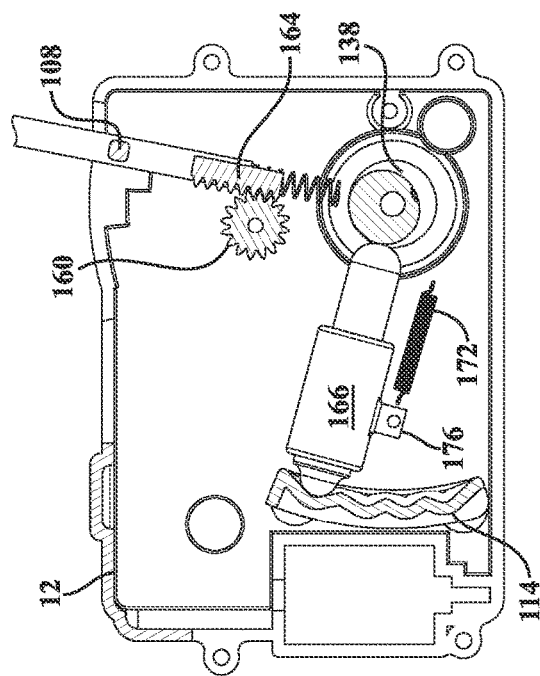
FIG. 38 is a further succeeding illustration showing the detent housing (cartridge) interface condition established with the cam shaft and in which the detent pawl is engaged with the inner detent plate, corresponding to the cartridges being forced by the cam shaft profile in a direction toward the detent plate.

FIG. 38 is a further succeeding illustration showing the detent housing interface condition established with the cam shaft 138 and in which the detent pawl (166/168) is engaged with the inner detent plate 114, corresponding to the cartridges being forced by the cam shaft profile in a direction toward the detent plate.

Figure 39:
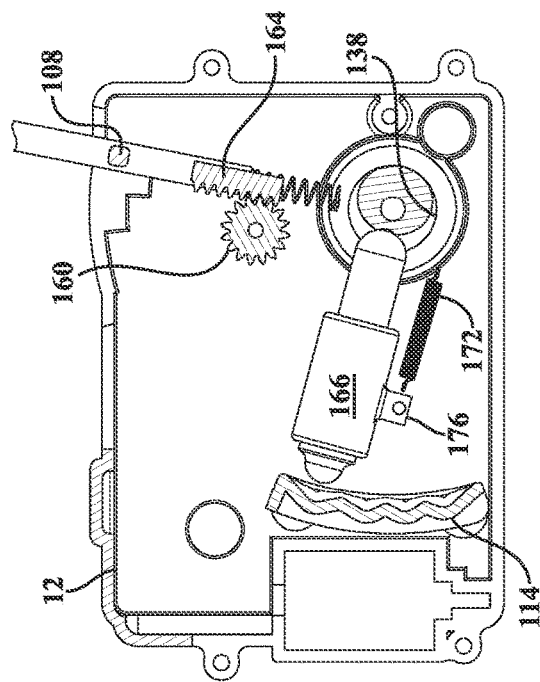
FIG. 39 provides a further succeeding illustration of the detent pawl disengaged from the detent plate and by which the cartridge is allowed to pull back when the cam shaft is rotated, at which point the extension spring pulls back the cartridge back toward the cam shaft and so that the inside tip of the cartridge seats within the valley location defined in the shaft in order to provide resistance for shift lever movement.

FIG. 39 provides a further succeeding illustration of the detent pawls disengaged from the detent plate 114 and by which the cartridge is allowed to pull back when the cam shaft 138 is rotated, at which point the extension springs 172 pull back the cartridges toward the cam shaft 138, and so that the inside tip of the cartridges seat within the valley locations 184 and 186 defined in the shaft 186 (again as best shown in FIG. 31) in order to provide resistance for shift lever movement.

Figure 40:
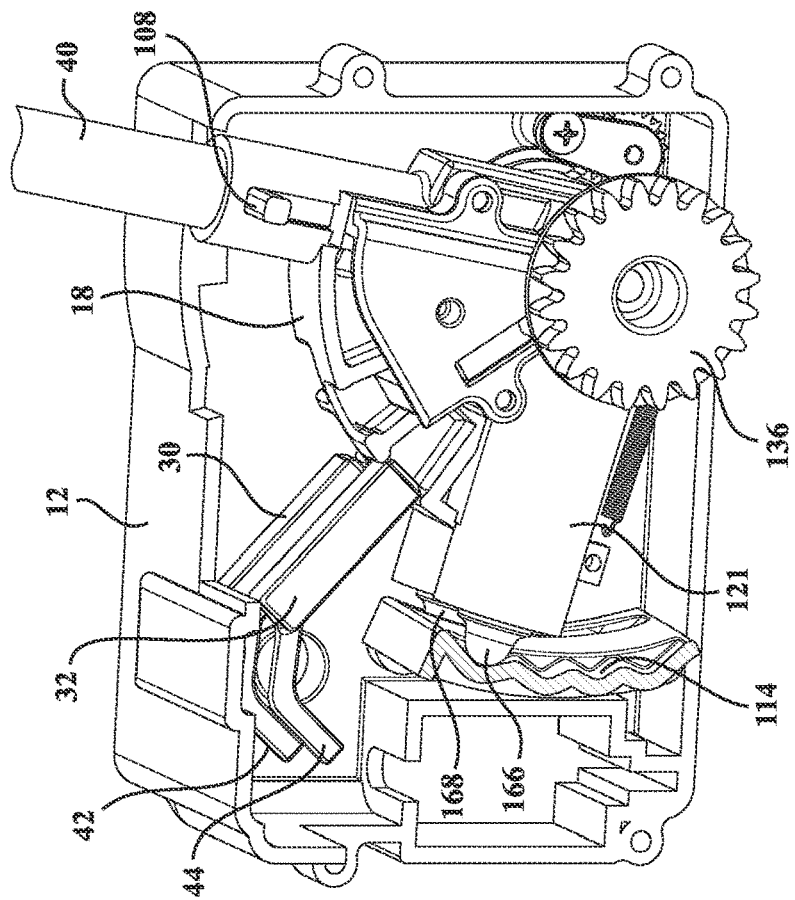
FIG. 40 is an illustration similar to that depicted in FIGS. 36-39 and depicting the shifter base of the gear seeking shifter assembly, corresponding to that previously depicted in FIG. 13, and showing the detent pawls engaged to the detent plate, the right plunger lock engaged in the Park position, the left plunger lock resting on the outer diameter of the shift lever, and the gate pawl in outward engaged positions along with the spring loaded and cam actuated plungers engaged to the shifter to lock the shift lever.

FIG. 40 is an illustration similar to that depicted in FIGS. 36-39 and depicting the shifter base 18 of the gear seeking shifter assembly, corresponding to that previously depicted in FIG. 13, and showing the detent pawls 166/168 engaged to the detent plate, the right plunger lock 32 engaged in the Park position, the left plunger lock 30 resting on the outer diameter of the shift lever 18, and the gate pawl 108 in outward engaged positions along with the spring loaded and cam actuated plungers engaged to the shifter to lock the shift lever 40.

Figure 41:
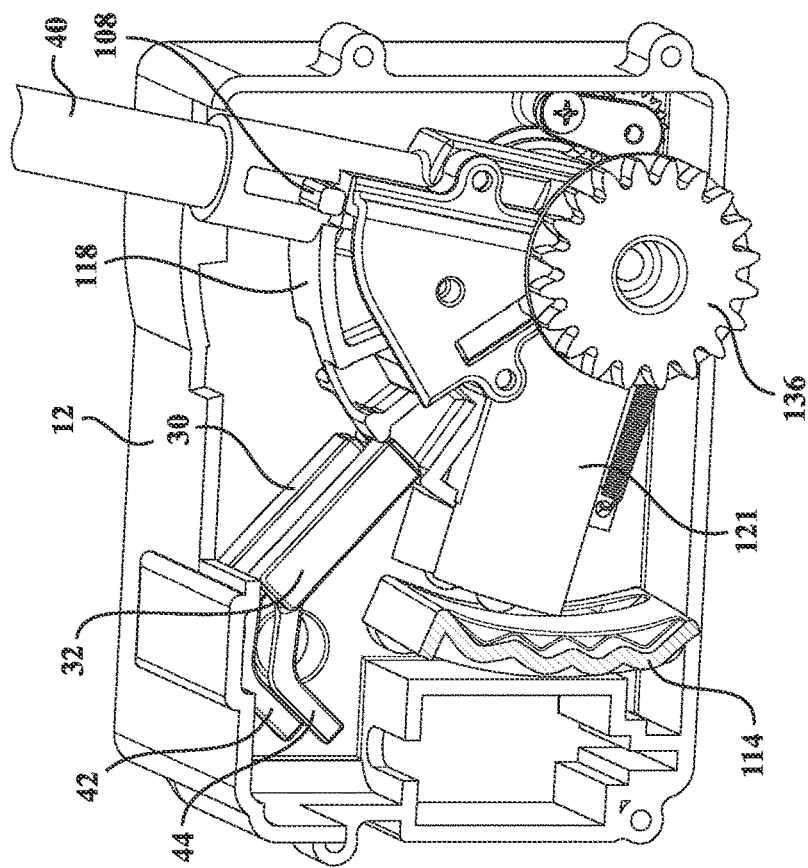
FIG. 41 is an illustration and by which the gear seeking motor is actuated and the cam shaft rotated to retract the gate and detent pawls, and which, upon the PCBA recognizing that the CAM is in the proper position (through signal from magnet/Hall sensor), deactivates the gear seeking motor with the right plunger lock engaged in the Park position and the left plunger lock resting on the outer diameter of the shift lever.

FIG. 41 is an illustration and by which the gear seeking motor 130 is actuated and the cam shaft 138 rotated to retract the gate 108 and detent 166/168 pawls, and which, upon the PCBA 48 recognizing that the CAM 138 is in the proper position (through signal from magnet/Hall sensor 174), deactivates the gear seeking motor 130 with the right plunger lock 32 engaged in the Park position and the left plunger lock 30 resting on the outer diameter of the shift lever 40.

FIG. 42 succeeds shown in FIG. 41 and, upon the PCBA 48 recognizing the cam shaft 138 being in the proper position (i.e. again through the identified positioning of the magnet relative to the PCBA mounted hall sensor), the gate 108 and detent 166/168 pawls are both retracted (i.e. the detent pawls seat within the cam shaft valleys 184/186) and the gear seeking motor 130 is deactivated, following which the lock motor unlocks the shift lever 40.

FIG. 43 depicts the gear seeking motor 130 again actuated to rotate in either direction, with the right plunger 32 unlocked and left plunger 30 retracted to move the shift lever 40 from a current position to a further position directed by the vehicle transmission/ECU, at which point both the cam shaft 138 and shift lever 40 rotate to the desired position, such as moving from the Park to the Dive position and which, upon the PCBA 48 recognizing that the shift lever is at the desired position (again through interfacing of the magnet/Hall effect sensor), following which the gear seeking motor is deactivated. FIG. 44 further depicts the lock system being reengaged (through cam rotated re-engagement of the plungers 30/32 so that the right plunger 32 is reestablished upon the outer diameter of the shift lever and the left plunger 30 is provided as shown engaged in the Drive position) and in order to stop shift lever assembly movement. FIG. 45 presents another view of the gear seeking shifter assembly and shows the gear seeking motor 130 actuated to rotate the cam shaft 138 to the reset position of the detent pawls 166/168 and gate pawl 108 and which, upon the PCBA 48 recognizing that the CAM shaft 138 is at the reset (standard shift operating) position, the gear seeking motor is deactivated, thereby completing the gear seeking operation.

Figure 46:
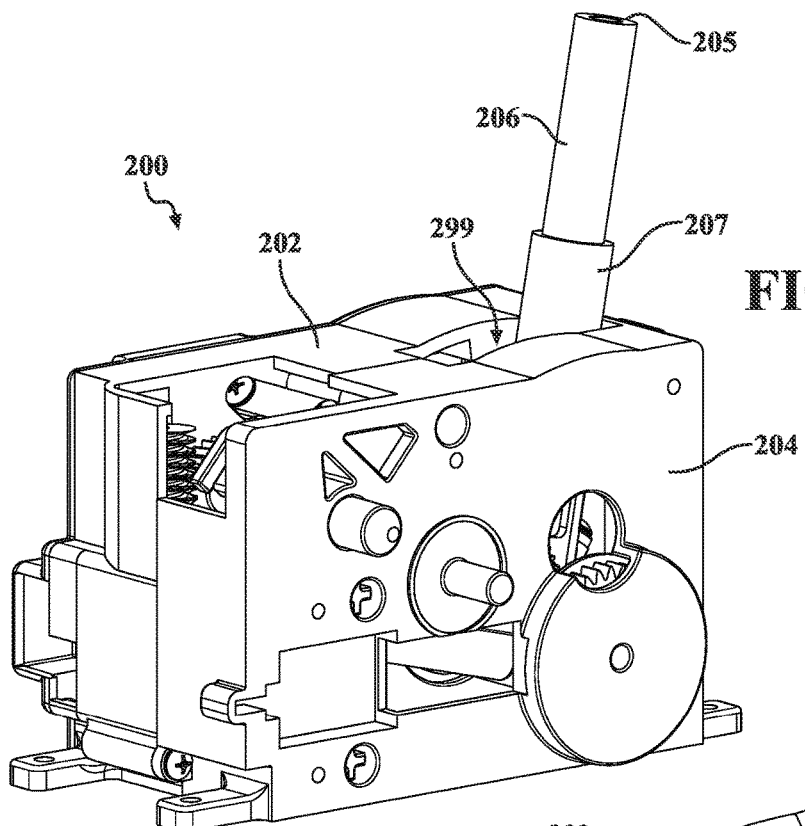
FIG. 46 is a perspective view of a low shift point plunger lock mechanism according to a further embodiment of the present invention.

Proceeding to FIG. 46, a perspective view is shown generally at 200 of a low shift point plunger lock mechanism according to a further embodiment of the present invention. The embodiment of FIGS. 46-86 shares a number of similarities to that depicted and previously described in FIGS. 1-45, with the third embodiment of FIGS. 87-123 depicting a further version having a high shift point configuration. To the extent possible, extensive description of duplicate components will be kept to a minimum and attention will be focused on differences in structure from that previously described.

The mechanism of FIG. 46 includes each of a left hand housing 202 and a right hand housing 204 which, upon assembly, define a package receiving space therebetween for receiving the components of the shifter package, and which includes a shift lever including an inner push button and rod 205 coaxially seated within the inner and outer tubes 206/207 and extending upwardly from an arcuate base 208 of the rotatable shifter.

Figure 47:
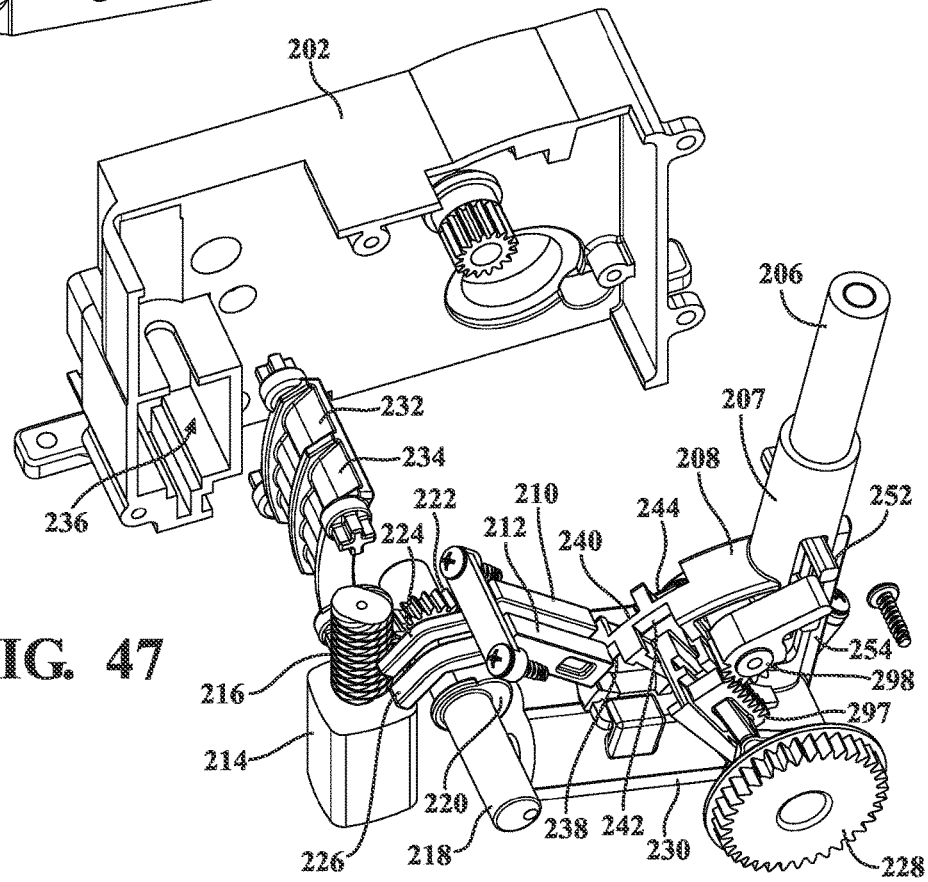
FIG. 47 is a partially exploded view of the plunger lock mechanism of FIG. 46 with the right handed housing removed to better show configuration of the shift lever with bores configured along an arcuate base, plungers, lock cam and motor and gear assembly.

As understood the push button 205 is provided as a displaceable inner rod coaxially seated within either a single tube or, as shown, a unitary tube construction with inner 206 and outer 207 diameter interconnecting portions, with the lower end of the outer tube portion 207 being integrated into the rotary actuating base 208 of the shifter. An internal spring (see at 209 in FIG. 76) is provided within an internal base location of the tube 207 integrated into the shift lever for upwardly biasing the push rod 205 (along with the gate pawl 252 and gate retraction pin 254). With further reference to FIG. 47, the arcuate base further includes the PRND shift position bores or recesses, plungers 210/212, motor 214 and extending driven worm gear 216.

Other supporting features shown include a lock cam with a shaft 218, cam protrusion 220, and geared location 222, which interacts with the rotating worm gear 216 in order to displace the plungers 210/212 via their respective integrated boomerang extending portions 224/226. With further reference to the description of FIG. 63 et seq., a gear seeking CAM shaft 228 is also depicted which is supported upon an inner platform base 230. Additional features include a pair of detent plates 232 and 234, these further including alternating peaks and valleys against which are mounted within the package interior so that they bias the detent pawls depicted in FIG. 65 et seq. A pocket 236 is depicted in the exploded view of FIG. 47 within which the motor 214 and driven worm gear 216. FIG. 47 further depicts a partially exploded view of the plunger lock mechanism of FIG. 46, with the right handed housing removed to better show configuration of the shift lever with bores configured along an arcuate base, plungers, lock cam and motor and gear assembly.

Figure 52:
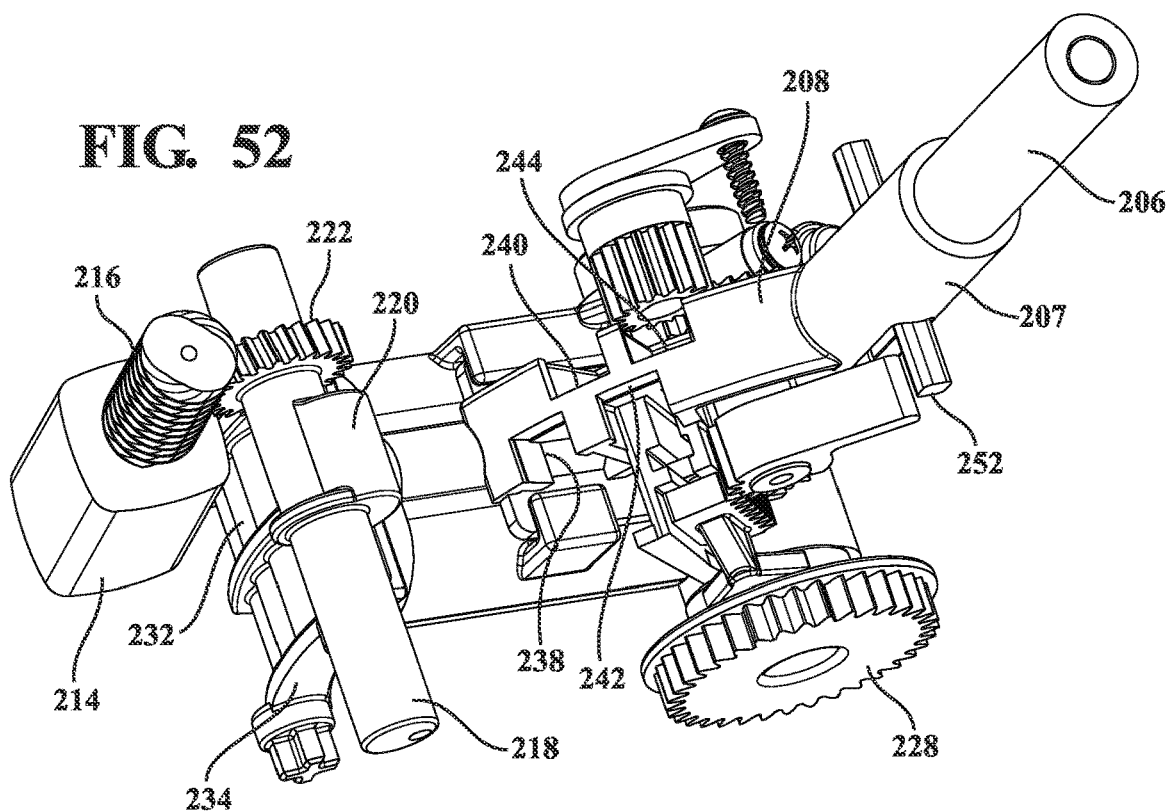
FIG. 52 is a partially exploded view of a shift lever bore interface depicting each of Park, Reverse, Neutral and Drive positions.

Consistent with the description in the initial embodiment, the motor driven cam 218 sets the position of the spring-loaded plungers 210/212 which interface with the bores depicted in the shift lever base. The bores are also depicted in FIG. 52 and include each of Park 238, Reverse 240, Neutral 242 and Drive 244 locations formed in the arcuate base 208 of the shifter, again so that the Park and Neutral bores are in rotary alignment with plunger 212, with Reverse and Drive bores are in rotary alignment with plunger 210. In this fashion, and as the shift lever is rotated to a given shifter position (PRND), a corresponding bore is exposed to one of the plungers 210/212.

When the CAM 220 is in the opposite position, the plungers selectively and alternately mate with selected bores 238, 240, 242 or 244 located on the shift lever base in order to prevent movement of the shift lever. As previously described, the plungers are spring loaded (see springs 246 and 248 in FIGS. 48-49). In this fashion, and as one of the selected plungers 212 locks the lever into the Park 238 or Neutral 242 bore positions, the other plunger 210 locks the lever in the Reverse 240 or Drive 244 positions. As also previously noted, and if only Park or Neutral is required, then only one plunger is required. As also previously described (see again at 46 in the prior species of FIG. 11), a position sensor can be located on a reverse end of the lock CAM shaft 218 for interfacing with a sensor located on a separate PCBA board (see at 250 in FIG. 62).

Figure 48:
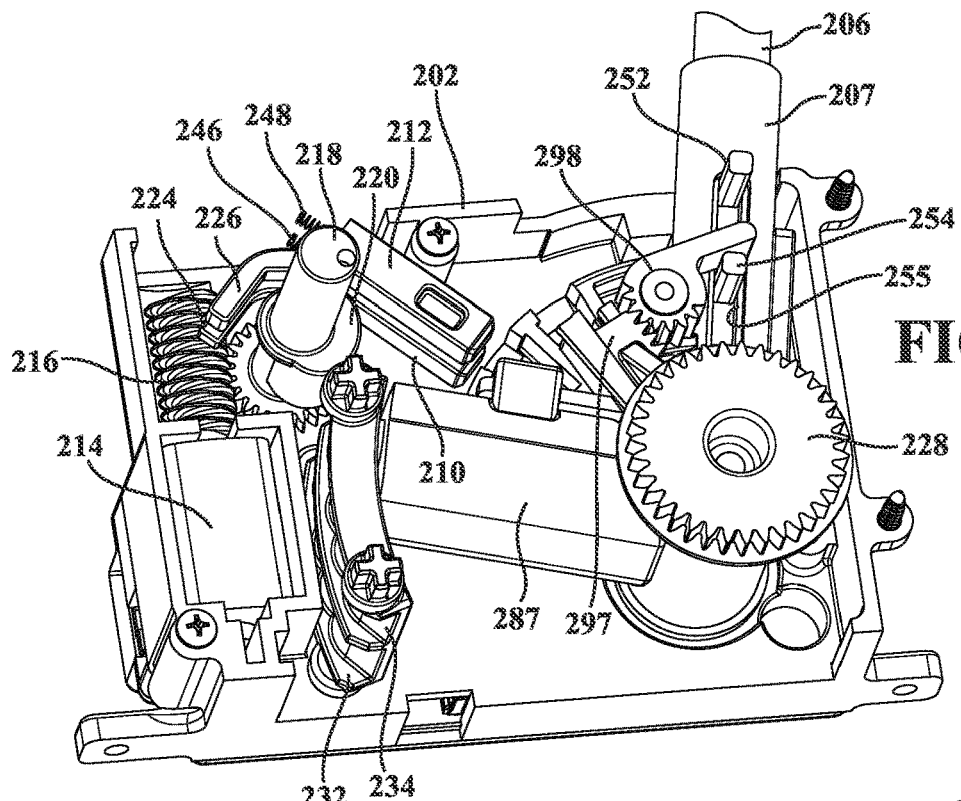
FIG. 48 is a semi-assembled open face plan view of the plunger lock mechanism of FIG. 46 and depicting the plungers in a retracted position via the motor to CAM interface and relative to the shift lever bores.
Figure 49:
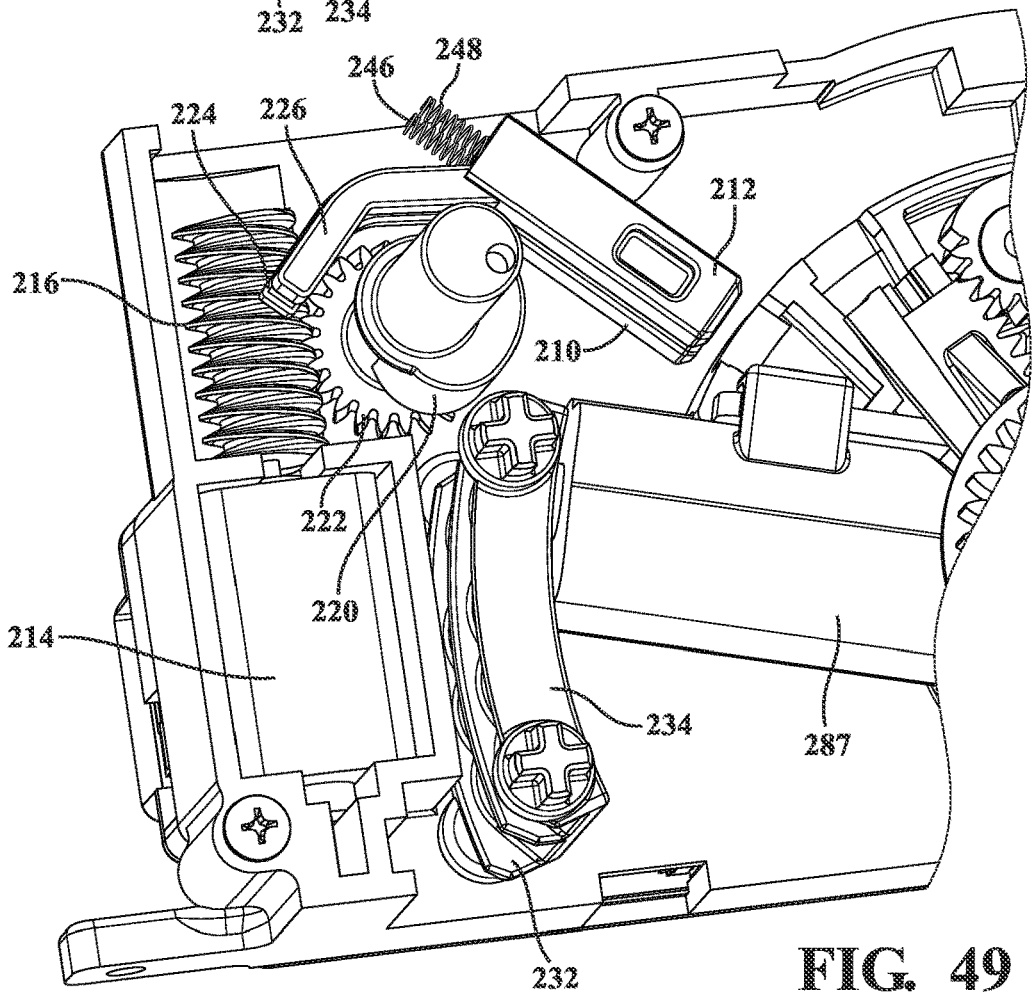
FIG. 49 is an enlarged and partially rotated view of FIG. 48 and illustrating the arrangement of the motor for rotating the CAM to in turn interface with the plungers to compress the springs in order to either retract/pull the plungers out of the shift lever bores, or to rotate to allow the springs to press the plungers into biasing contact within the shift lever bores.

FIG. 48 depicts a semi-assembled open face plan view of the plunger lock mechanism of FIG. 46 and depicting the plungers 210/212 in a retracted position via the motor 214 to CAM 220 interface and relative to the shift lever bores 238-244. FIG. 49 provides an enlarged and partially rotated view of FIG. 48, and illustrating the arrangement of the motor 214 for rotating the CAM supported shaft 218 to in turn interface with the plungers 210/212 to compress the springs 246/248 in order to either retract/pull the plungers out of the shift lever bores, or to rotate to allow the springs to press the plungers into biasing contact within the shift lever bores.

Figure 51:
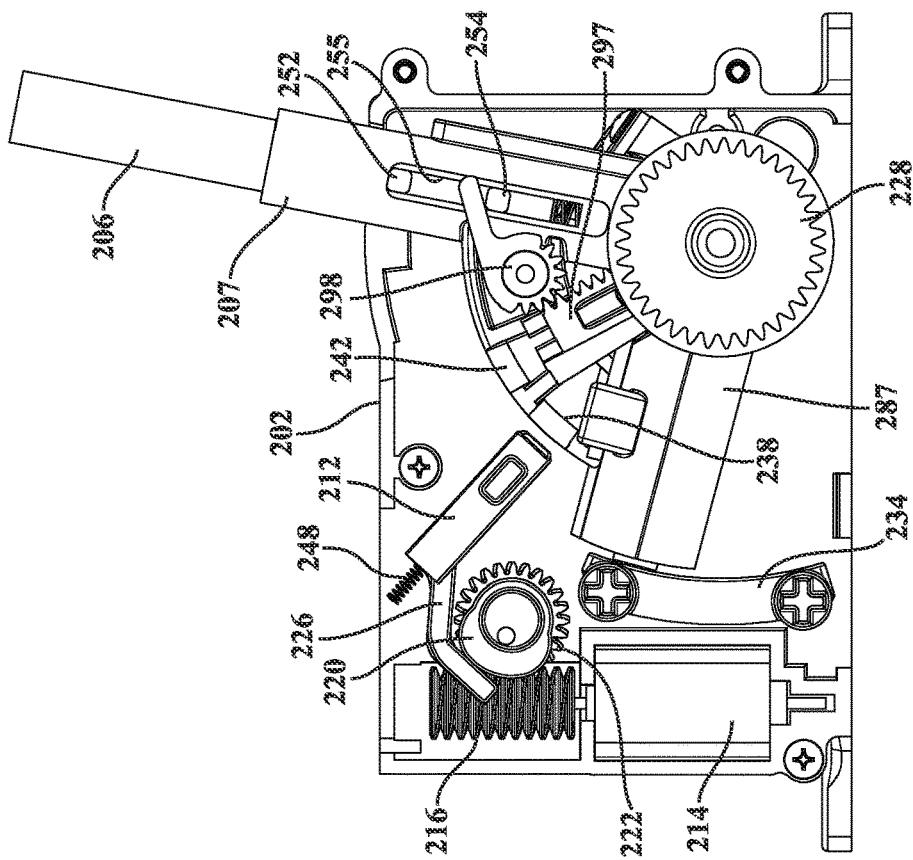
FIG. 51 is a succeeding unlock position to that shown in FIG. 50 in the CAM interface unlock position.
Figure 50:
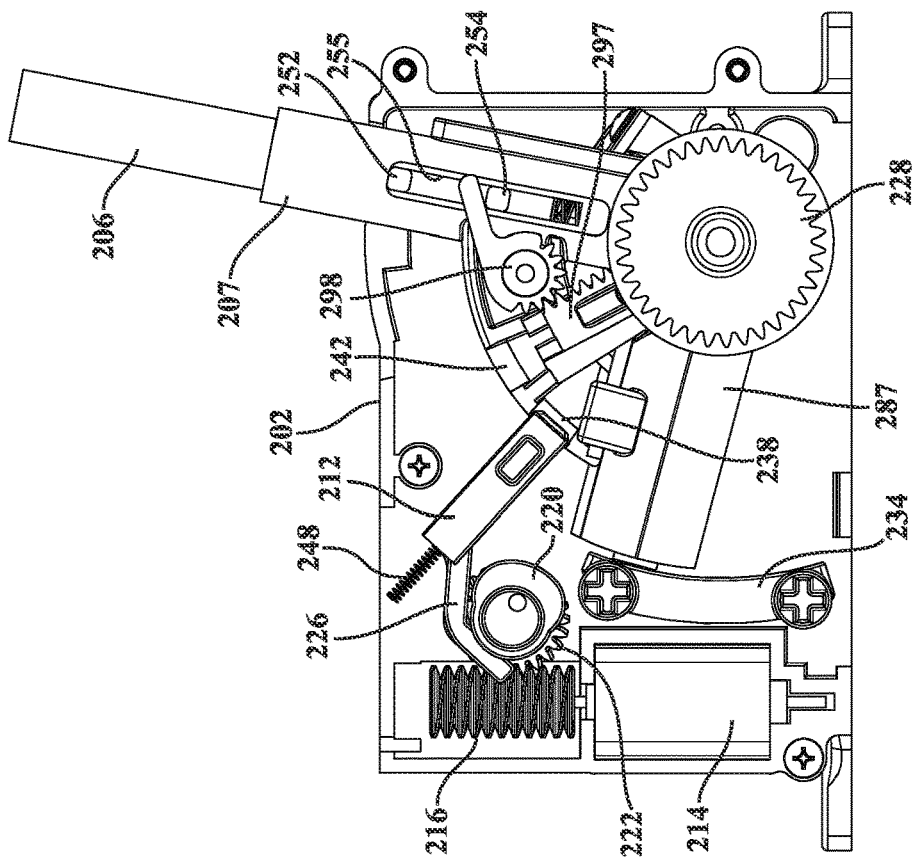
FIG. 50 is a succeeding plan view depicting the CAM interface in the lock position with the plunger seated within the specified bore in the shift lever, the CAM component restricting the distance the plunger can travel.

FIG. 50 presents a succeeding plan view depicting the CAM interface in the lock position with the plungers (see as shown at 212) seated within the specified bore (see Park position 238) in the shift lever, the CAM component 220 restricting the distance the plunger can travel. FIG. 51 is a succeeding unlock position to that shown in FIG. 50 in the CAM interface unlock position.

Figure 56:
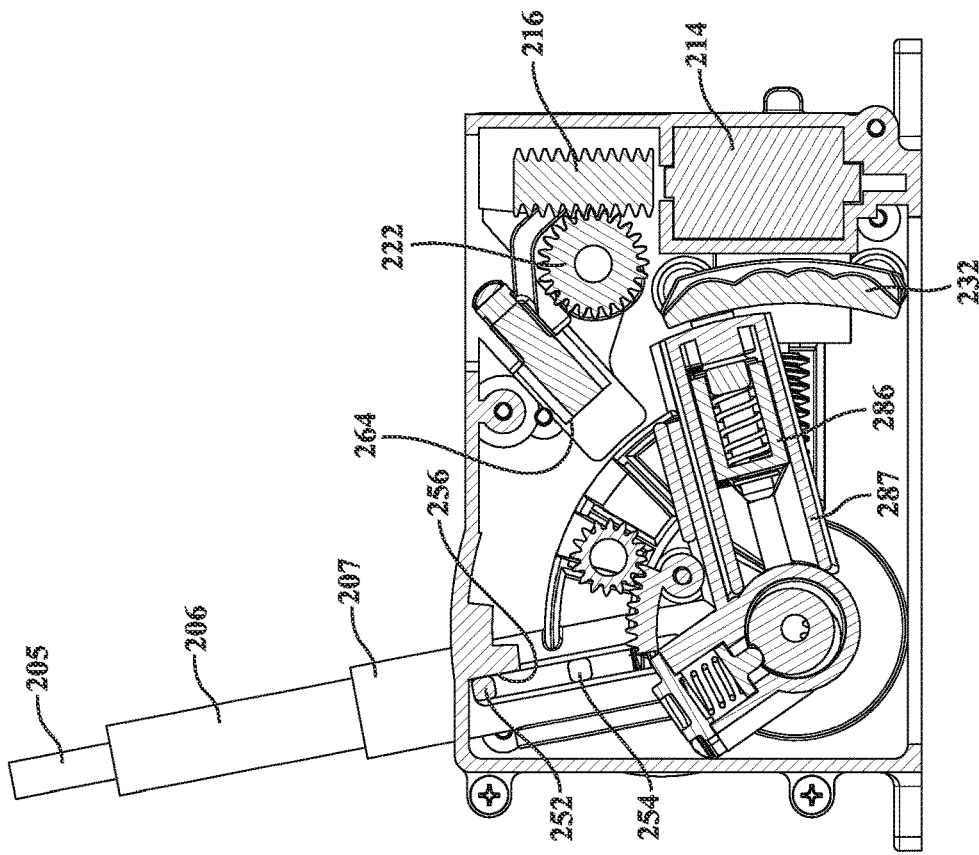
FIG. 56 is a cutaway taken along line 56-56 in FIG. 55 and depicting the shifter in the Park position with the upper gate pawl blocked by the shifter gate.
Figure 59:
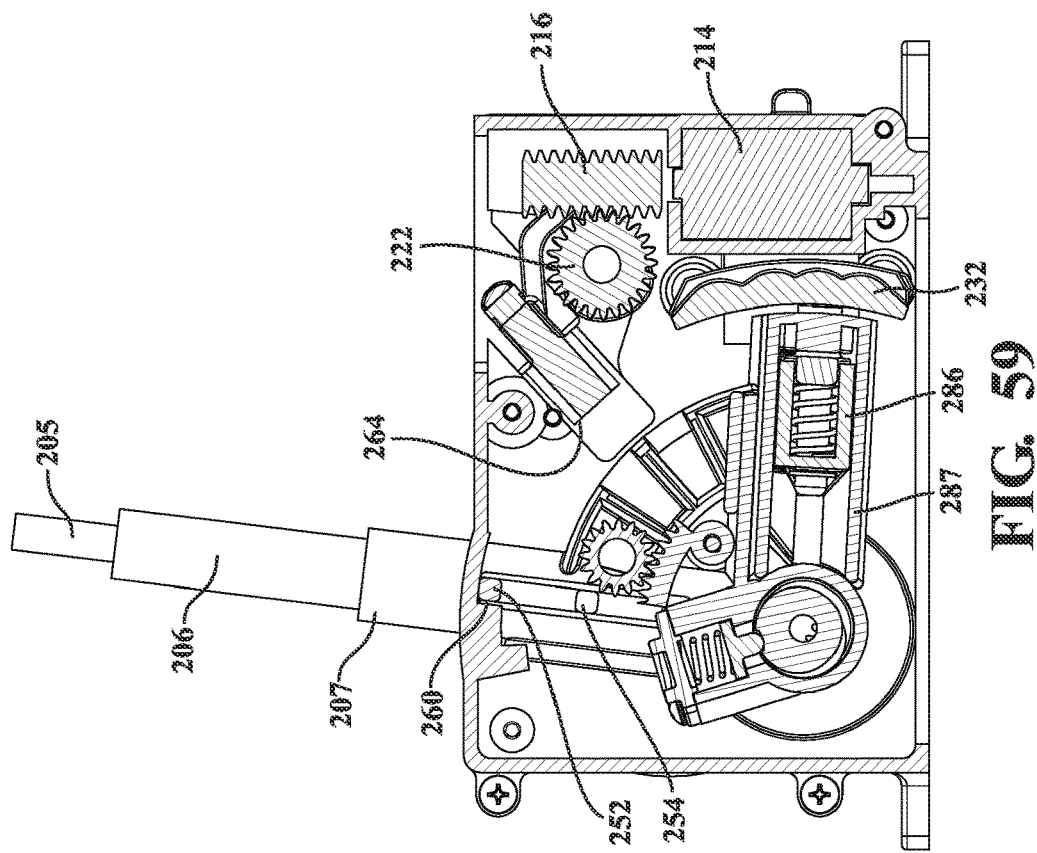
FIG. 59 is a further succeeding cutaway illustration depicting the shifter in the Neutral position with the gate pawl blocked by the gate wall between the Neutral and Reverse positions.
Figure 60:
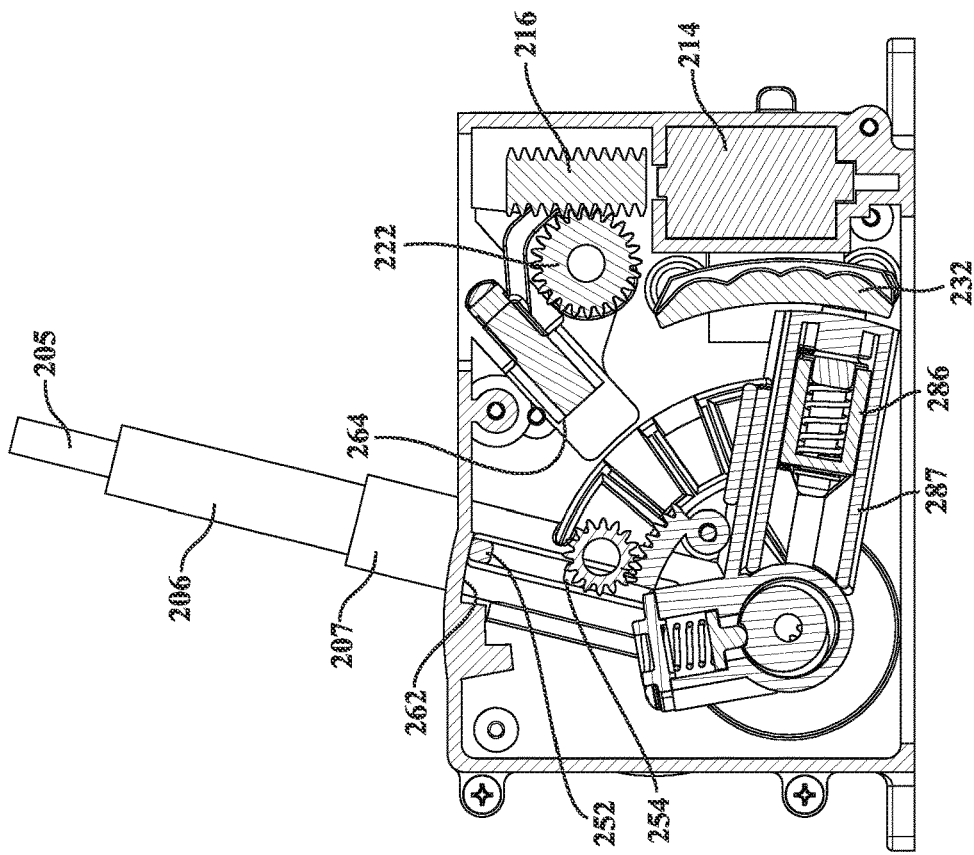
FIG. 60 presents a yet further illustration of the shifter in the Drive position, with no blockage of the gate pawl between the Neutral and Drive positions.

Also better shown is each of a gate pawl 252 and gate pawl retraction pin 254 (see FIGS. 47, 50-51 which correspond to 108 and 110 of the first embodiment and which are affixed in crosswise extending fashion through lower inserting end locations of the inner tube 206 or push rod). The gate pawl 252 and gate pawl retraction pin 254 are both seated within an elongated slot 255 configured in the outer tube 207. As will be further described, the gate pawl 252 operates to unseat (such as in response to the manual inward depressing of the inner push rod 205 (see as shown in FIG. 56 et seq.), which is coaxially and displace-ably supported inside an inner diameter defining and non-radially displacing tube 206, from the shifter positions integrated into the underside of the left and right handed housings proximate the location of the channel through which the shift lever (see also outer tube 207 from which the inner tube 206 in turn extends). As shown in cutaway of FIG. 55A, this corresponds to each of Park gate position 256 (see gear position as depicted in underside gate profile illustration in FIG. 56), Reverse gate position 258 (FIG. 58 and separated from Park position 256 via interposed gate wall 259), Neutral gate position 260 (FIG. 59) and Drive gate position 262 (FIG. 60).

Figure 53:
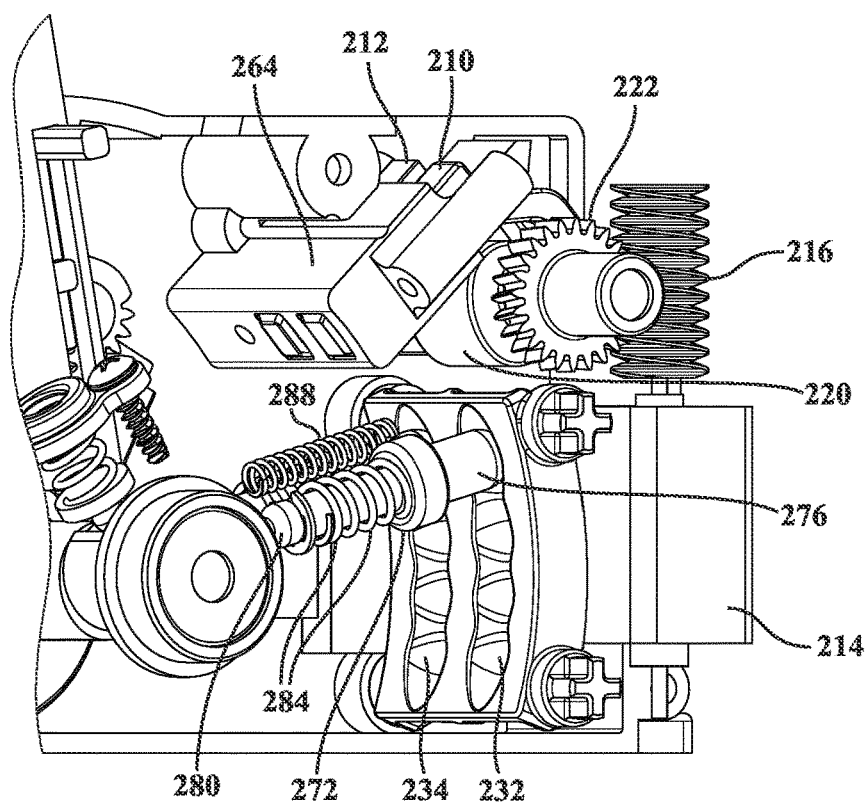
FIG. 53 depicts the plunger to housing interface from a reverse perspective.

FIG. 52 provides a partially exploded view of a shift lever bore interface depicting each of Park 238, Reverse 240, Neutral 242 and Drive 244 bore positions in the shift lever arcuate shaped base 208. FIG. 53 depicts the plunger to housing interface from a reverse perspective, this including an enclosure 264 for seating the spring loaded plungers 210/212, and also depicting projecting noses or tips 266/268 for the plungers 210/212 which are arrayed opposing the rotary aligning pairs of shift position bore holes 240/244 and 238/242. Also depicted are parts of the gear seeking detent cartridges, these also shown in FIGS. 65-70, for biasing against the detent plates 232/234.

Figure 65:
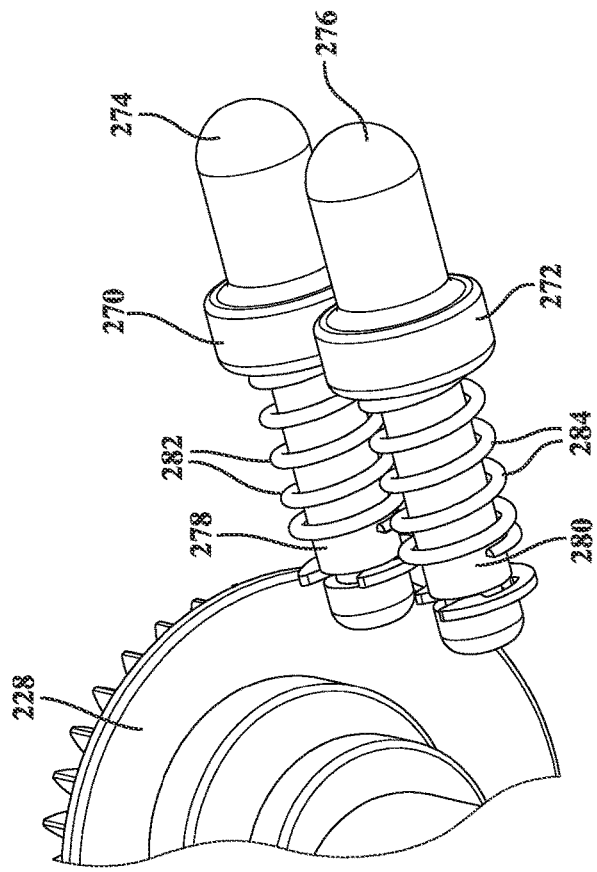
FIG. 65 is a subset exploded view of the gear seeking detent pawls which are spring loaded to provide resistance for shifting the shift lever.

As further depicted in FIG. 65, a subset exploded view is shown of a pair of gear seeking detent pawls, these including an elongated configuration with an intermediate annular shoulder 270/272 with forward projecting nose portions 274/276 and rear extending stems 278/280 which in turn support thereupon biasing springs 282/284 which shoulder against the annular shoulders in order to be spring loaded to provide resistance for shifting the shift lever.

Figure 66:
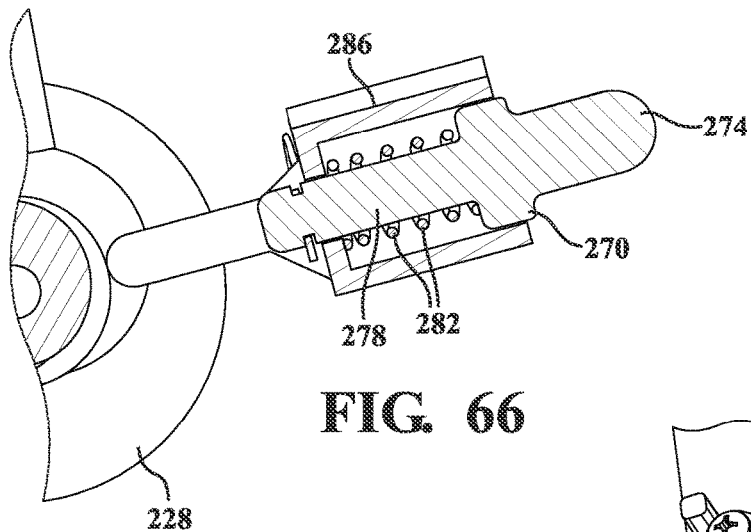
FIG. 66 is a length cutaway of a selected detent pawls shown in FIG. 65 and better depicting the configuration of the spring and pawl components loaded into the detent housing, thus forming the detent cartridge.
Figure 67:
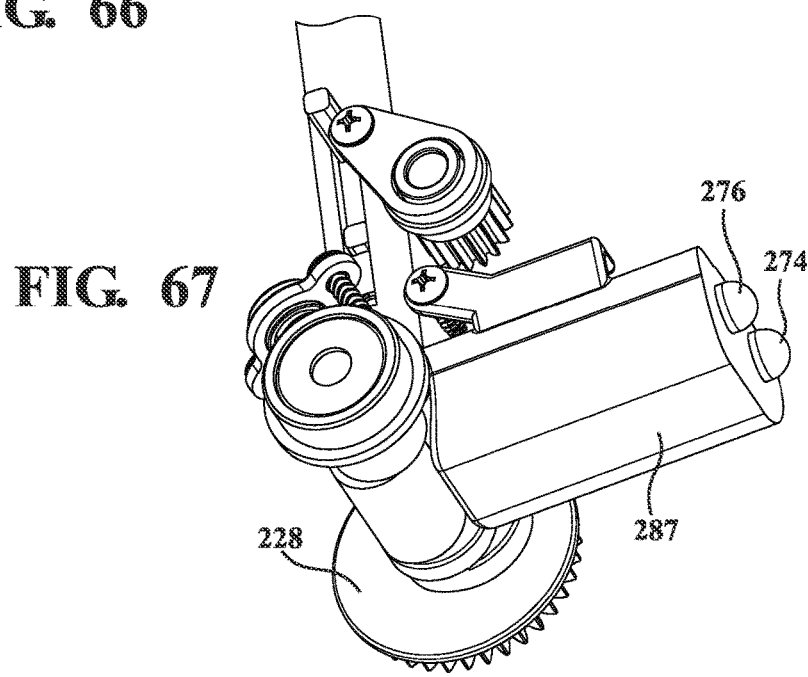
FIG. 67 is a further depiction of pair of detent cartridges also shown as a section in FIG. 66 inserted into the housing with an additional compression spring for biasing the cartridge against the CAM shaft.

FIG. 66 is a length cutaway of a selected detent pawl 270 shown in FIG. 65 and better depicting the configuration of the spring 282 and pawl 274 components loaded into a detent cartridge housing 286 supporting both pawls and thus forming the detent cartridge. As shown, the detent cartridge 286 can be integrated into the shift lever body or can be supported within a separate integral portion (see at 287 in FIG. 54) of the shifter body. FIG. 67 is a further depiction of pair of detent cartridges also shown as a section in FIG. 66 inserted into the housing with an additional compression spring (see at 288 in FIGS. 53 and 69-70) for biasing the cartridge against the gear seeking CAM shaft 228.

Figure 68:
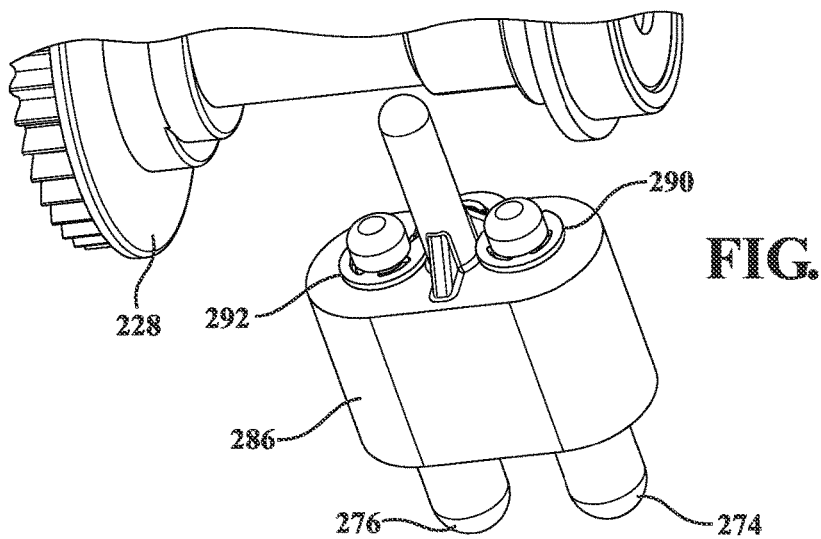
FIG. 68 is a rotated perspective of the detent cartridges in FIG. 65 and by which the spring loaded pawl is shown retained in the detent housing by physical restriction with the use of an E clip.
Figure 69:
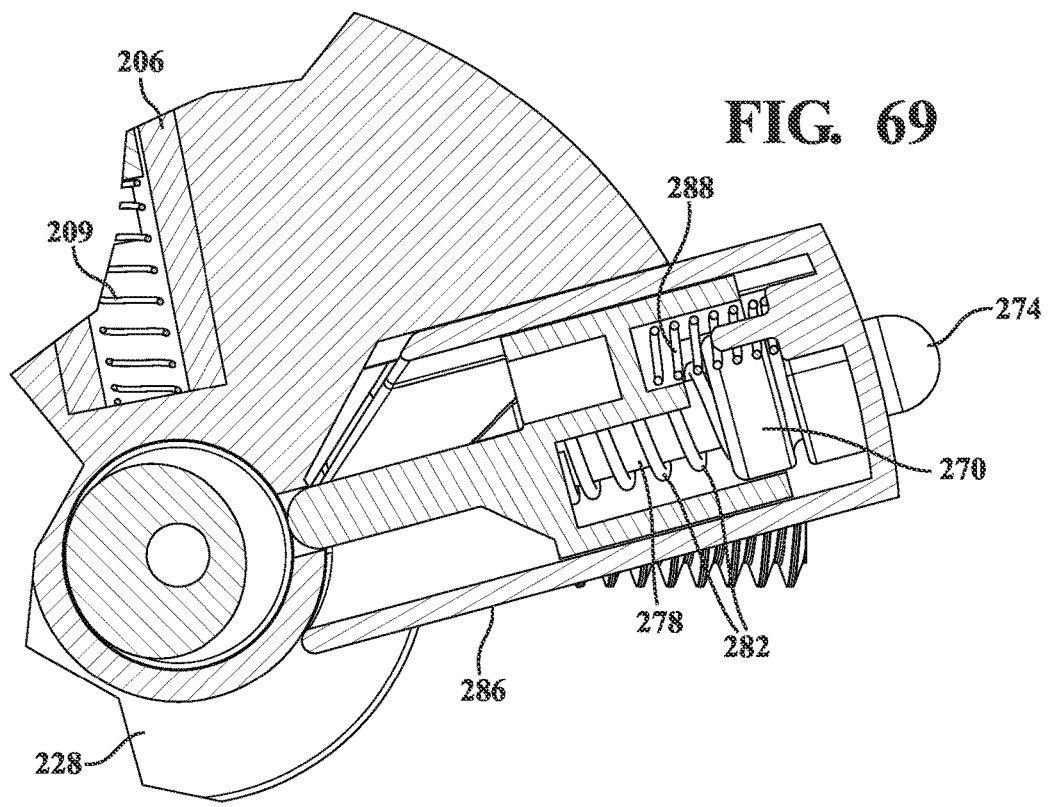
FIG. 69 provides an interior cutaway depicting the detent cartridge biased against the eccentric profile of the gear seeking cam shaft and, depending upon the rotational position of the cam shaft, either seating against or retracting away from the opposing detent profile configured on the interior of the housing.
Figure 70:
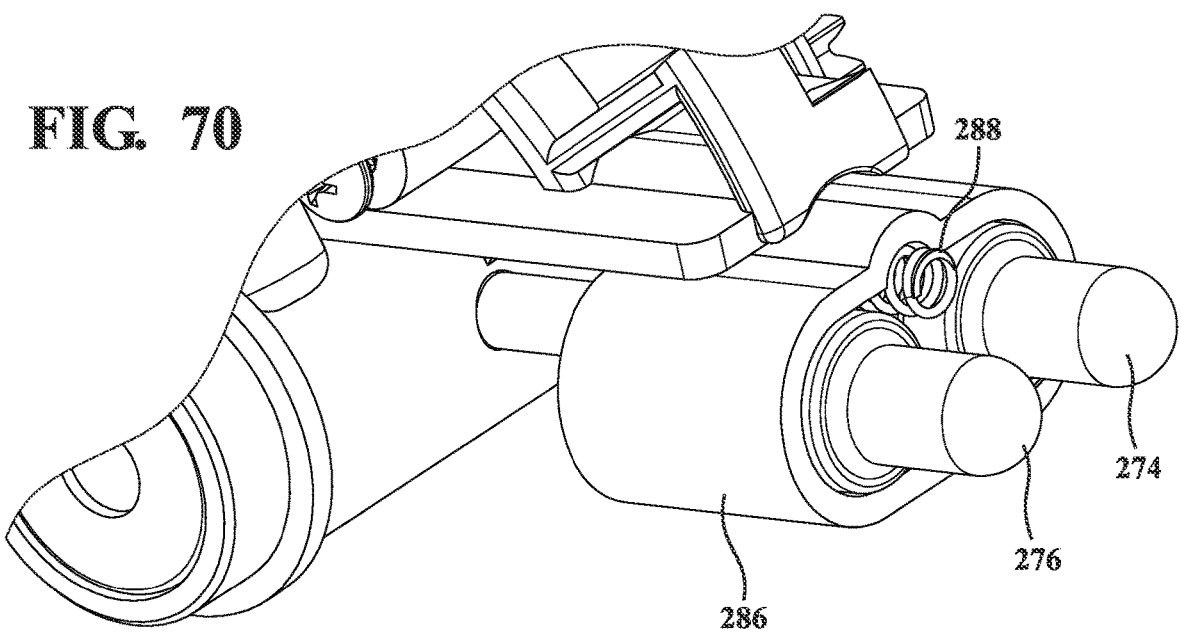
FIG. 70 is a further partially assembled perspective showing the cartridges inserted into the shift lever assembly, then connected to the compression spring to bias the cartridges toward the of the shift axis in order to press against the gear seeking cam shaft in the manner shown in FIG. 69.

FIG. 68 is a rotated perspective of the detent cartridges in FIG. 65 and by which the spring loaded pawls are shown retained in the detent housing by physical restriction with the use of E clips 290/292. FIG. 69 provides an interior cutaway depicting the detent cartridge biased against the eccentric profile of the gear seeking cam shaft 228 and, depending upon the rotational position of the cam shaft, either seating against or retracting away from the opposing detent profile 232/234 configured on the interior of the housing. FIG. 70 is a further partially assembled perspective showing the cartridges inserted into the shift lever assembly, then connected to the compression spring to bias the cartridges toward the of the shift axis in order to press against the gear seeking cam shaft 228 in the manner shown in FIG. 69.

Figure 62:
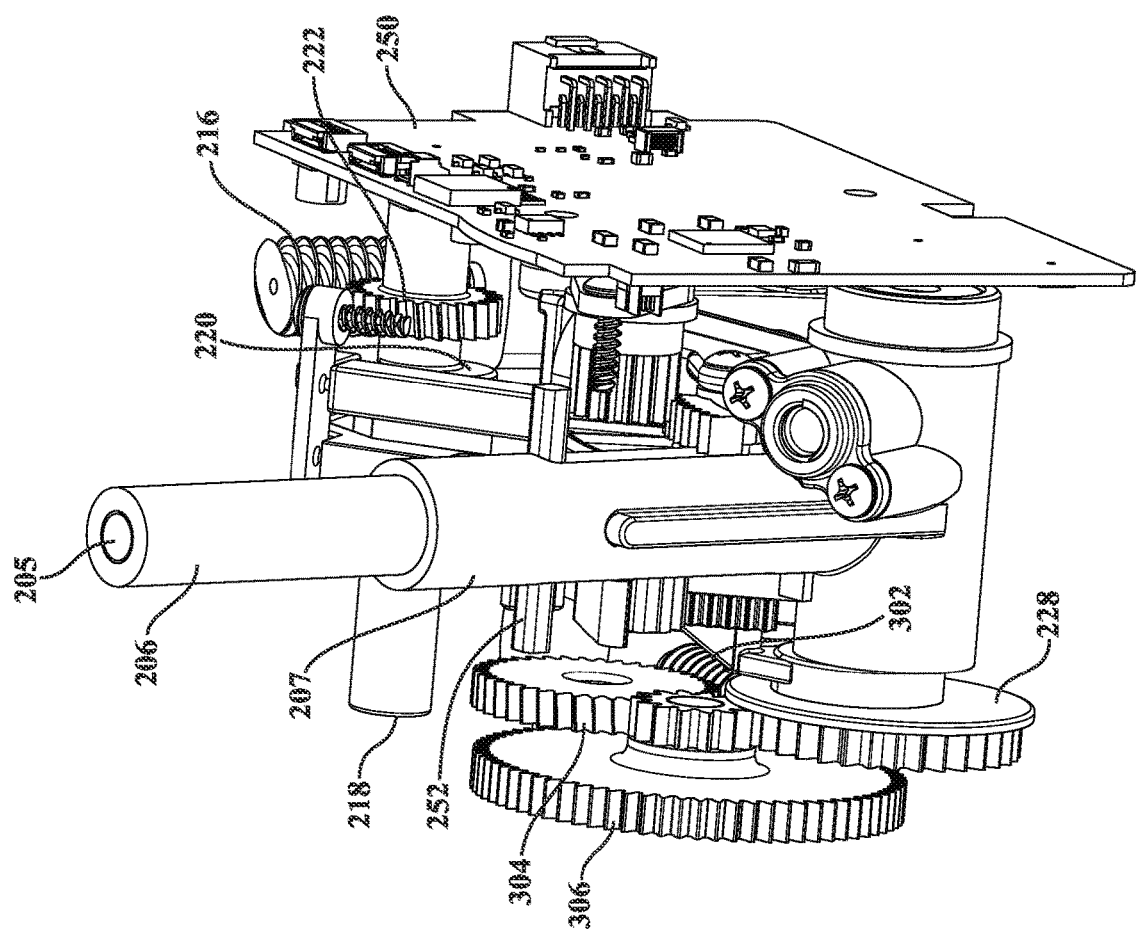
FIG. 62 is an illustration of the gear seeking shifter mechanism repeating much of the structure in FIG. 61, in combination with succeeding FIG. 63, further depicting a gear seeking cam shaft having an end positioned magnet additional to that included with the sensor gear and located over a Hall effect sensor located on the PCBA for monitoring and providing positioning of the cam shaft for coordinating motor activity for pawl retracting/reset operations.

Referencing FIG. 54, a rotated view is shown of a magnet 294 supported upon the end of the CAM interface, this informing the vehicle electronics (such as the ECU unit) of the position of CAM component 220 via rotation of the magnet relative to a sensor mounted on the PCBA board 250 (again FIG. 62).

FIG. 55 is an assembled view of the gear seeking poly-stable shifter of FIG. 46. As previously described, FIG. 55A is a cutaway view taken along line 55A-55A of FIG. 55 and illustrating the gate profile configured on both the left 202 and right 204 housing upper undersides.

FIG. 56 is a cutaway taken along line 56-56 in FIG. 55 and depicting the shifter in the Park position 256 with the upper gate pawl 252 blocked by the shifter gate. Proceeding to FIG. 57, a succeeding view to FIG. 56 shows the shifter in the Park position 256, with gate pawl 252 displaced downwardly and not be blocked by the Park gate position, resulting from the shift knob button 205 being pressed, pushing down on the shift rod so that the gate pawl clears the gate wall.

Figure 57:
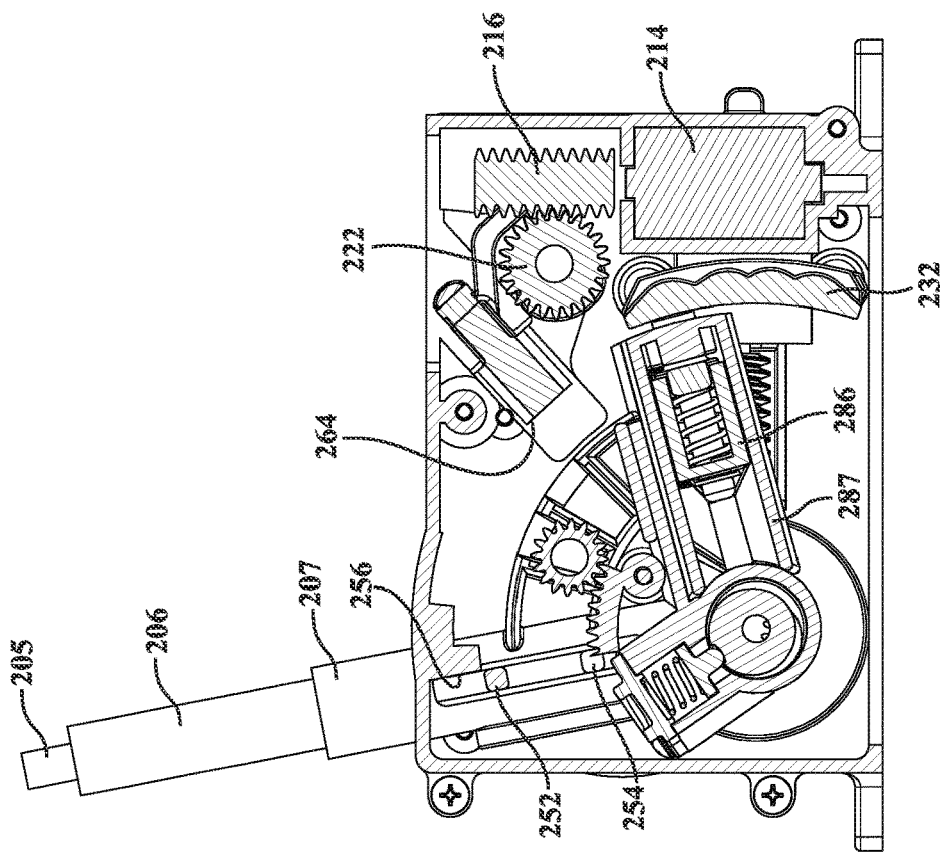
FIG. 57 is a succeeding view to FIG. 56 and showing the shifter in the Park position, with gate pawl not blocked by the gate resulting from the shift knob button being pressed, pushing down on the shift rod so that the gate pawl clears the gate wall.
Figure 58:
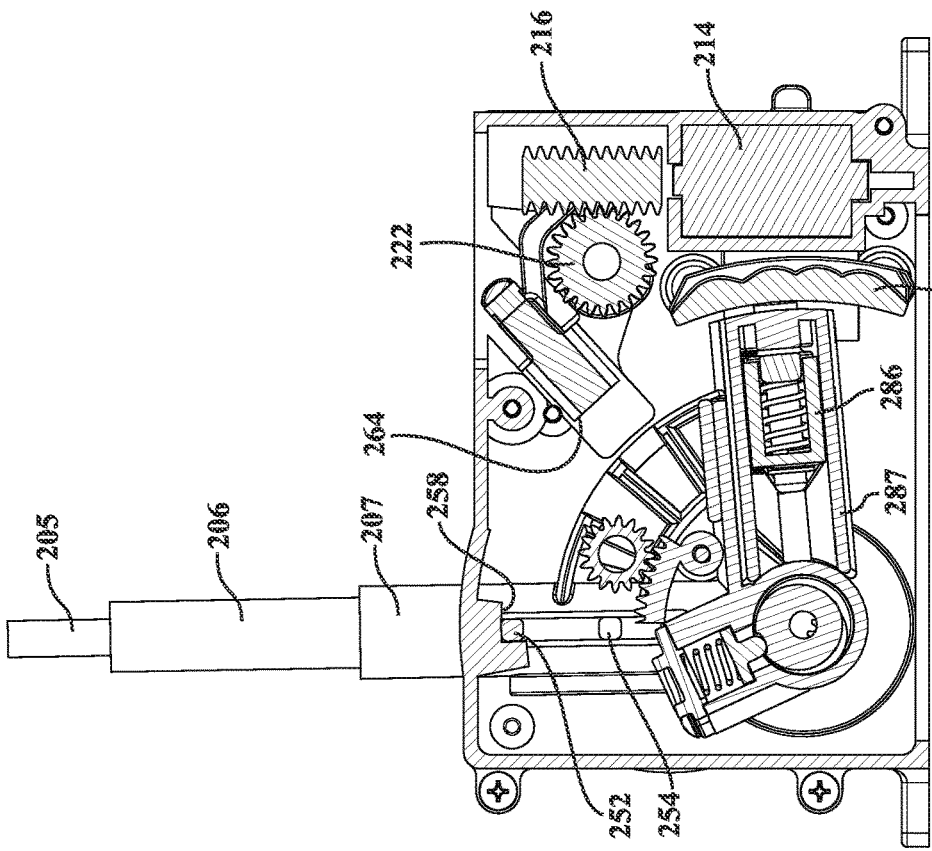
FIG. 58 is a succeeding view to FIGS. 56-57 with the shift lever rotated to the Reverse position, with the gate pawl blocked by the gate wall between the Reverse and Park positions.

FIG. 58 is a succeeding view to FIGS. 56-57 with the shift lever rotated to the Reverse position 258, with the gate pawl 252 blocked by the gate wall 259 between the Reverse 258 and Park positions. FIG. 59 is a further succeeding cutaway illustration depicting the shifter in the Neutral position 260 with the gate pawl 252 blocked by the gate wall between the Neutral 260 and Reverse 258 positions. FIG. 60 presents a yet further illustration of the shifter in the Drive position 262, with no blockage of the gate pawl 258 between the Neutral 260 and Drive 262 positions.

Figure 61:
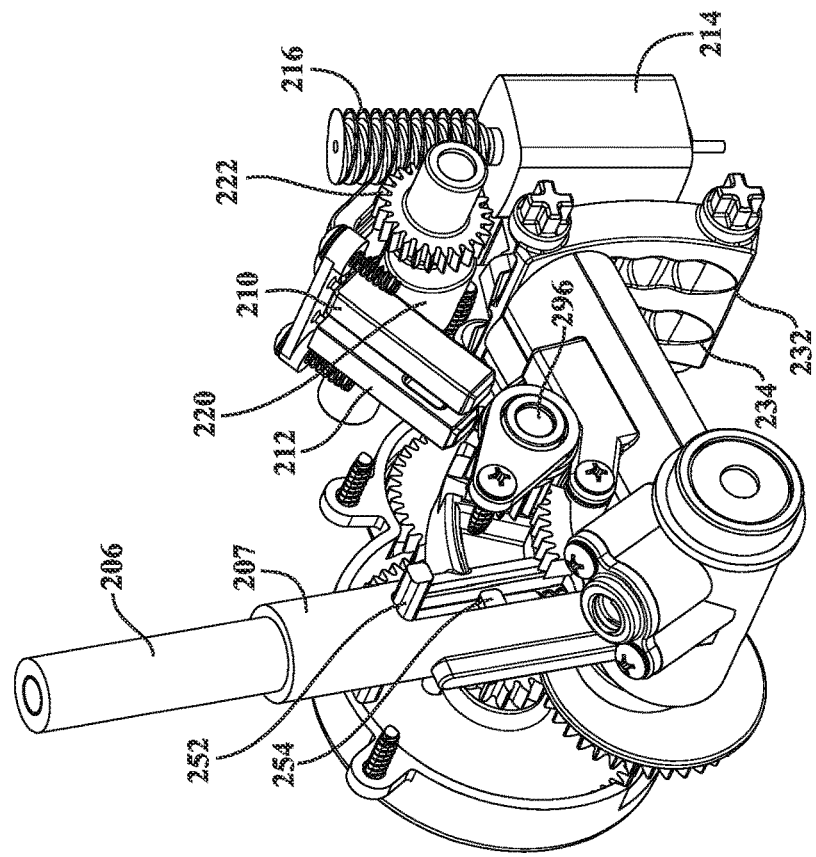
FIG. 61 is a perspective view of the shift position sensing mechanism and illustrating a sensor gear with an on axis magnet interfacing with the outer gear profile on the shift lever, such that the sensor gear rotates with the shift lever and an end supported magnet rotates relative to a Hall effect sensor located on a PCBA which monitors and communicates the position of the shift lever.

Proceeding to FIG. 61, a perspective view is shown of the shift position sensing mechanism and illustrates a sensor gear with an on axis magnet 296 interfacing with the outer gear profile on the shift lever. In this fashion, the sensor gear rotates with the shift lever 208 and the end supported magnet rotates relative to a Hall effect sensor located on the PCBA 250, which monitors and communicates the position of the shift lever.

Figure 63:
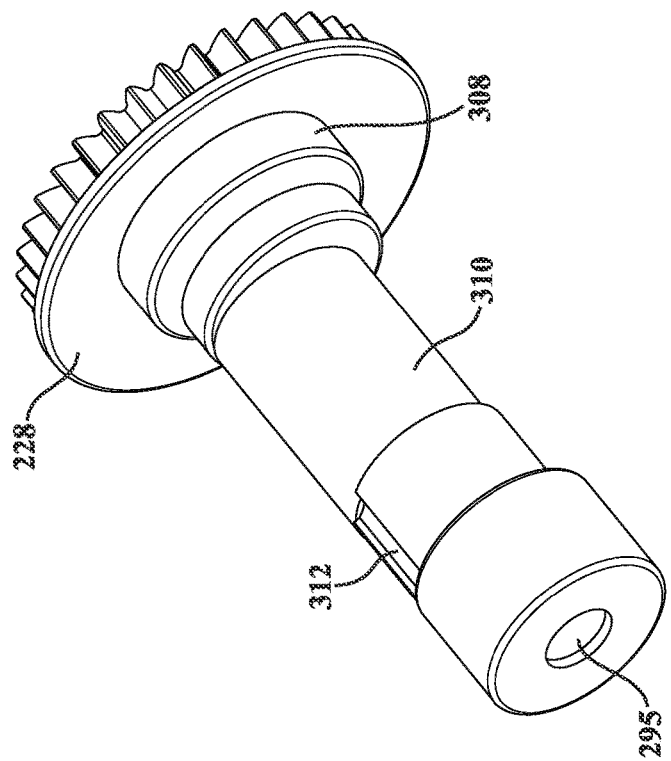

FIG. 62 is an illustration of the gear seeking shifter mechanism repeating much of the structure in FIG. 61 and, in combination with succeeding FIG. 63, further depicts the gear seeking cam shaft 228 having an end positioned magnet 295 additional to that included with the sensor gear and located over a Hall effect sensor located on the PCBA 250 for monitoring and providing positioning of the cam shaft 228 for coordinating motor activity for pawl retracting/reset operations. Proceeding to FIG. 64, a frontal perspective of the shift lever assembly and gear seeking cam shaft components shown in FIG. 46.

The gear seeking function is performed based on the vehicle or transmission command (such as again via the ECU or associated vehicle control). In order to gear seek, the shifter must have the ability to perform the required action when commanded. Example conditions for the vehicle commanded gear seeking include autonomous driving modes, such as parallel parking requiring the shifter gear position to mirror the transmission gear position during the autonomous parking operation. Also, and in the case of an issue/problem with the transmission, the vehicle may command that the shifter move to a safe state (such as Park or Neutral position).

Other considerations include the desire of no detent sounds heard during gear seeking, such suggesting that the detent pawl to detent plate interface moves together, is disconnected from one another, or remains stationary while the sifter lever rotates to the commanded position.

In the present design, the detent pawls 270/272 are retraced by means of the CAM shaft 228 profile, interfacing with features on the extension spring loaded detent pawl cartridges (see again FIGS. 65-70), which when rotated allows room for the pawls to be pulled inward by the compression spring force, retracting the pawls so they do not interface with the detent profile, resulting in no shift/bump sound as the shift lever rotates between the positions.

Additionally, and since the design provides a physical gating mechanism to prevent shifting without the shift knob button 205 being depressed, with a means for overriding the gating being provided. As will be described in FIG. 63 et seq., the CAM profile on the gear seeking CAM shaft 228 is used to interact with a rack 297 and gear 298 system (see FIGS. 47-51), this in turn coupled to the pin 254 connected to the push rod 205. Upon the CAM shaft 228 being rotated, the rack is pushed outward, rotating a spur gear which then pulls/retracts the pin inwardly, thereby moving the push rod 205 inward and also moving the gate pawl 252 to clear the physical gates 256-262 (FIG. 55A) configured in the upper undersides of the left 202 and right 204 sided and joined shifter housings and defined on opposite undersides of the upper clearance slot (see at 299 in FIG. 46) defined in the housing top through which the tube 207 projects.

Figure 64:
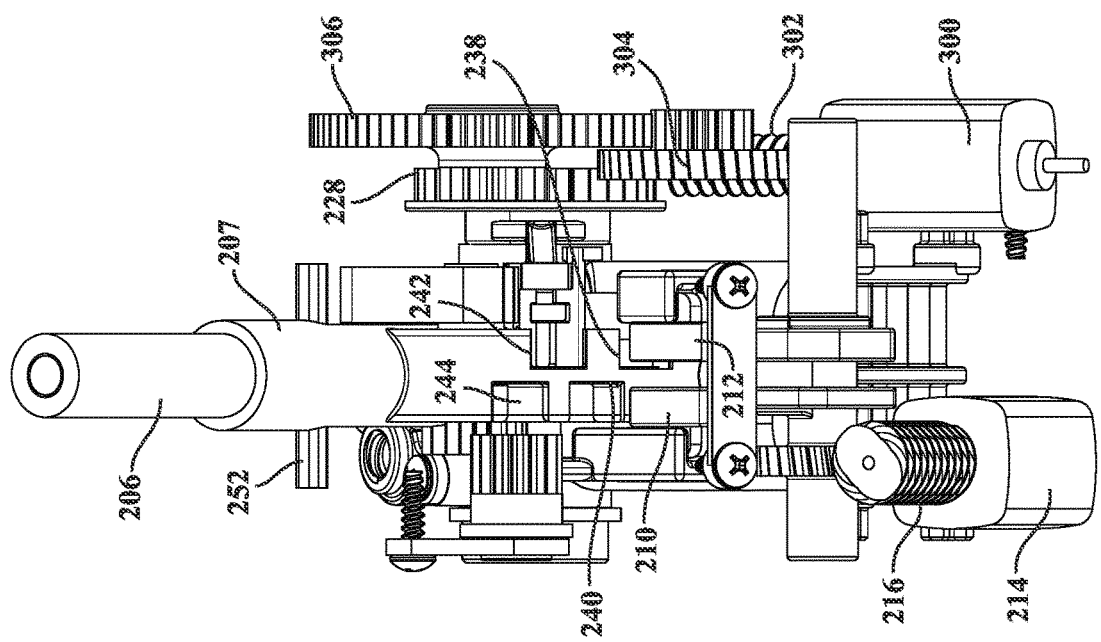
FIG. 64 is a frontal perspective of the shift lever assembly and gear seeking cam shaft components shown in FIG. 46.

In this fashion, the shift lever is held in position in utilizing the lock mechanism previously described to allow the gear seeking motor system (see gear seeking motor, which is shown at 300 in FIG. 64 with an output worm 302 for operating intermediate gears 304 and 306, these in turn rotating the gear seeking CAM shaft 228, resulting in retracting of the detent pawls 274/276 and gate pawl 252. Upon these locks being released, the gear seeking motor 214 continues to rotate and to move the shift lever 207 to the commanded position.

Once the desired position is found and autonomous commands are no longer needed, the lock plunger 210 or 212 is engaged into whichever gear defined bore (240/244 or 238/242) is positioned in alignment, with the CAM shaft 228 then being rotated to reset the engagement of the gate pawl 252 and detent pawls 274/276, thereby ending the gear seeking operation and restoring standard shift functionality.

FIG. 71 is a perspective view of the gear seeking train including the CAM shaft 228 connected to gear seeking worm gear (again shown at 304 in contact with the motor driven worm 302 and having a smaller spur gear profile 305 at one end interfacing with a larger diameter spur gear profile 306, which has a smaller spur gear profile on the other end (not shown) which interfaces with the cam shaft spur gear profile at 288. FIG. 72 further provides a rotated plan view of FIG. 71 and depicting the same components from another angle.

Figure 73:
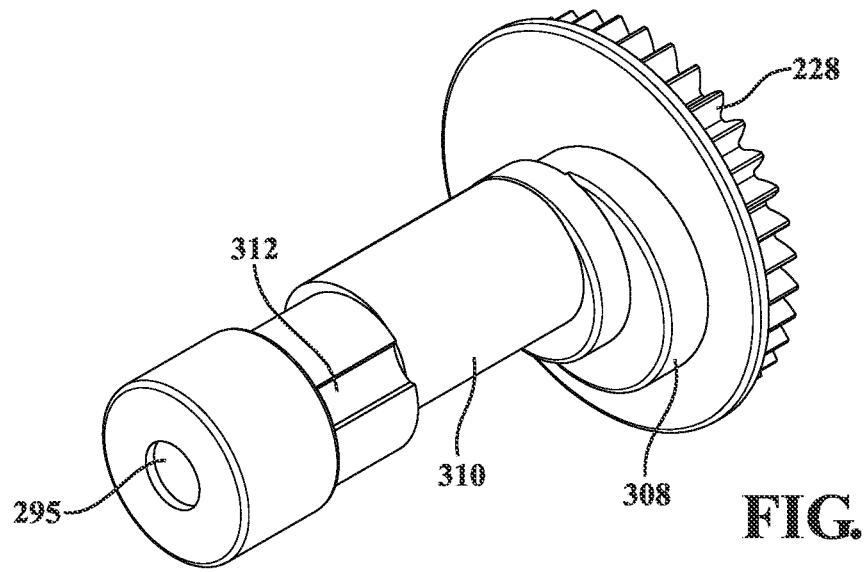
FIG. 73 is another depiction of the gear seeking CAM shaft of FIG. 63 and illustrating each of a first profile for interacting with the gate pawl retraction pin to pull the push rod/gate pawl inward to clear the gates, a second profile for interacting with the detent pawl housing cartridges and a third profile for interacting with a pawl to engage/interfere with the shift lever on an auto shift mode.
Figure 74:
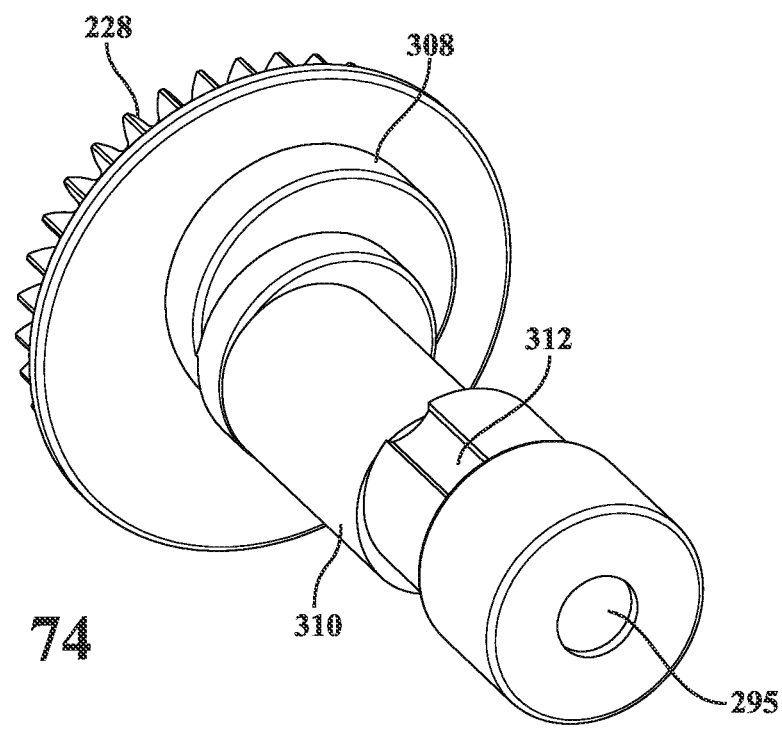
FIG. 74 is a further rotated view of the CAM shaft shown in FIG. 73 and again depicting the end supported magnet for arraying in proximity the Hall effect PCBA sensor.

Proceeding to FIG. 73, another depiction of the gear seeking CAM shaft of FIG. 63 is provided and illustrates each of a first profile 308 for interacting with the gate pawl retraction pin 254 to pull the push rod 205/gate pawl 252 inward to clear the underside configured gates (256, 258, 260, 262), along with a second profile 310 for interacting with the detent pawl housing cartridges 286 and, finally, a third profile 312 for interacting with a portion 313 biased by spring 209 to engage/interfere with the shift lever on an auto shift mode. FIG. 74 is a further rotated view of the CAM shaft shown in FIG. 73 and again depicting the end supported magnet 295 from another angle for arraying in proximity the Hall effect PCBA sensor located upon the PCBA 250 (FIG. 62).

FIG. 75 provides a subset illustration of the gear seeking CAM shaft first profile 308 in a standard operating position in which the gate pawl 252 is in an engaged position, the gate retraction pin 254 is in the up position and the rack 297 is in the down position. FIG. 76 is a further cutaway view of FIG. 75 and depicting the detent housing cartridge 286 in an interface condition with the CAM shaft second profile 310. FIG. 77 is a further cutaway view depicting the shift lever pawl not engaged and not interfering with the CAM shaft third profile 312.

Figure 78:
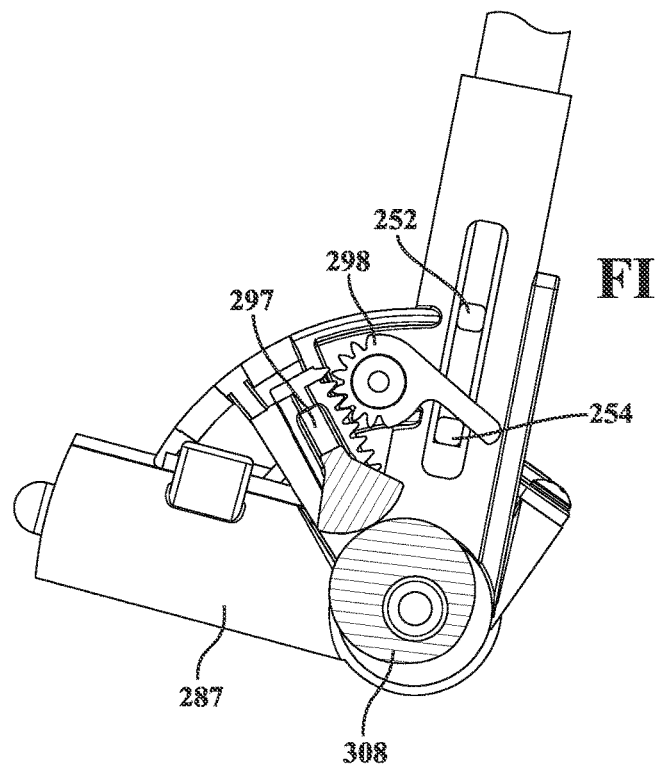
FIG. 78 is an illustration similar to FIG. 75 depicting the gear seeking CAM shaft in position with the detent cartridge and gate pawl retracted.
Figure 79:
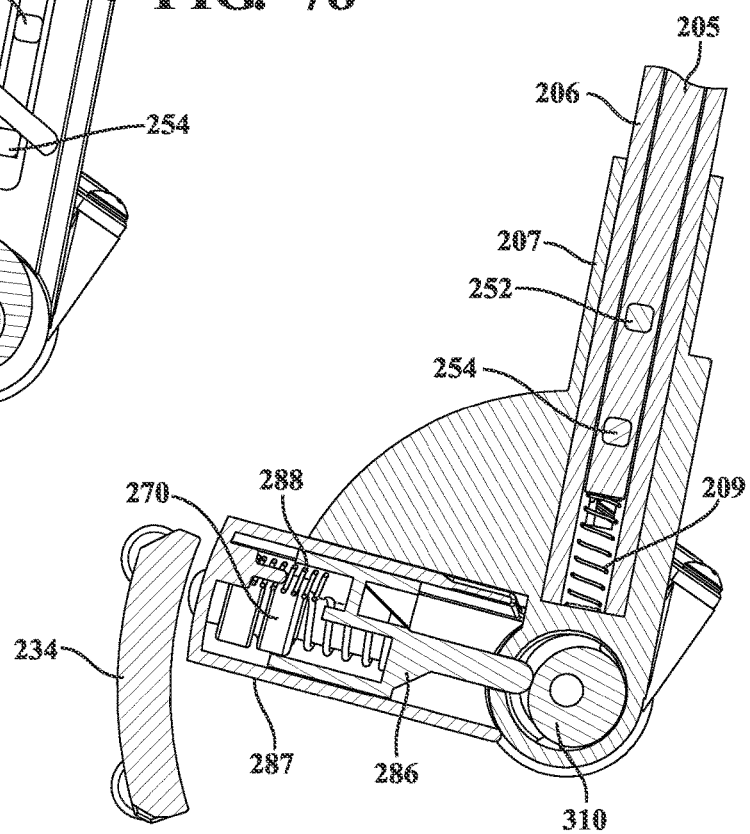
FIG. 79 is an illustration similar that shown in FIG. 76 in which detent pawl is disengaged from the detent plate and cartridges forced toward the detent plates.
Figure 80:
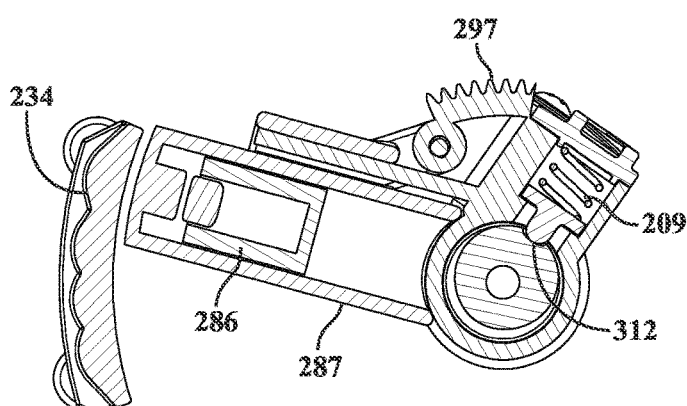
FIG. 80 is an illustration similar to FIG. 77 in which the shift lever pawl is engaged/interfering with the CAM shaft, this interface providing a positive connection between the CAM and shift lever, the shift lever rotating with the CAM to move the lever in the seek mode.

FIG. 78 is an illustration similar to FIG. 75 depicting the gear seeking CAM shaft first profile 308 in position with the detent cartridge 286 (see FIG. 79) and gate pawl 252 retracted. FIG. 79 is an illustration similar that shown in FIG. 76 in which detent pawl is again shown disengaged from the depicted detent plate 234 and the cartridges 286 forced away from the detent plates 232/234. FIG. 80 is an illustration similar to FIG. 77 in which the shift lever pawl is engaged/interfering with the CAM shaft (see again at 312), this interface providing a positive connection between the CAM 228 and shift lever 207, the shift lever 207 rotating with the CAM to move the lever in the seek mode.

Figure 81:
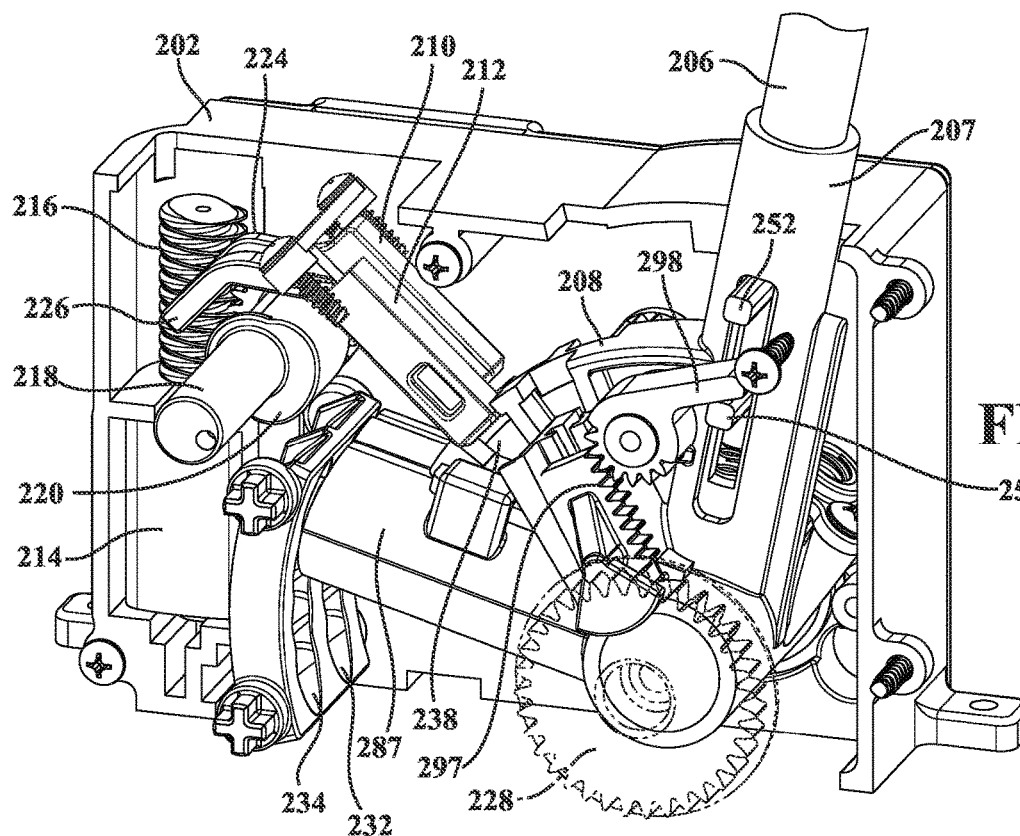
FIG. 81 is an illustration depicting the shifter base of the gear seeking shifter assembly, and showing the detent pawls engaged to the detent plate, the right plunger lock engaged in the Park position, the left plunger lock resting on the outer diameter of the shift lever, and the gate pawl in outward engaged positions along with the spring loaded and cam actuated plungers engaged to the shifter to lock the shift lever.

Proceeding to FIG. 81, an illustration is provided depicting the shifter base 208 of the gear seeking shifter assembly, and showing the detent pawls (supported within housing 287) engaged to the detent plates 232/234 with the right plunger (or lock) 212 engaged in the Park position (shifter bore 238 in FIG. 52), the left plunger (or lock) 210 resting on the outer diameter of the shift lever 208, and the gate pawl 252 in an outward engaged position along with the spring loaded and cam actuated plungers engaged to the shifter to lock the shift lever.

Figure 82:
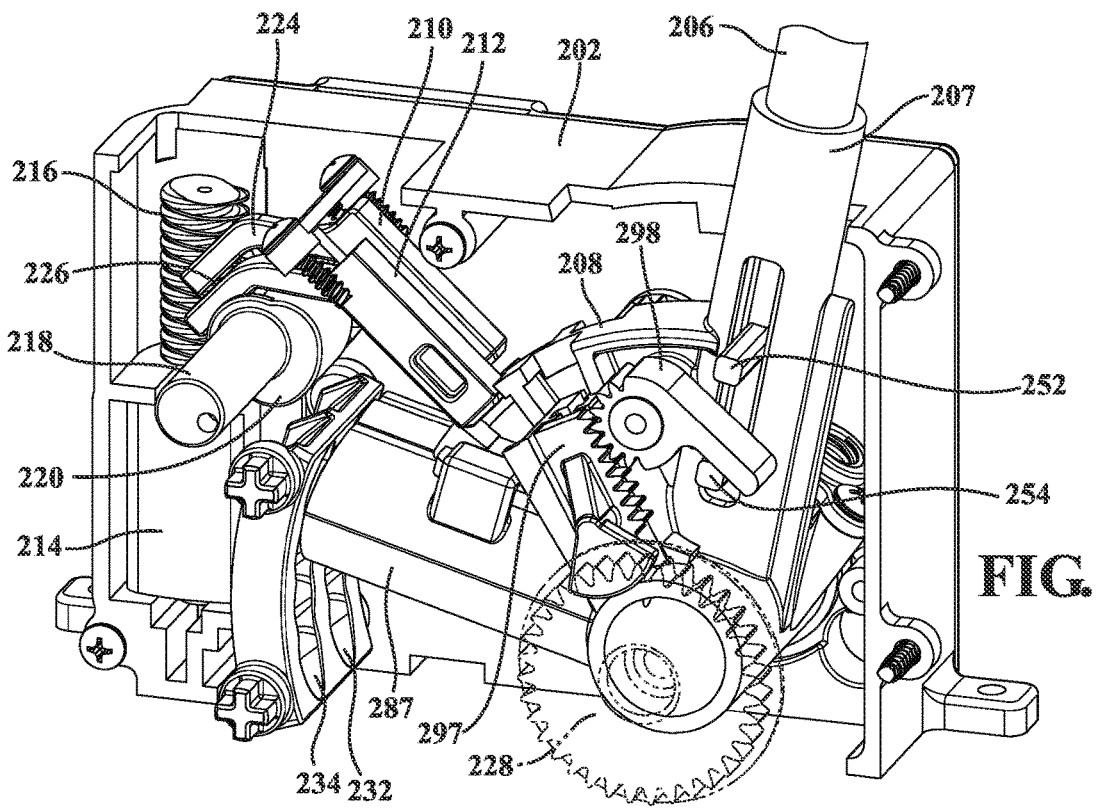
FIG. 82 is an illustration and by which the gear seeking motor is actuated and the cam shaft rotated to retract the gate and detent pawls, and which, upon the PCBA recognizing that the CAM is in the proper position (through signal from magnet/Hall sensor), deactivates the gear seeking motor with the right plunger lock engaged in the Park position and the left plunger lock resting on the outer diameter of the shift lever.

FIG. 82 is an illustration and by which the gear seeking motor 300 is actuated and the cam shaft 228 rotated to retract the gate 252 and detent pawls 274/276, and which, upon the PCBA 250 recognizing that the CAM is in the proper position (through signal from the rotating magnet 295 and opposing Hall sensor), deactivates the gear seeking motor 300 with the right plunger 212 lock engaged in the Park position and the left plunger 210 lock resting on the outer diameter of the shift lever.

Figure 83:
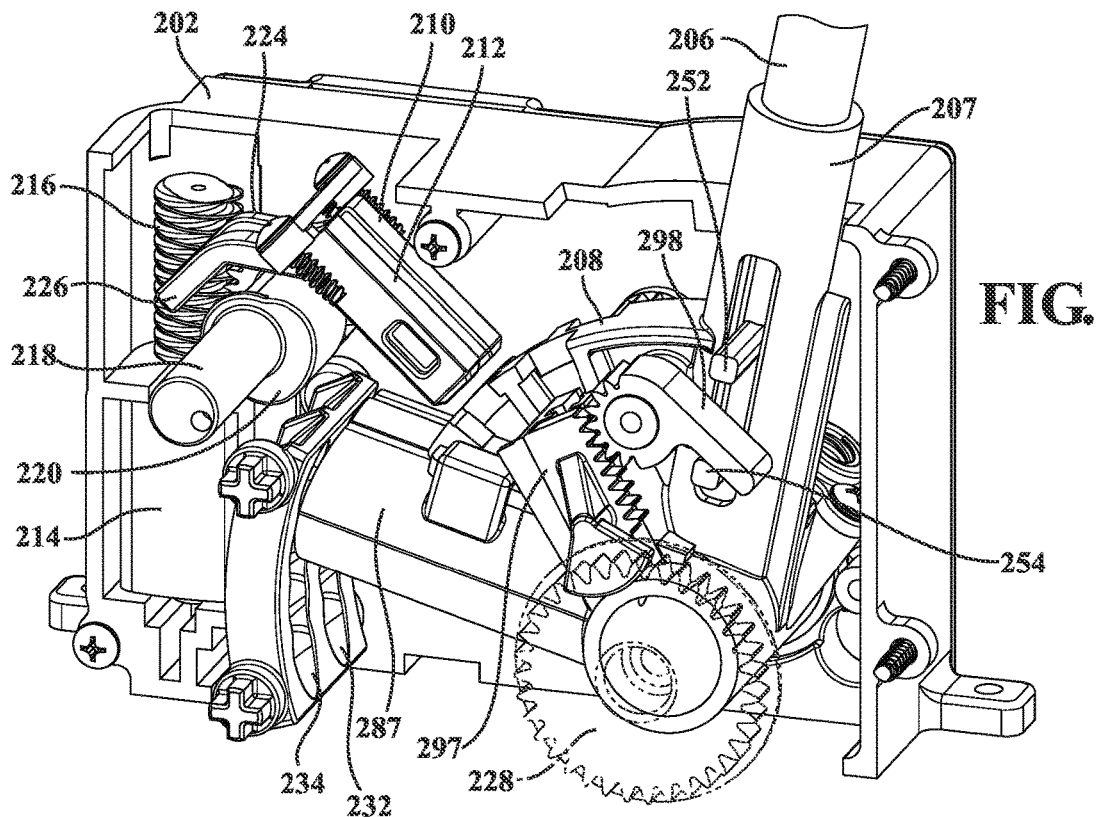
FIG. 83 succeeds shown in FIG. 82 and, upon the PCBA recognizing the cam shaft being in the proper position (i.e. again through the identified positioning of the magnet relative to the PCBA mounted hall sensor), the gate and detent pawls are both retracted (i.e. the detent pawls seat within the cam shaft valleys) and the gear seeking motor is deactivated, following which the lock motor unlocks the shift lever.

Proceeding to FIG. 83, it succeeds what is shown in FIG. 82 and, upon the PCBA 250 recognizing the cam shaft 228 being in the proper position (i.e. again through the identified positioning of the magnet relative to the PCBA mounted hall sensor), the gate 252 and detent pawls 274/276 are both retracted (i.e. the detent pawls seat within the cam shaft valleys) and the gear seeking motor 300 is deactivated, following which the lock motor 214 unlocks the shift lever 208.

Figure 84:
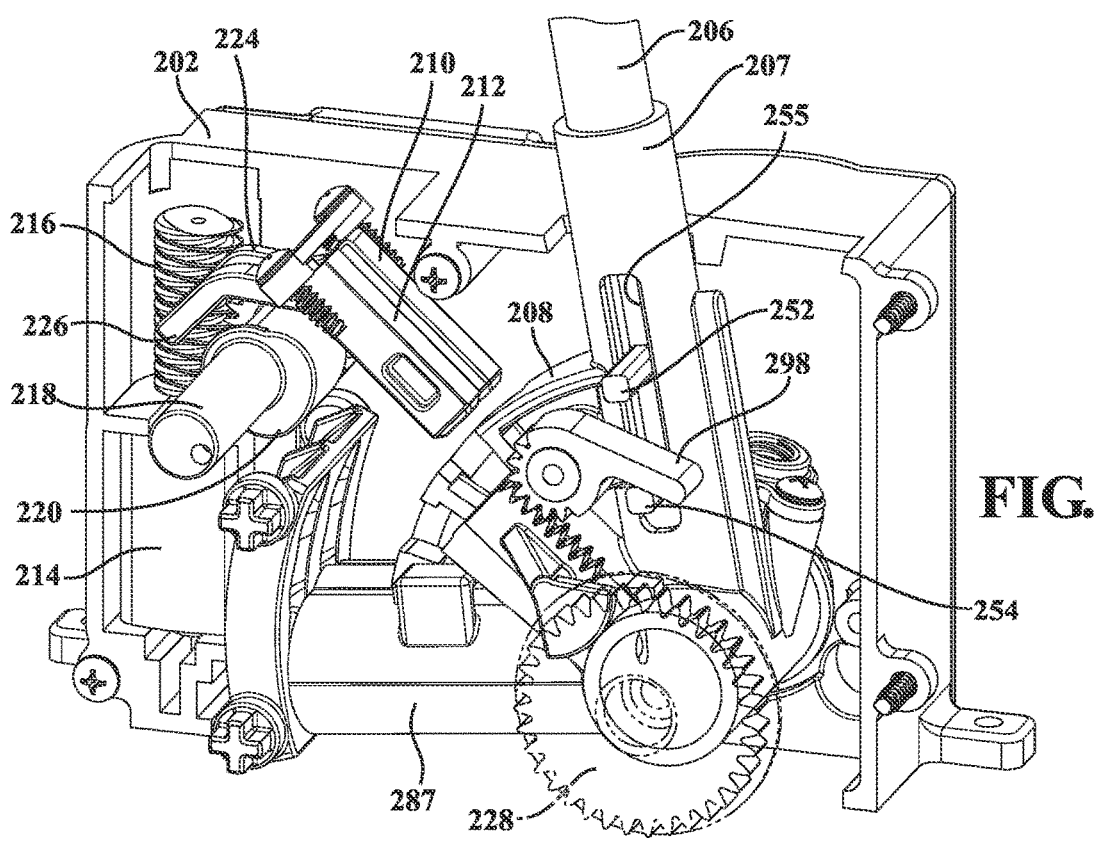
FIG. 84 is an illustration showing the gear seeking motor again being actuated to rotate in either direction (with the right plunger unlocked and left plunger retracted) to move the shift lever from a current position to a further position directed by the vehicle transmission/ECU, at which point both the cam shaft and shift lever rotate to the desired position, such as moving from the Park to the Dive position and which, upon the PCBA recognizing that the shift lever is at the desired position (again through interfacing of the magnet/Hall effect sensor), following which the gear seeking motor is deactivated.

FIG. 84 is an illustration showing the gear seeking motor 300 again being actuated to rotate in either direction (with the right plunger 212 unlocked and left plunger 210 retracted) to move the shift lever 208 from a current position to a further position directed by the vehicle transmission/ECU, at which point both the cam shaft 228 and shift lever 208 rotate to the desired position, such as moving from the Park to the Dive position and which, upon the PCBA 250 recognizing that the shift lever is at the desired position (again through interfacing of the magnet/Hall effect sensor), following which the gear seeking motor 300 is deactivated.

Figure 85:
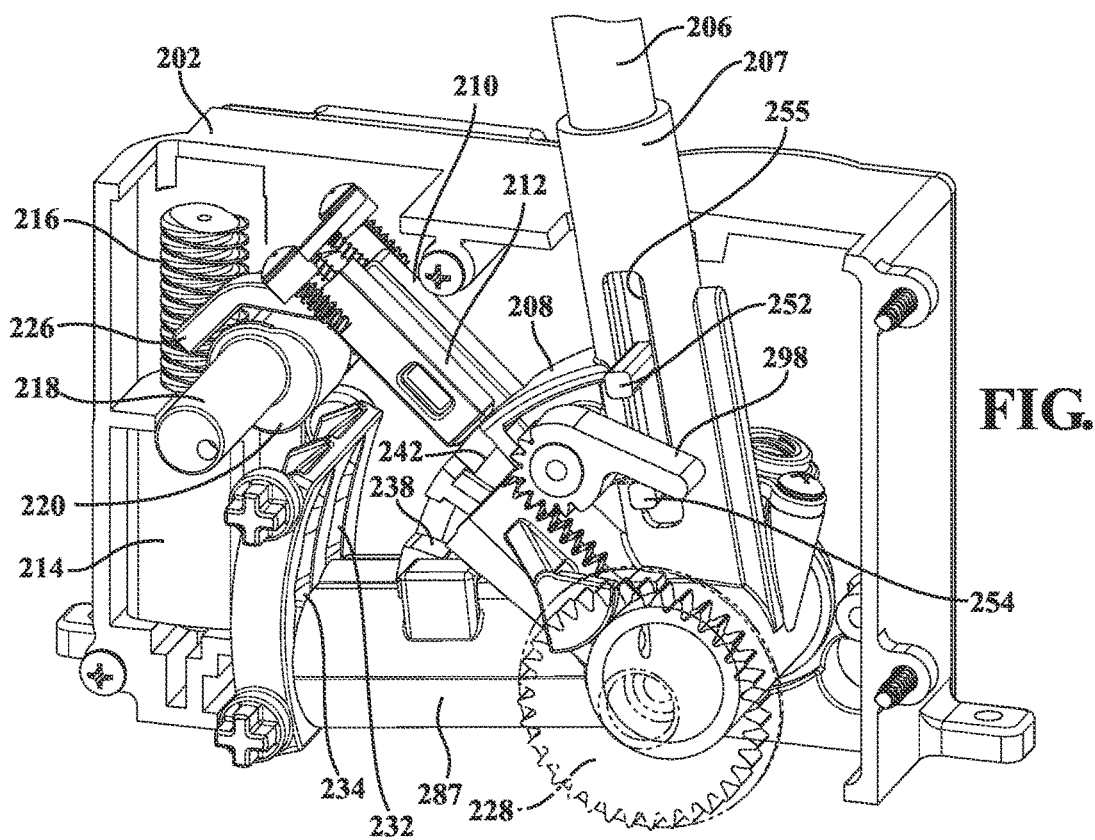
FIG. 85 further depicts the lock system being reengaged (through cam rotated re-engagement of the plungers so that the right plunger is reestablished upon the outer diameter of the shift lever and the left plunger as shown) and in order to stop shift lever assembly movement.
Figure 86:
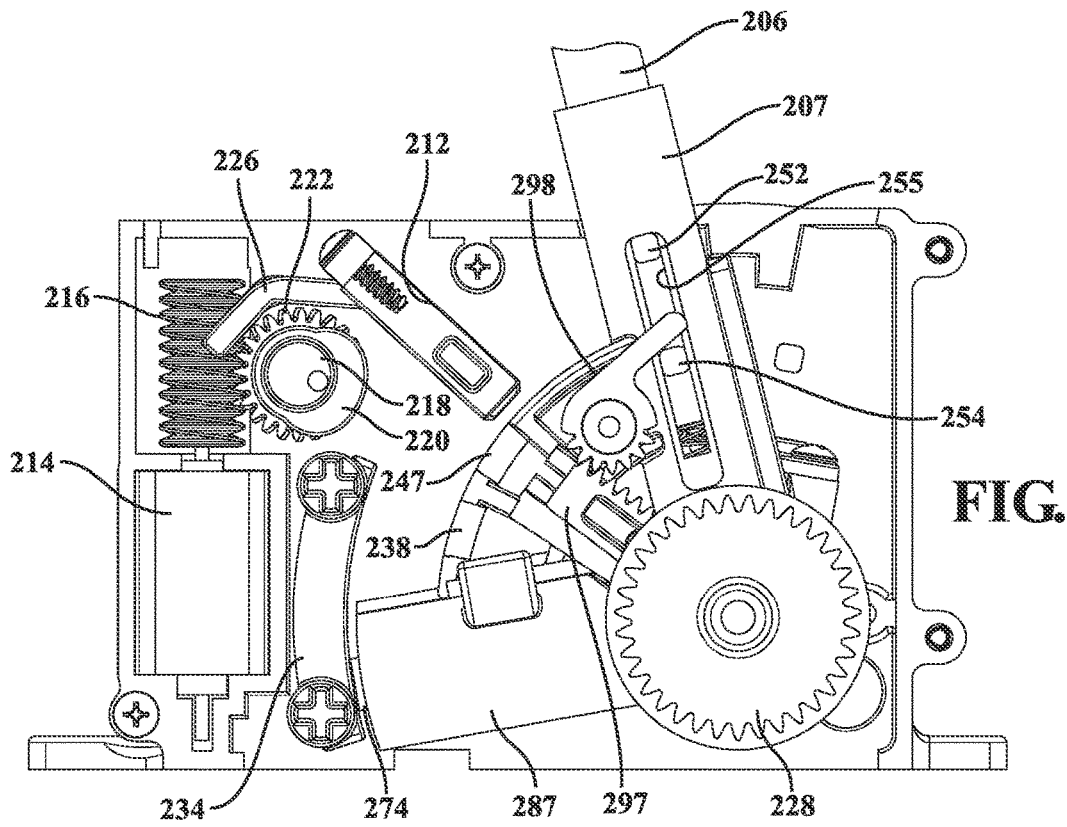
FIG. 86 presents another view of the gear seeking shifter assembly and showing the gear seeking motor actuated to rotate the cam shaft to the reset the position of the detent pawls and gate pawl and which, upon the PCBA recognizing that the CAM is at the reset (standard shift operating) position, the gear seeking motor is deactivated, thereby completing the gear seeking operation.

FIG. 85 further depicts the lock system being reengaged (through cam rotated re-engagement of the plungers so that the right plunger 212 is reestablished upon the outer diameter of the shift lever and the left plunger 210 is depicted as shown) and in order to stop shift lever assembly movement. FIG. 86 presents another view of the gear seeking shifter assembly and showing the gear seeking motor 300 actuated to rotate the cam shaft 228 to the reset the position of the detent pawls (one of which is partially shown at 274) and gate pawl 252 and which, upon the PCBA 250 recognizing that the CAM is at the reset (standard shift operating) position, the gear seeking motor 300 is deactivated, thereby completing the gear seeking operation.

Figure 87:
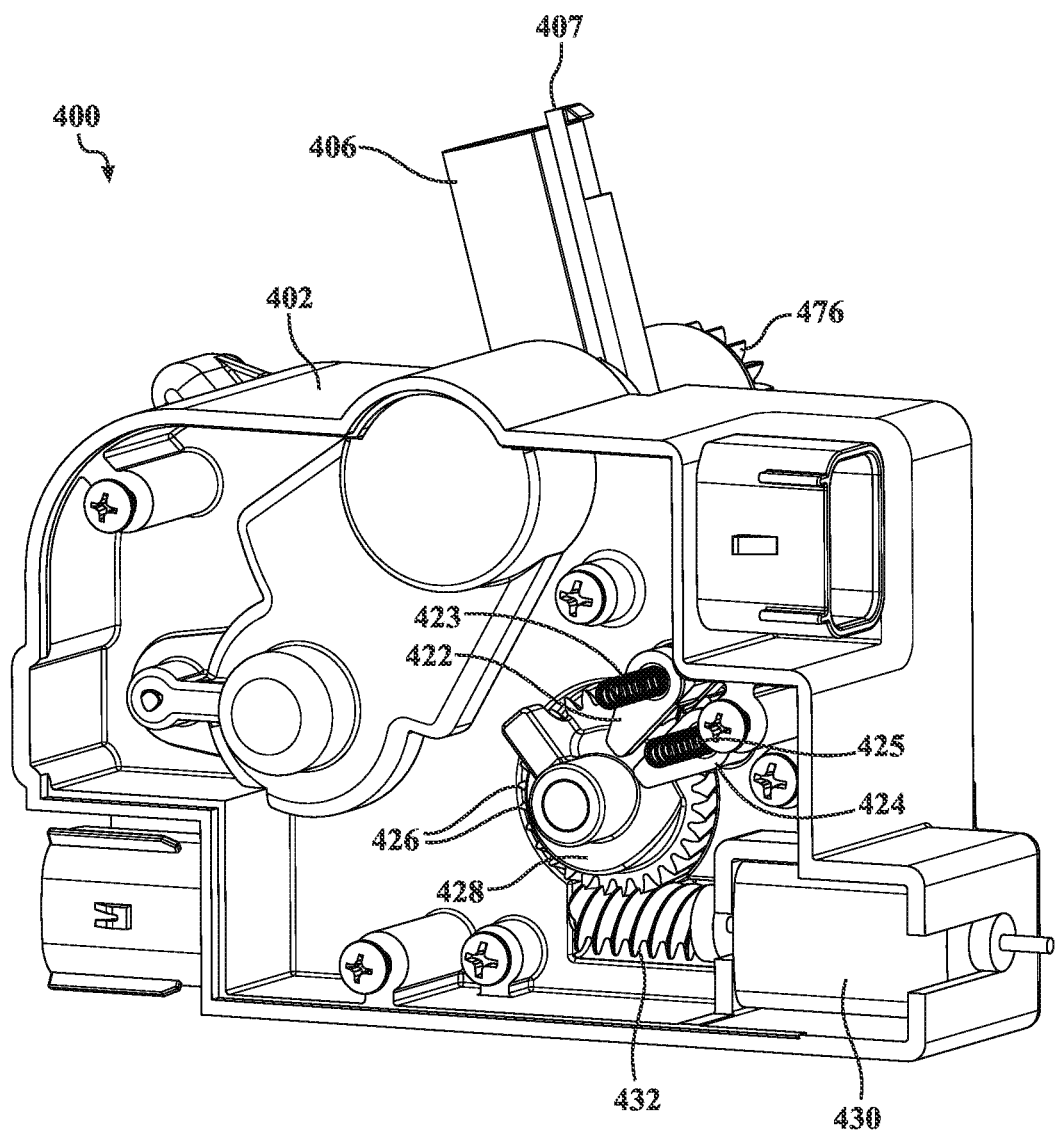
FIG. 87 is a perspective view of a plunger lock mechanism with a high shift point configuration according to a third embodiment with the right handed housing removed in order to show the interior package defining space.

Proceeding now to FIG. 87, a perspective view is generally shown at 400 of a plunger lock mechanism with a high shift point configuration according to a third embodiment, and depicting a left handed housing 402 with the right handed housing removed (not shown) in order to show the interior package defining space. Aside from some differences in structure, much of the operational narrative is the same as that described in reference to the second referred embodiment 200 (FIGS. 46-86) and is equally applicable to this embodiment.

Figure 88:
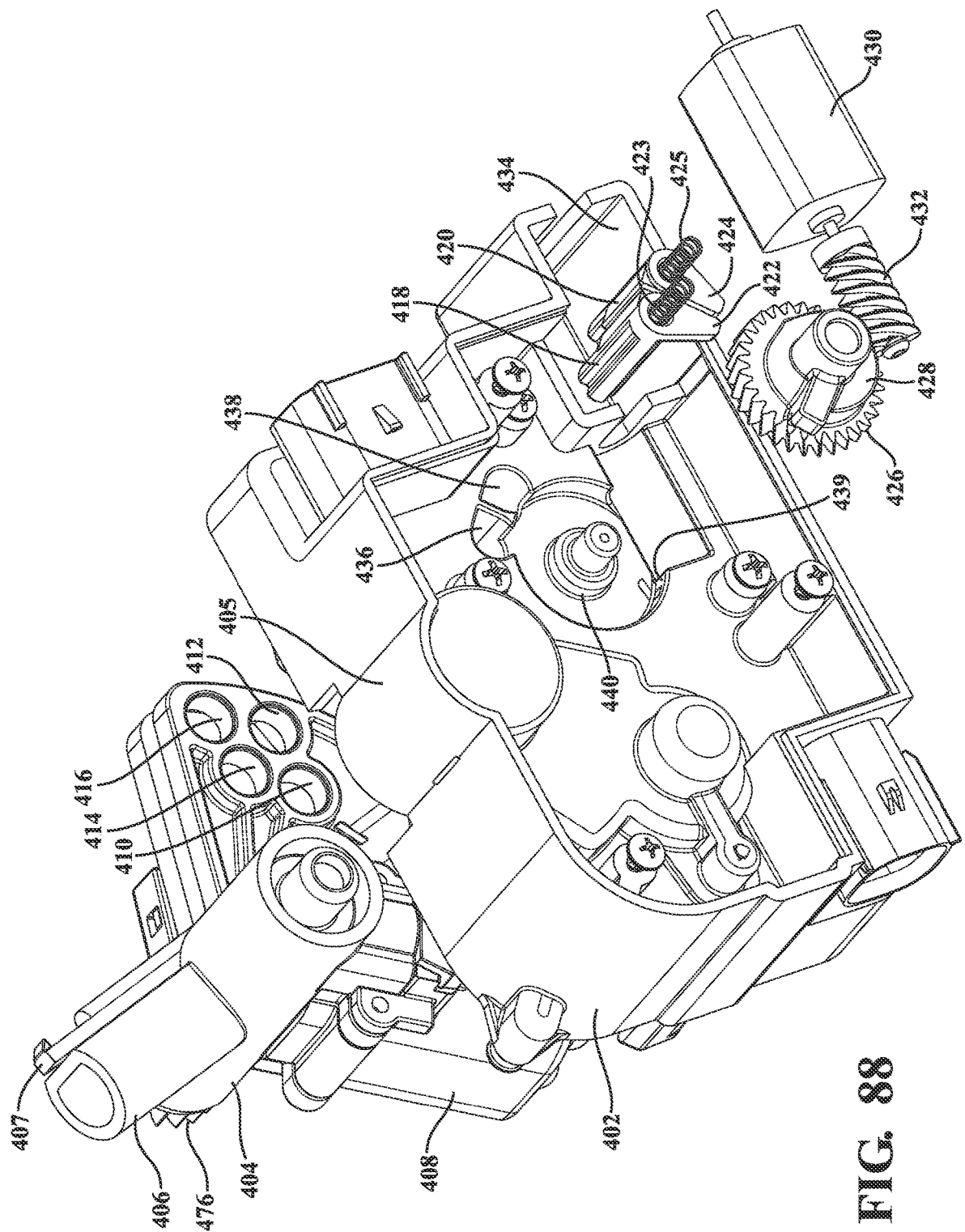
FIG. 88 is an exploded view of the plunger lock mechanism of FIG. 87 and depicting the arrangement of bores disposed within side facing locations of a wedge shaped base of the shift lever engaged by laterally directed spring loaded plungers supported within the housing.

FIG. 88 is an exploded view of the plunger lock mechanism of FIG. 87 and presents a subset collection of features similar to those described in the previous embodiments, these including a shift lever having a pivotal mounting location 404 for securing to an exterior (see at 405) of the left handed housing 402. The shift lever also includes a rod or tube 406 extending integrally upwardly from the pivotal mounting location 404. A reconfigured rod is also provided at 407 and, as will be further described in the gate operation protocol of FIGS. 97-102, can be displaced upwardly in order to shift the gears through the PRND positions.

The shift lever further includes a wedge shaped lower portion 408 which, when the shift lever is pivotally mounted to the housing, overlays the exterior of the left handed housing. The wedge shaped lower portion 408 includes an arrangement of lateral or inward side facing recessed bores disposed within side facing locations of a wedge shaped base and includes each of Park 410, Reverse 412, Neutral 414 and Drive 416 (see also FIG. 94) shifter positions.

A pair of plungers 418 and 420 are provided, each including angled tabs 422 and 424. A pair of springs 423 and 425 are provided which bias the plungers 418/420 toward the shift lever bores and which, as understood, can also be redesigned to bias in a reverse direction away from the shift lever bores depending upon the actuating mechanism being employed.

Figure 89:
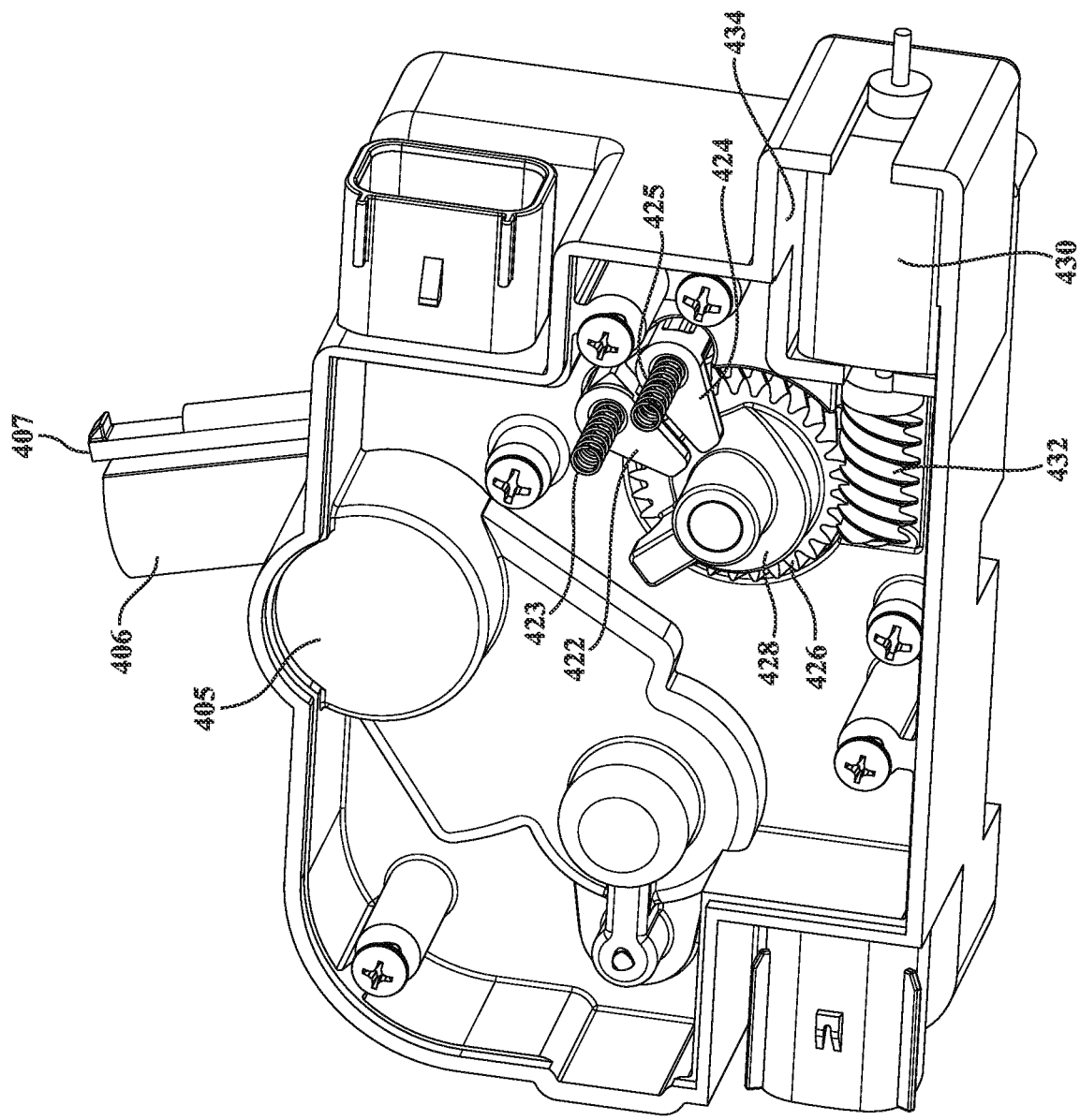
FIG. 89 is an enlarged view of the plunger lock mechanism shown in FIG. 87 and better depicting the motor and gear assembly with inter-rotating CAM interface exhibiting a circumferential ramp surface for displacing the plungers relative to the shifter lever bores.

A gear shaped lock CAM is provided and includes each of an outer geared periphery 426 in addition to an inner arranged and laterally projecting circumferential ramped surface 428 which, when rotated, coacts against the angled tabs 422/424 as best shown in FIG. 89. A motor 430 and output worm 432 are provided and coact with the outer gear profile 426 of the lock CAM.

A pocket 434 is configured within the left handed housing 402 for seating the motor 430 and worm 432. Additional recess locations are depicted 436 and 438 in the left handed housing 402 for seating the plungers 418 and 420, along with an annular recess mounting profile 439 with central support post 440 for mounting the lock CAM 426.

Consistent with the description in FIG. 47 of the prior embodiment 200, the motor driven cam 426 sets the position of the spring-loaded plungers 418/420 which interface with the bores 410, 412, 414, and 416 depicted in the shift lever wedge base 408. The Park 410 and Neutral 414 bores are in rotary alignment with plunger 418, with the Reverse 412 and Drive 416 bores in rotary alignment with the plunger 420. In this fashion, and as the shift lever is rotated to a given shifter position (PRND), a corresponding bore is exposed to one of the plungers 418/420, so that the plungers selectively and alternately mate with the selected bores located on the shift lever wedge base in order to prevent movement of the shift lever. As also previously noted, and if only Park or Neutral is required, then only one plunger is required. As also previously described, a position sensor can be utilized to detect the position of the lock CAM 426.

FIG. 89 is an enlarged view of the plunger lock mechanism shown in FIG. 87 and better depicting the motor 430 and gear 432 assembly with inter-rotating lock CAM interface exhibiting the circumferential ramp surface 428 for displacing the plungers 418/420, again via their angled end tabs 422/424 relative to the shifter lever bores Park 410/Neutral 414 and Reverse 412/Drive 416. As shown, the springs 423/425 bias the plungers 418/420 in the direction of the shift lever bores, with the lock CAM circumferential ramp profile 428 rotating to actuate on the lock tabs 422/424 in order to counter-bias retract the plungers. An alternate arraignment (not shown) would include the plungers and spring being redesigned so that the plungers are biased away from the bores, with a redesigned lock CAM having it circumferential ramped profile located on an outer or opposite surface of the angled end tabs for actuating the plungers in a seating direction toward the shifter lever bores.

Figure 90:
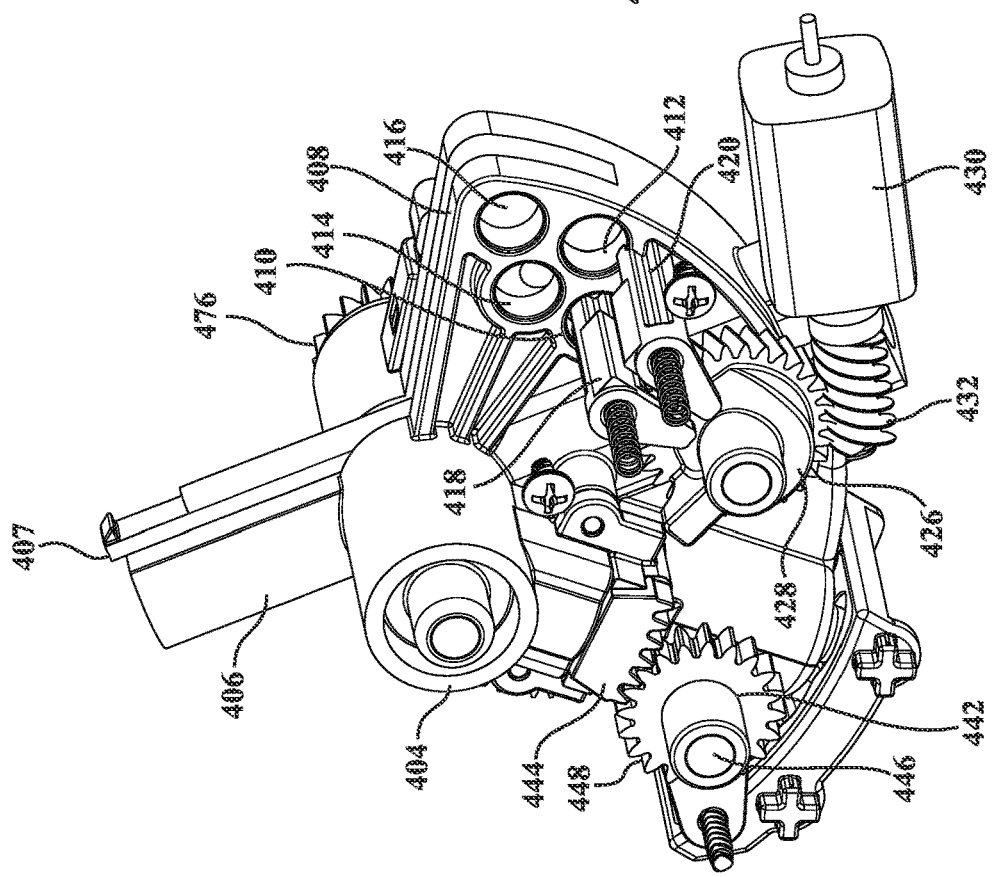
FIG. 90 presents an exploded view of selected components which depicts a selected one of the plungers or lever arms in the locked/engaged position within a mating side recess defined in the shift lever or handle prior to retracting engagement by the cam.

FIG. 90 presents an exploded view of selected components which depicts a selected one of the plungers 418 or lever arms in the locked/engaged position within a mating side recess defined in the shift lever or handle prior to retracting engagement by the cam 426. Additional features depicted include each of a sensor gear 442 and outer gear profile 444 located on the shift lever. As additionally shown in FIG. 103, the sensor gear 442 is provided with an on axis magnet 446, along with an outer circumferential gear array 448, which interfaces with the opposing and intermeshing teeth of the outer gear profile 448. In this fashion, and as the shift lever rotates, the sensor gear likewise rotates with the magnet 446 being position over a Hall effect sensor integrated into a PCBA board 450 (see FIGS. 104/106) which monitors and communicates the position of the shift lever.

Figure 91:
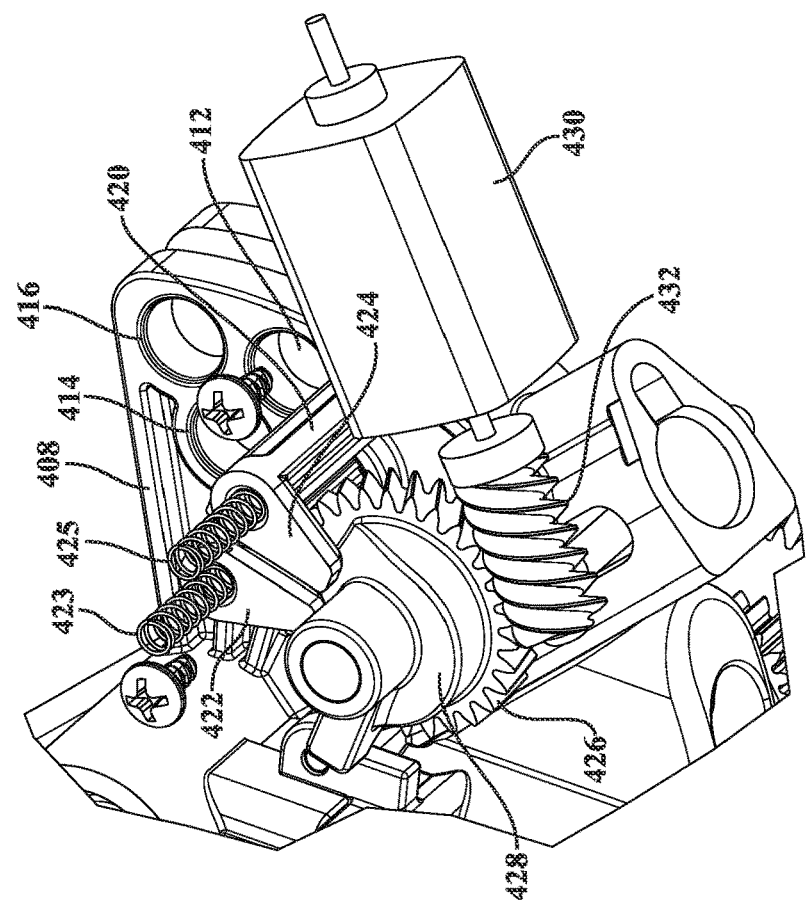
FIG. 91 is an enlarged and rotated view to FIG. 90 and again showing the lock position with the plunger engaged within the bore of the shift lever.
Figure 93:
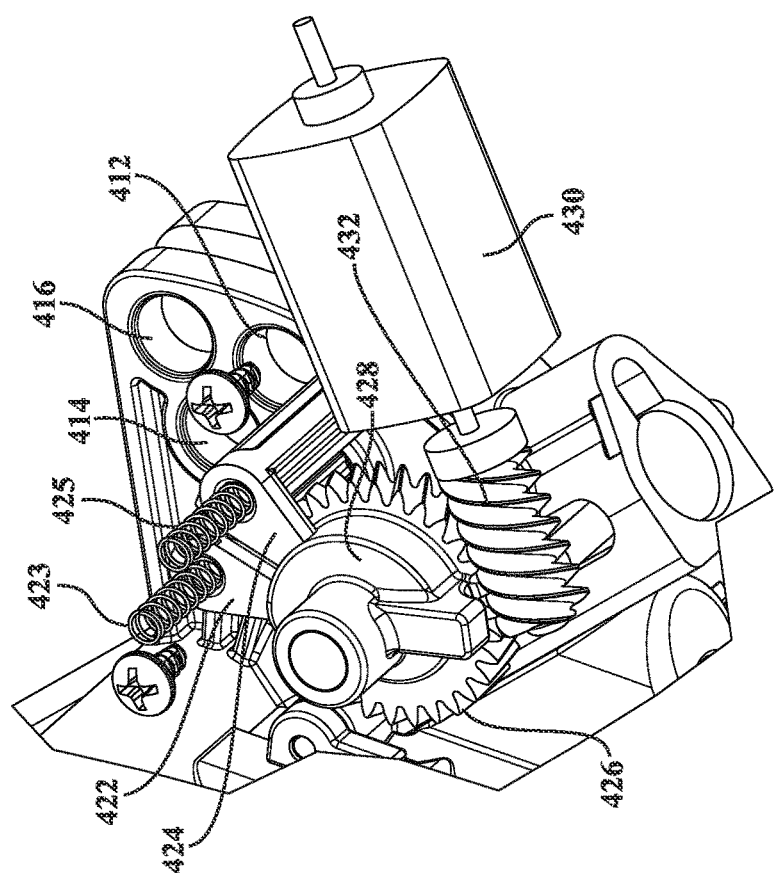
FIG. 93 is an enlarged view similar to FIG. 91 depicting the ramped engagement of the plunger by the rotating CAM in the retracted position of FIG. 92.
Figure 92:
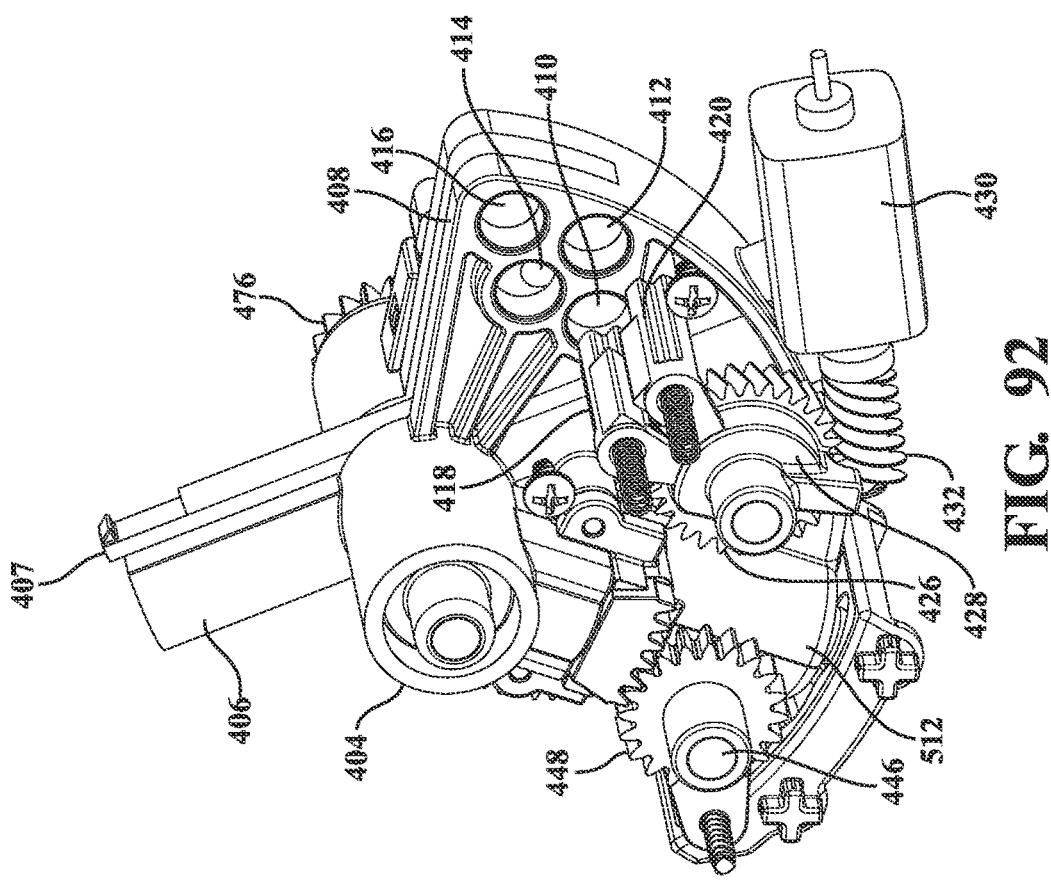
FIG. 92 illustrates a CAM interface unlock position in which the plunger is retracted out of engagement with the side facing shift lever bore.

FIG. 91 is an enlarged and rotated view to FIG. 90 and again showing the lock position with the plunger 418 (not substantially shown) engaged within the aligning bore 410 of the shift lever (this also being substantially shown in FIG. 90). FIG. 92 illustrates a CAM interface unlock position in which the plunger 418 is retracted out of engagement with the side facing shift lever bore 410. FIG. 93 is an enlarged view similar to FIG. 91 depicting the ramped engagement of the plungers 418/420 by the rotating the lock CAM 426 in the retracted position of FIG. 92.

Figure 95:
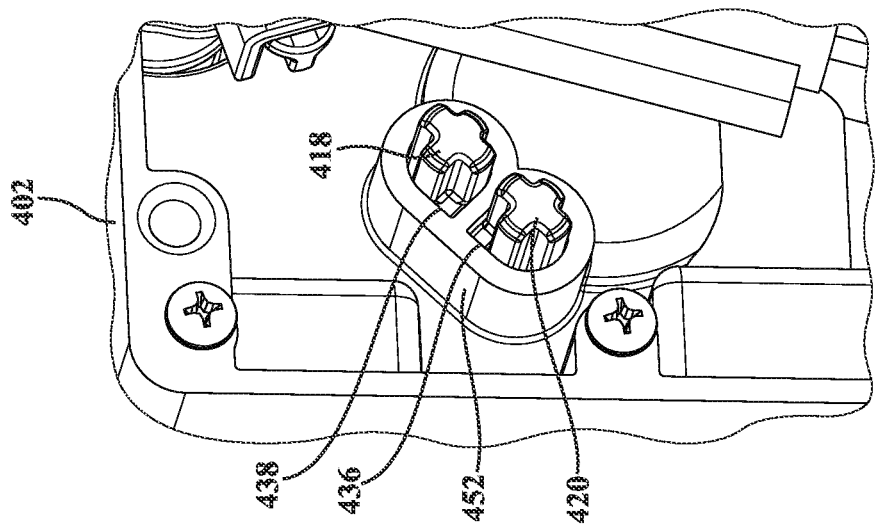
FIG. 95 is a rotated partial view of the plunger to housing interface visible from an exterior of the left handed housing.
Figure 94:
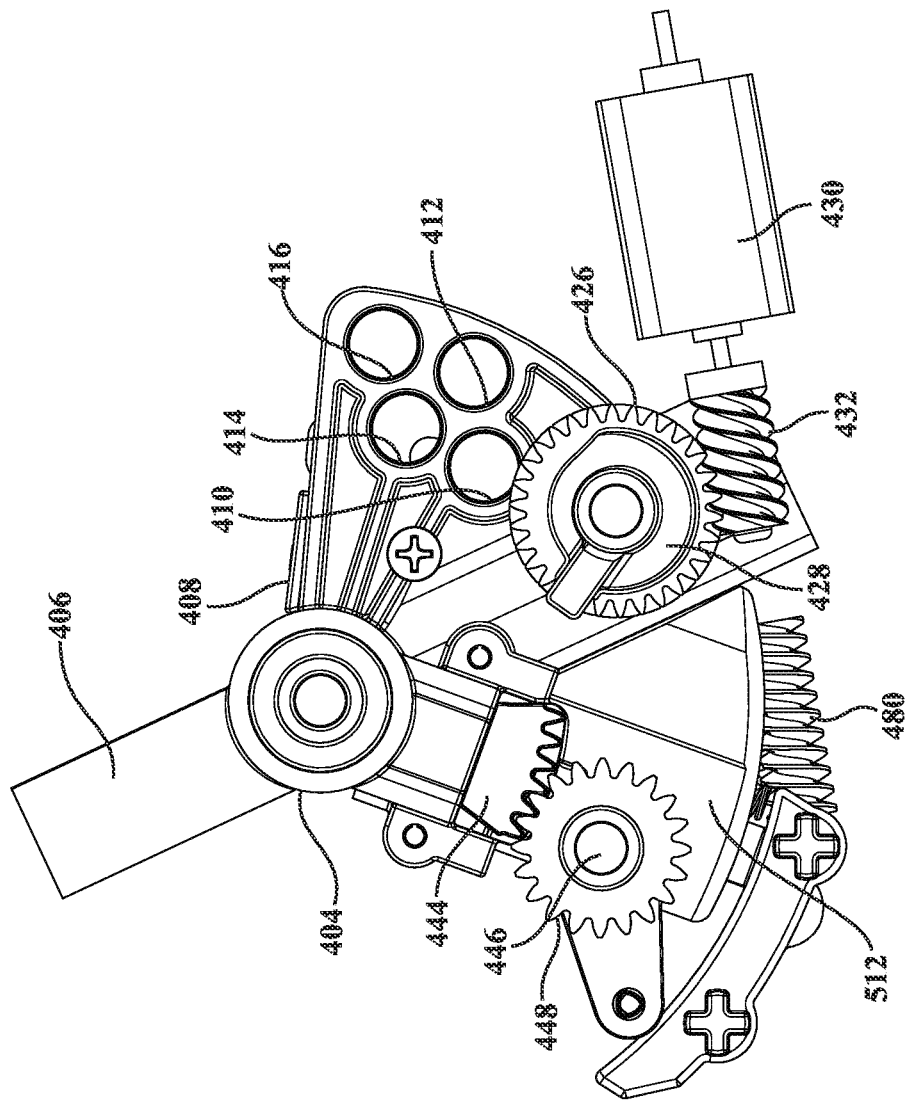
FIG. 94 is a plan view of the shift lever bore interface depicting the Park, Reverse, Neutral and Drive positions configured upon the side facing surface of the shift lever wedge shaped base.

FIG. 94 is a plan view of the shift lever bore interface again depicting the Park 410, Reverse 412, Neutral 414 and Drive 416 positions configured upon the side facing surface of the shift lever wedge shaped base 408. FIG. 95 is a rotated partial view of the plunger to housing interface visible from an exterior of the left handed housing 402 and which is further depicted by a local projection 452 configured upon the exterior of the left handed housing through which the recess locations 436/438.

Figure 96:
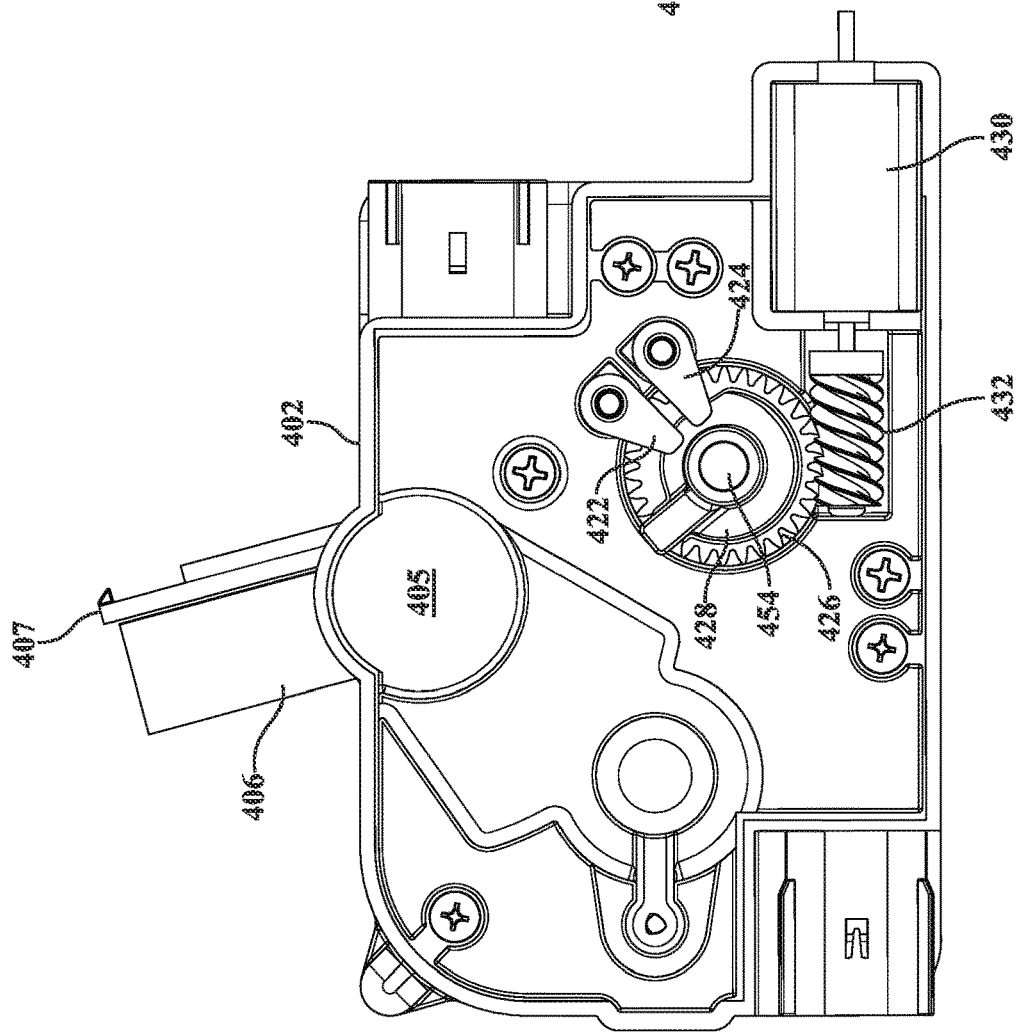
FIG. 96 is plan view depiction of the left handed housing with a magnet secured to an end face of the CAM component for interfacing with a position sensor to inform the associated vehicle electronics the position of the CAM.

FIG. 96 is plan view depiction of the left handed housing 420 with a magnet 454 secured to an end face of the CAM 426 for interfacing with a position sensor (such as mounted to a further location of the PCBA 450) to inform the associated vehicle electronics as to the position of the CAM.

Figure 97:
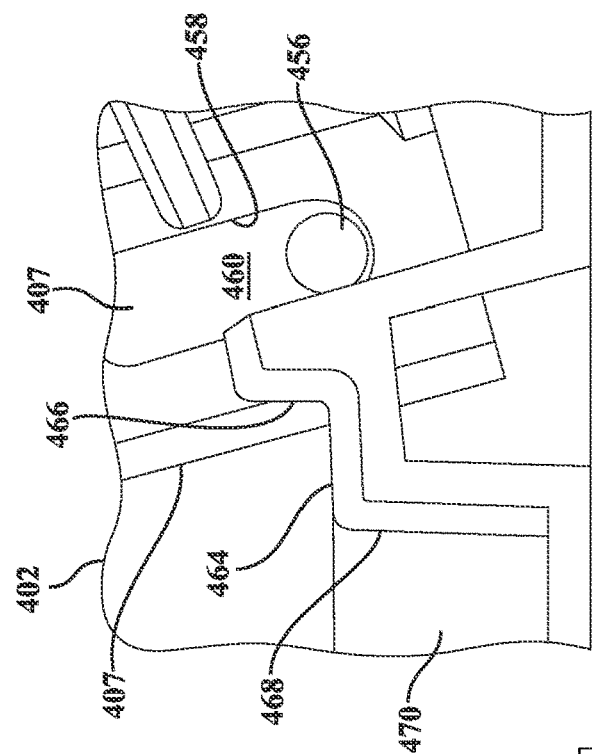
FIG. 97 illustrating the gate profile configured on both the left and right housing interior locations in proximity to a base portion of the shift lever.

Proceeding to FIG. 97, an underside facing gate profile is shown which is configured within interior base locations on both the left side 402 and right side (not shown) housings, this also shown in the cutaway views of FIGS. 99-103. A lower most portion of the inner rod 407 is shown with a projecting gate pawl 456 affixed or integrally formed and projecting therefrom so that the projecting gate pawl displaces within a length-extending slot (see inner perimeter end wall 458) configured into the lower end of the tube 407.

Figure 99:
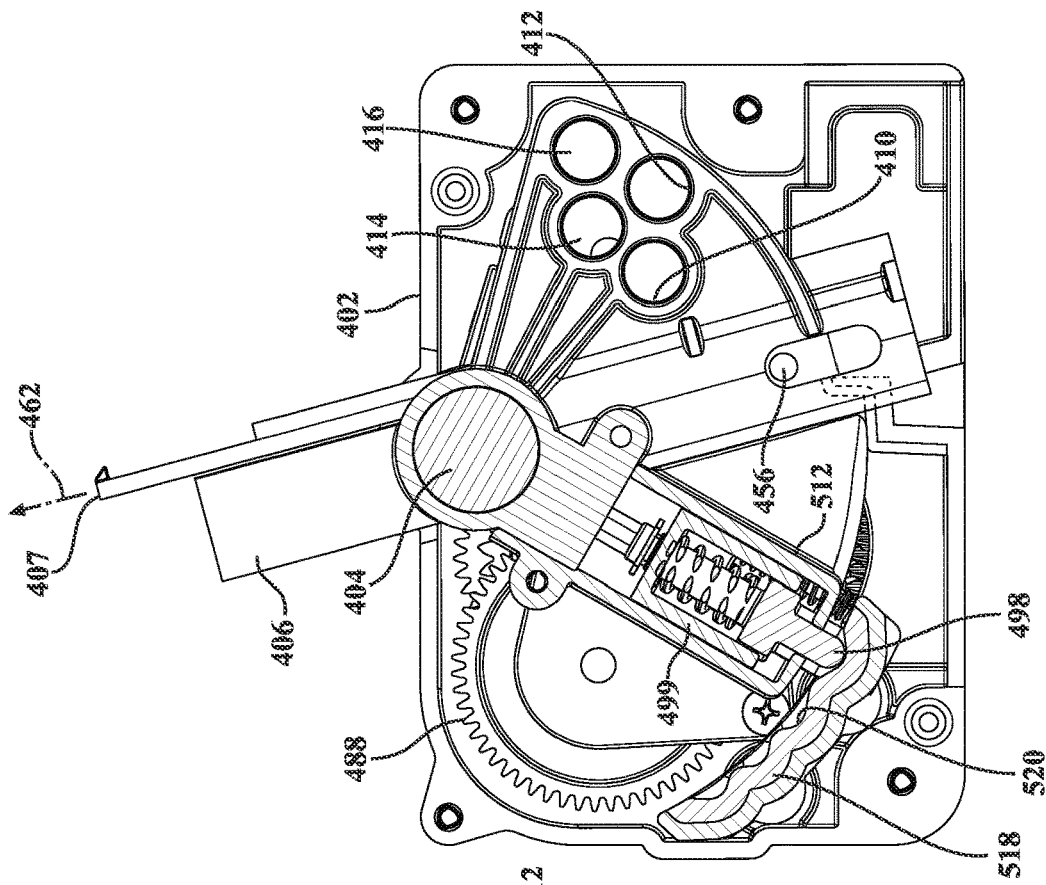
FIG. 99 is a succeeding view to FIG. 98 and showing the shifter in the Park position, with gate pawl not blocked by the gate resulting from the shift rod being upwardly displaced so that the gate pawl clears the gate wall.
Figure 98:
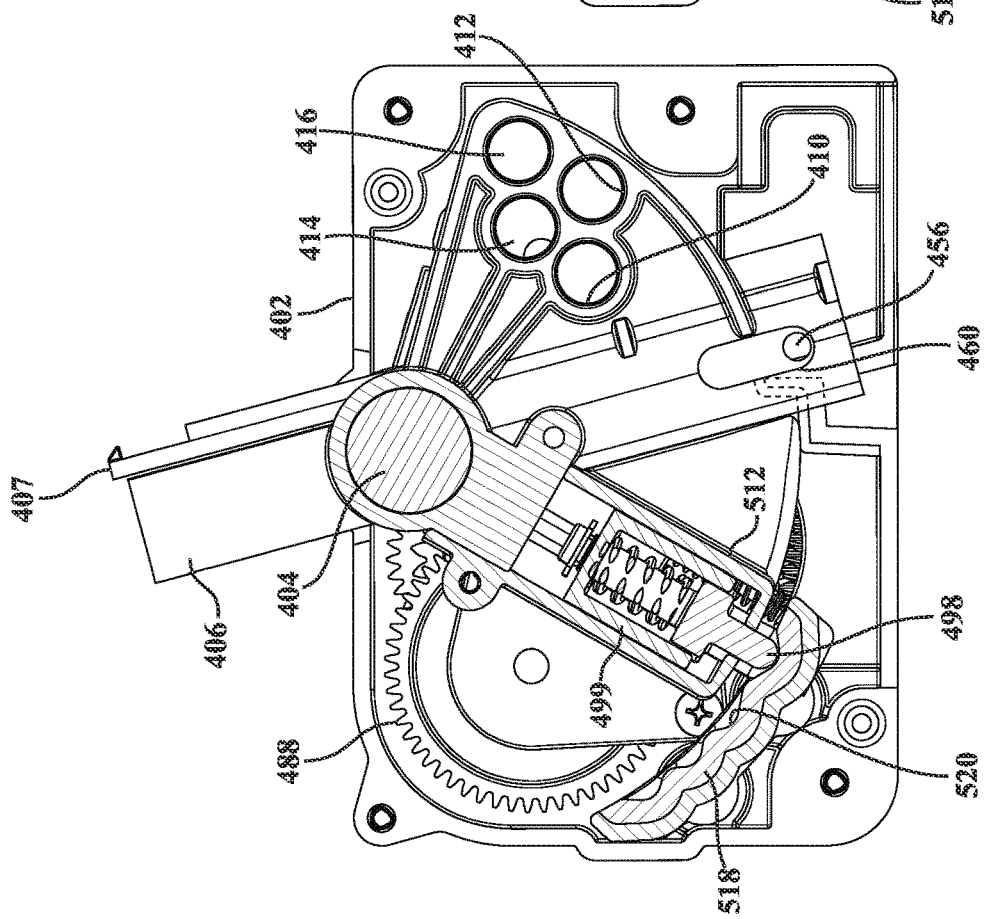
FIG. 98 depicts the shifter in the Park position with the gate pawl blocked by the shifter gate.

FIG. 98 depicts the shifter in the Park position (see gate location 460) with the gate pawl 456 blocked by the shifter gate 460. FIG. 99 is a succeeding view to FIG. 98 and shows the shifter in the Park 460 position, with gate pawl 456 not blocked by the gate 460 resulting from the shift rod being displaced upwardly (see arrow 462) so that the gate pawl clears the gate wall.

Figure 100:
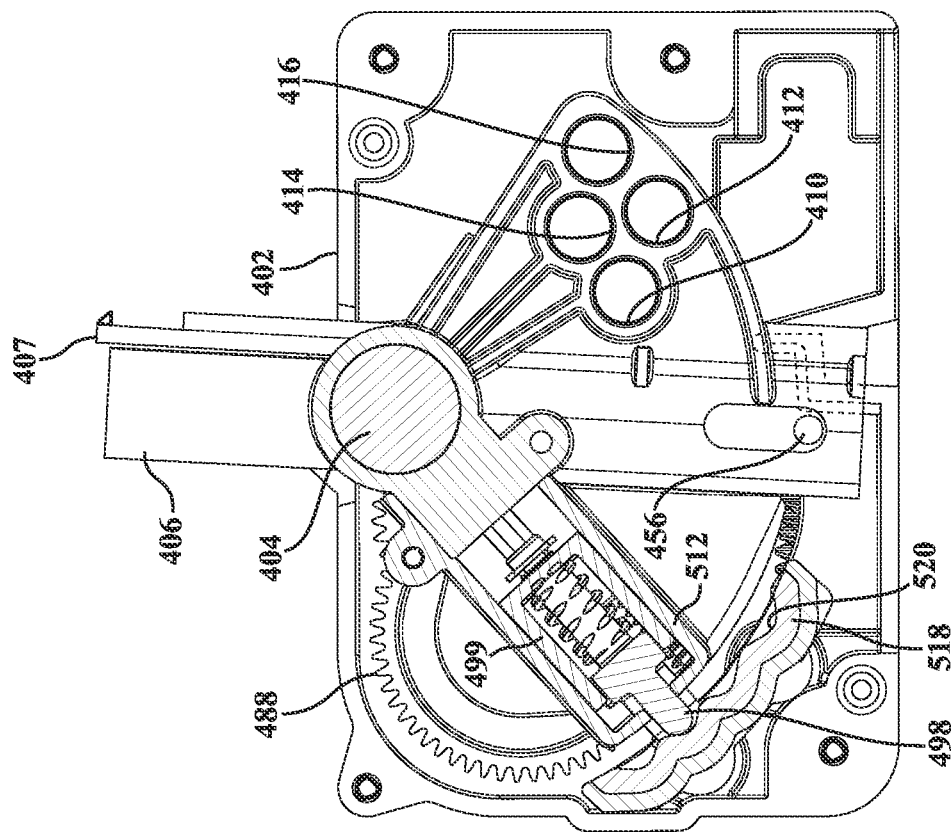
FIG. 100 is a succeeding view with the shift lever rotated to the Reverse position, with the gate pawl blocked by the gate wall between the Reverse and Park positions.
Figure 101:
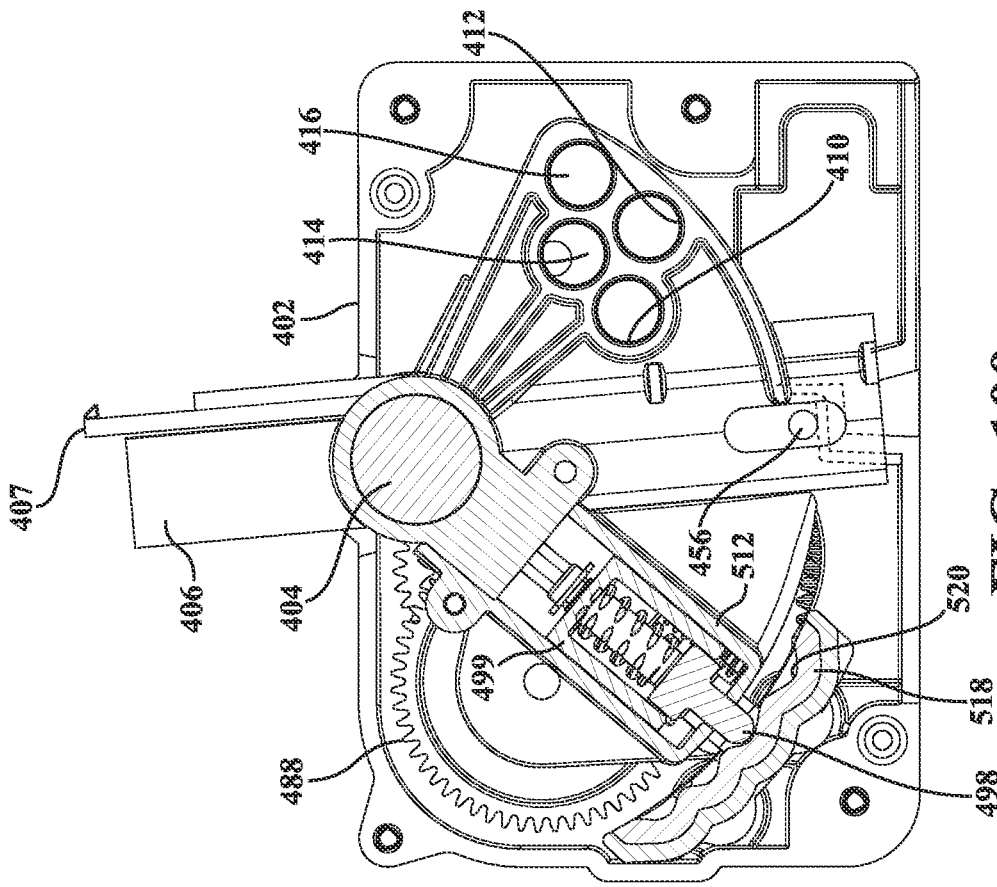
FIG. 101 is a further succeeding cutaway illustration depicting the shifter in the Neutral position with the gate pawl blocked by the gate wall between the Neutral and Reverse positions.
Figure 102:
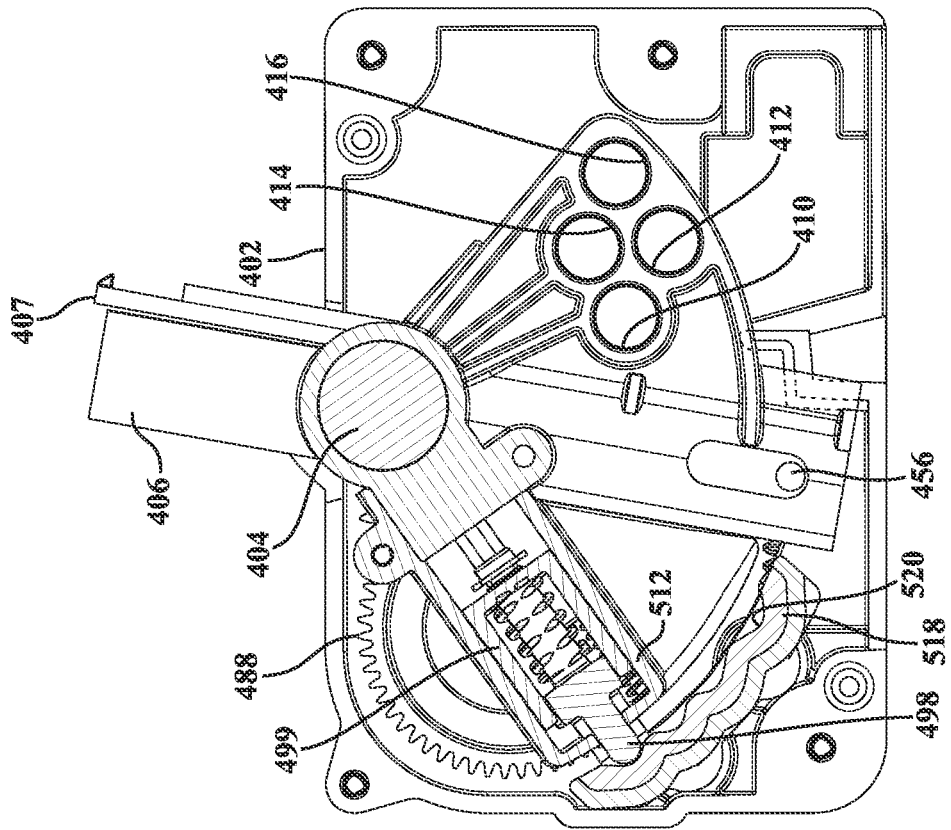
FIG. 102 presents a yet further illustration of the shifter in the Drive position, with no blockage of the gate pawl between the Neutral and Drive positions.

FIG. 100 is a succeeding view with the shift lever rotated to the Reverse position (gate 464), with the gate pawl blocked by gate wall 466 depicted between the Reverse and Park positions. FIG. 101 is a further succeeding cutaway illustration depicting the shifter in the Neutral position (gate 468) with the gate pawl 456 blocked by the gate wall (same location) between the Neutral and Reverse positions. FIG. 102 presents a yet further illustration of the shifter in the Drive position (gate 470), with no blockage of the gate pawl between the Neutral and Drive positions.

Figure 103:
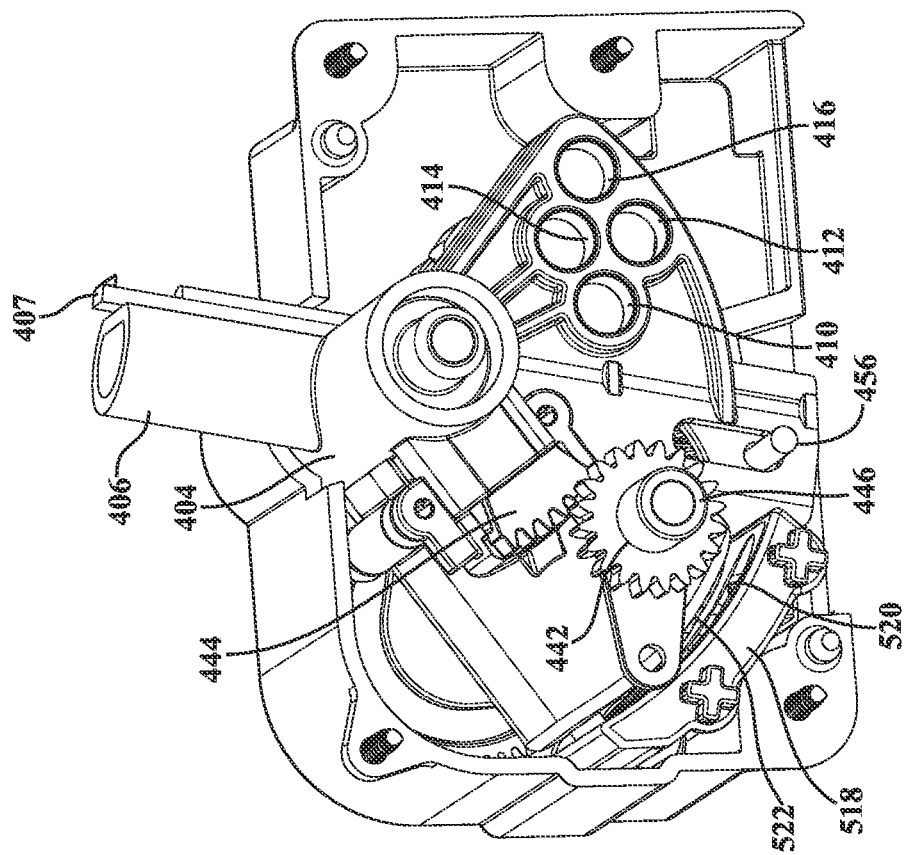
FIG. 103 is a perspective view of the shift position sensing mechanism and illustrating a sensor gear with an on axis magnet interfacing with the outer gear profile on the shift lever, such that the sensor gear rotates with the shift lever and an end supported magnet rotates relative to a Hall effect sensor located on a PCBA which monitors and communicates the position of the shift lever.

As previously described in related FIG. 90, succeeding FIG. 103 presents a perspective view of the shift position sensing mechanism, and again illustrates the sensor gear 442 having the on axis magnet 446 interfacing with the outer gear profile 444 on the shift lever such that, and as previously stated, that the sensor gear rotates with the shift lever and end supported magnet rotates relative to a Hall effect sensor located on a PCBA 450 which monitors and communicates the position of the shift lever.

Figure 104:
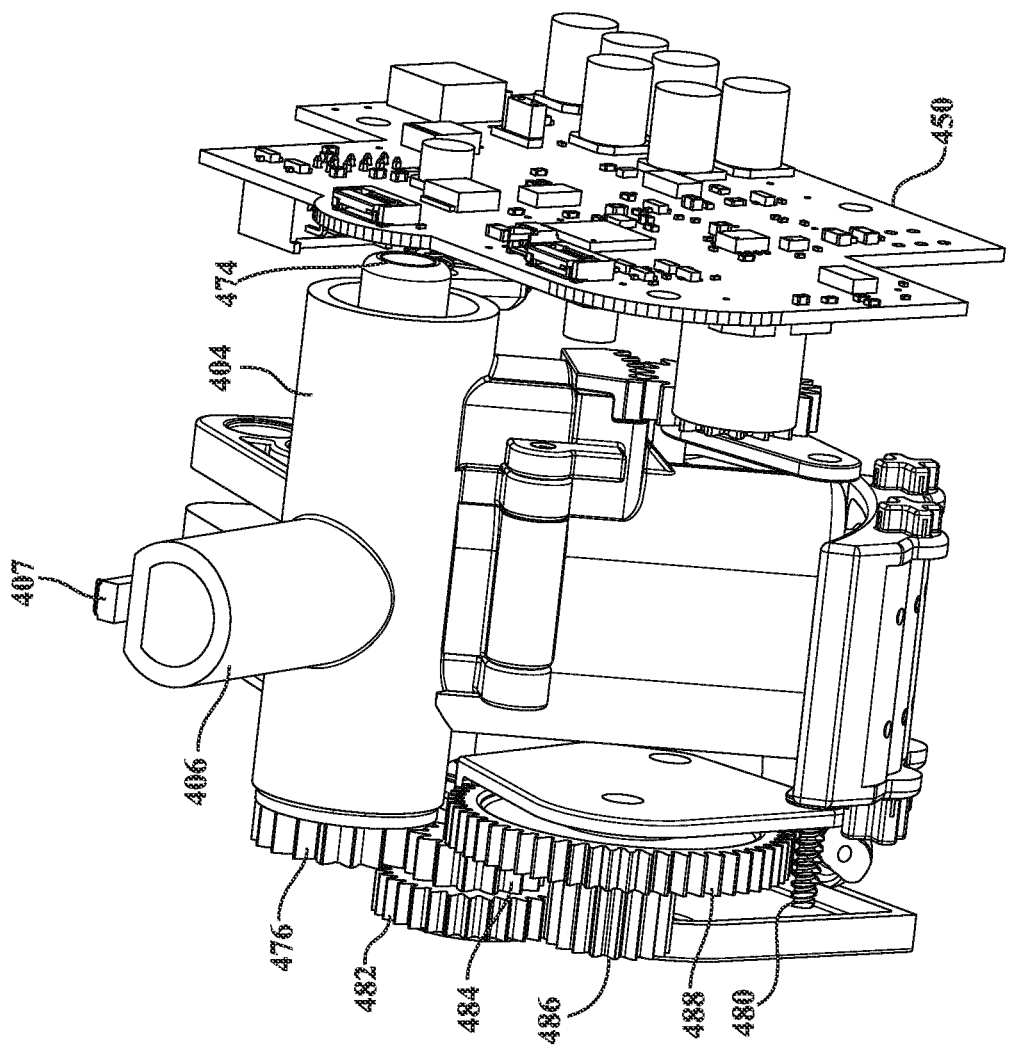
FIG. 104 provides a rotated partial exploded view depicting a gear seeking cam shaft having an end positioned magnet additional to that included with the sensor gear and located over a Hall effect sensor located on the PCBA for monitoring and providing positioning of the cam shaft for coordinating motor activity for pawl retracting/reset operations.

Proceeding to FIG. 104, provided is a rotated partial exploded view depicting a gear seeking cam shaft (see also at 472 in FIG. 105) and having an end positioned magnet 474, this additional to that included with the sensor gear and located over the Hall effect sensor located on the PCBA, and for monitoring and providing positioning of the cam shaft for coordinating motor activity for pawl retracting/reset operations.

The gear seeking explanation is similar to that previously described with reference to the prior embodiment 200 and reference is again made to the explanatory descriptions previously provided with the revision to the current embodiment contemplating the CAM profiles to be described on the gear seeking CAM shaft interacting with a rocker arm and push rod mechanism coupled to a pin and connected to the push rod. As will be further described in the succeeding figures, the CAM 472 being rotated, so that the push rod is pushed outward, rotating the rocker arm which then pulls the pin inwardly, thereby moving the pull rod 407 upwardly and also moving the gate pawl 456 inwardly in order to clear the physical gates (see again FIG. 97) configured into the left and right sided shifter housings.

The shift lever is held in position utilizing the lock mechanism previously described, allowing the gear seeking motor system to rotate the gear seeking CAM shaft 472, retracting the detent pawls (subsequently described) and gate pawl 456. At this point, the locks are released with the gear seeking motor continuing to rotate to move the shift lever to the commanded position. One the position is found, and autonomous commands are no longer necessary, the lock plungers 418/420 are engaged into whichever gear the lever is position in alignment with, with the CAM shaft 472 being rotated to reset the engagement of the gate pawl 456 and detent pawls, ending the gear seeking operation and restoring standard shift functionality.

Figure 105:
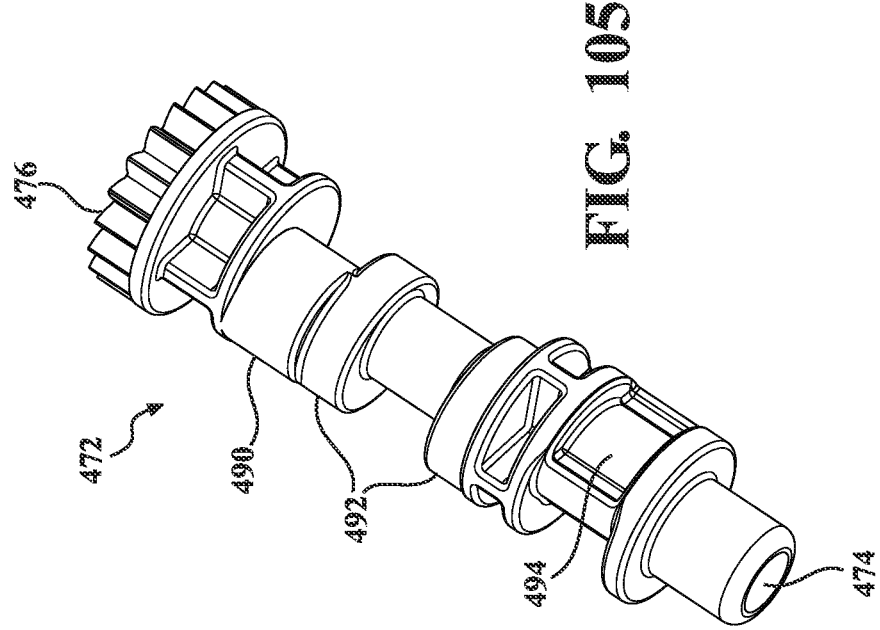
FIG. 105 presents a perspective illustration of the CAM shaft with end supported magnet.
Figure 111:
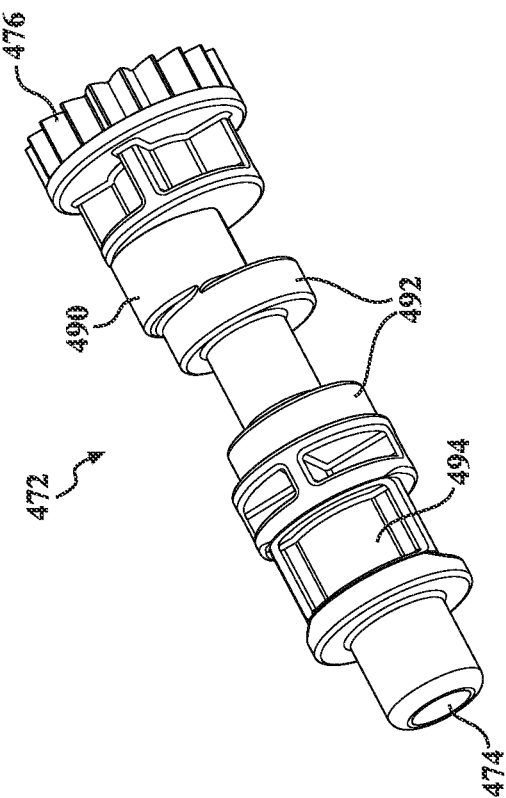
FIG. 111 is another depiction of the gear seeking CAM shaft of FIG. 105 and illustrating each of a first profile for interacting with the gate pawl retraction pin to pull the push rod/gate pawl inward to clear the gates, a second profile for interacting with the detent pawl housing cartridges and a third profile for interacting with a pawl to engage/interfere with the shift lever on an auto shift mode.
Figure 110:
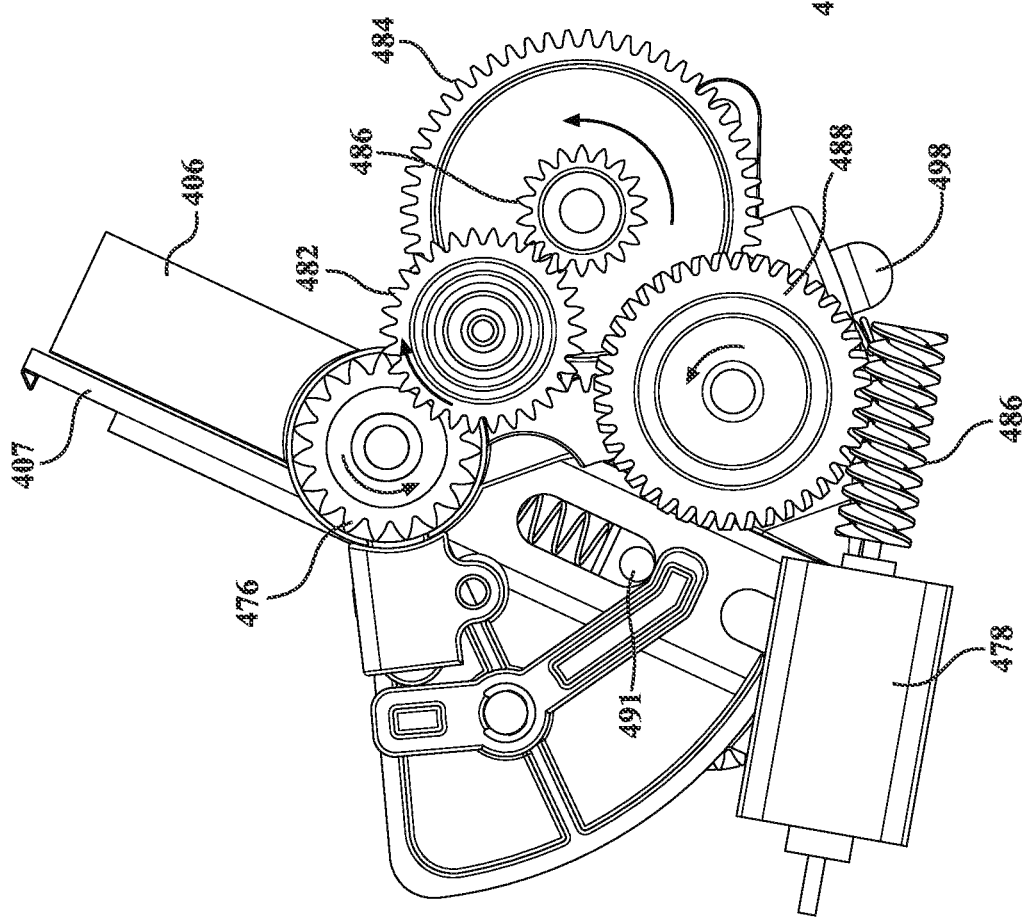
FIG. 110 is a plan view of the gear seeking train including spur gear profile on the CAM shaft interacting with a spur gear profile on gear, which in turn has a larger spur gear profile end, which interacts with spur gear profile, which component has a larger diameter spur gear which interacts with another component spur gear profile, which component has a larger end worm gear profile which interacts with the worm on the motor shaft.

FIG. 105 presents a perspective illustration of the CAM shaft with end supported magnet. FIG. 111 provides another depiction of the gear seeking CAM shaft of FIG. 105, viewed from a different angle. As shown, the cam shaft 472 seats within the pivotal mounting location 404 of the shifter housing so that a first enlarged diameter gear end 476 is positioned so that it can be actuated by a gearing arrangement operable from a gear seeking motor 478 and output worm 480 (see also FIGS. 110 and 114).

Additional gear components include spur gear 482 meshing with cam shaft gear end 476, the spur gear 482 in turn being actuated by an intermediate larger diameter gear 484 having an inner radial gear profile 486 in meshing engagement with spur gear 482. A further worm gear profile is shown at 488 which interfaces with the worm 480 on the gear seeking motor 478.

Referencing again FIGS. 105 and 111, the gear seeing CAM shaft 472 includes each of a first profile 490 for interacting with a gate pawl retraction pin (see at 491 in FIG. 112) to push the rod 407 outward and gate pawl 456 inward to clear the gates as previously described in FIG. 97. A second profile (see pair of locations 492) interact with the detent pawl housing cartridges (described below) and a third profile 494 is shown for interacting with the shift lever pawls to engage/interfere with the shift lever on an auto shift mode.

Figure 106:
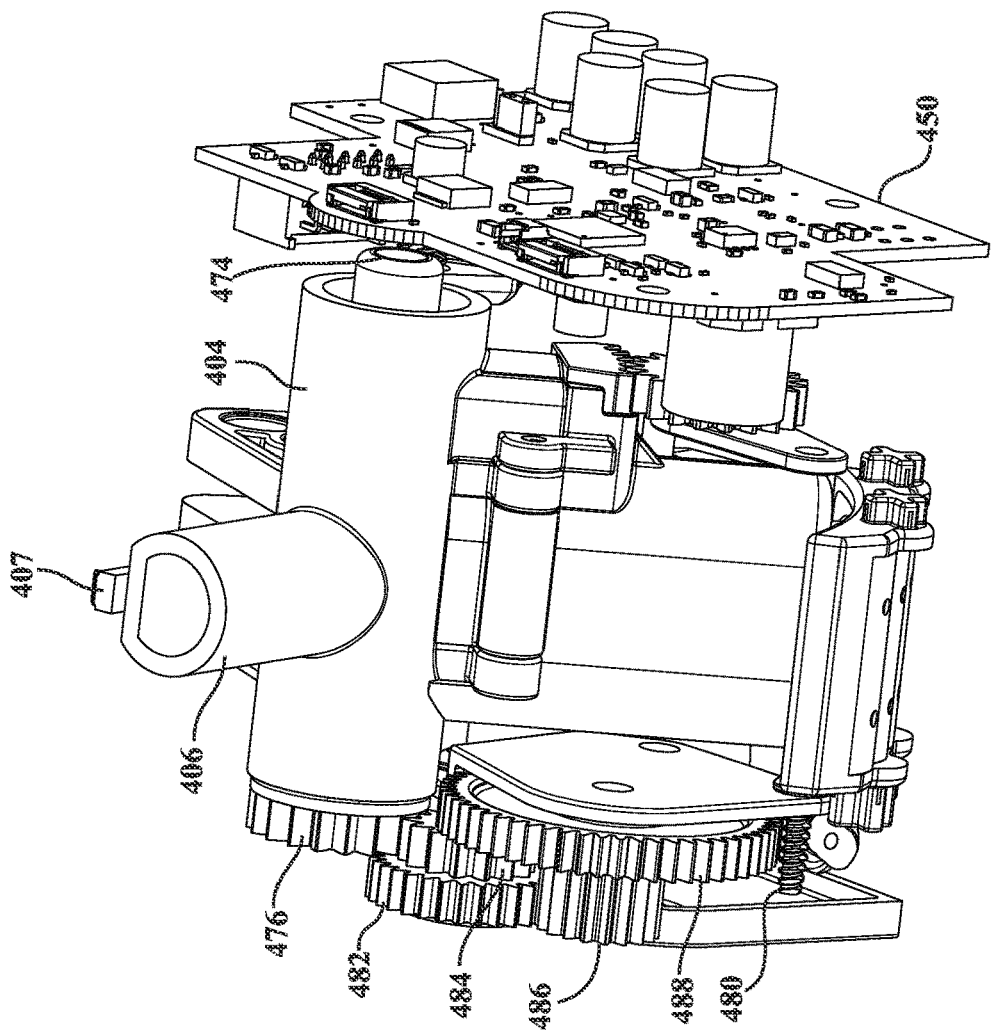
FIG. 106 is a partial rotated view of FIG. 104 and better showing the arrangement of the shift lever assembly with through hole in the center rotation axis for receiving the gear seeking CAM shaft.

FIG. 106 provides a partial rotated view of FIG. 104 and better showing the arrangement of the shift lever assembly with through hole in the center rotation axis (again pivotal defining portion 404) for receiving the gear seeking CAM shaft 472.

Figure 107:
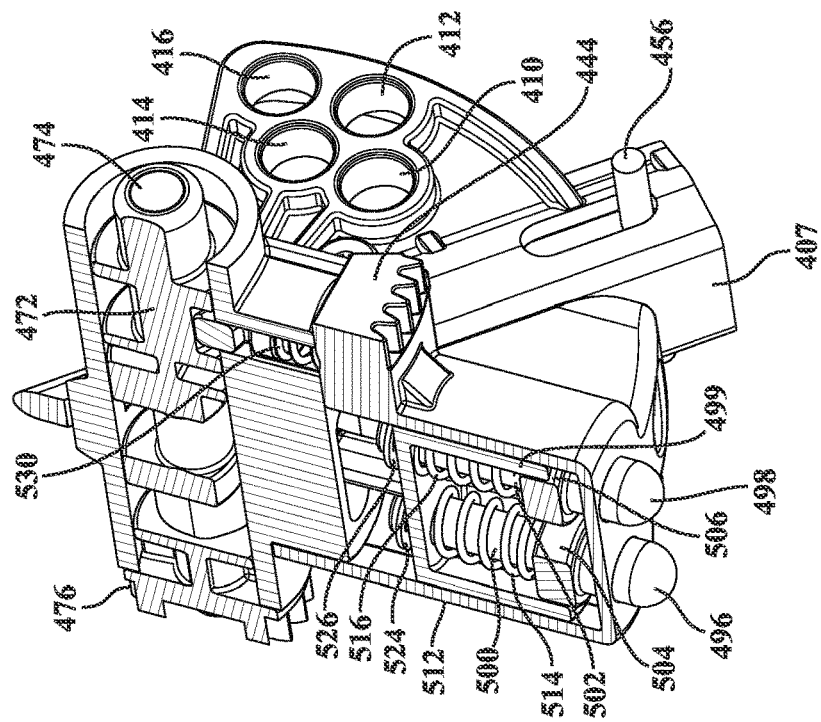
FIG. 107 presents a cutaway view of the gear seeking detent pawls supported within detent cartridges which are spring loaded to provide resistance for shifting the shift lever.
Figure 109:
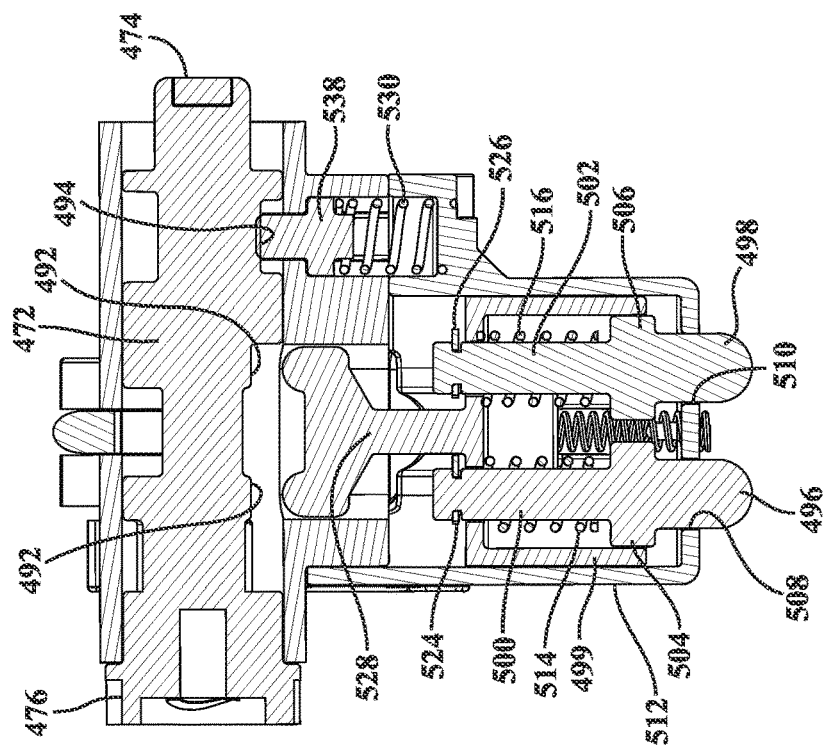
FIG. 109 presents a further plan view of the detent cartridges inserted into the housing with additional compression springs for biasing the cartridge against the CAM shaft.
Figure 108:
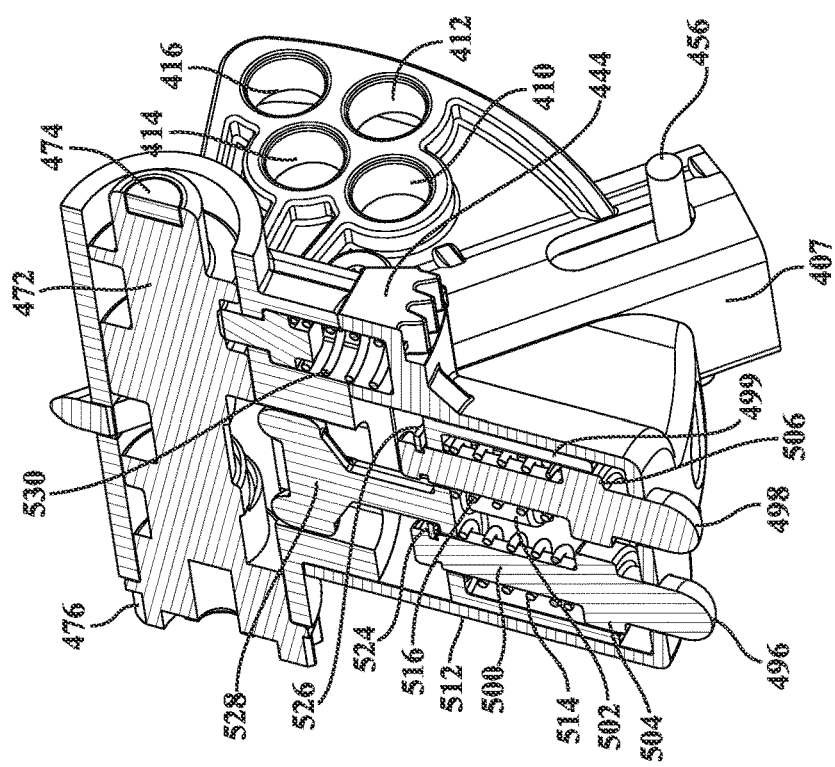
FIG. 108 is a slightly rotated view of FIG. 107 in further cutaway and better illustrating the loaded configuration of the springs and pawl components loaded into the detent housing forming the detent cartridge.

With reference now to FIG. 107, in combination with succeeding FIGS. 108-109, presented is a cutaway view of a pair of gear seeking detent pawls, depicted with projecting tips or noses 496 and 498, supported within one or more detent cartridges, a single detent cartridge being depicted 499, which is spring loaded to provide resistance for shifting the shift lever. The pawls each include a stem 500/502 with an annular shoulder or protuberance 504/506 separate the stems from the pawl noses 496/498 projecting through apertures (at 508/510 in FIG. 109) defined in an outer housing 512 integrated into the shifter for incorporating the detent cartridge 499.

Springs 514 and 516 are provided within the detent cartridge 499 for biasing the projecting noses of the pawls 496/498 toward arcuate shaped detent plates, shown at 518, which are installed within the housing. The detent plate or plates 518 include an arcuate recess (see at 520/522 in FIG. 118 et seq.) which, similar to as previously described, include alternating peaks and valleys for seating the pawls 496/498 in a tactile fashion corresponding to the shift lever being moved through the PRND positions. In this fashion, the spring loaded pawls 496/498 are retained in the detent housing by physical restriction through the use of internal mounted E clips (see at 524/526 in FIG. 107).

FIG. 108 provides a slightly rotated view of FIG. 107 in further cutaway and better illustrating the loaded configuration of the springs and pawl components loaded into the detent housing forming the detent cartridge. This also includes an upwardly "Y" projecting portion 528 integrated into the inner cartridge 499 which interfaces with the second cam profile surfaces 492/494 for interacting the CAM shaft 472. FIG. 109 presents a further plan view of the detent cartridge 499 inserted into the integrated lever housing 512 with an additional compression spring 537 which is part of the separate shift pawl for helping to carry the shift lever from position to position during gear seeking in order to overcome system friction (this is unrelated to biasing of the detent cartridge).

FIG. 112 is a subset illustration of the gear seeking CAM shaft in standard operating position in which the gate pawl 456 is in an engaged position, and with the gate retraction pin 491 in the down position and a separate rocker arm 532 also in the down position. As previously described, the CAM profiles in the gear seeking CAM shaft 472 interact with the rocker arm 532 via an internal channeled support structure 534 seating a displaceable push rod mechanism 534 coupled to a pin connected to the push rod so that, upon the CAM shaft 472 being rotated, the push rod is displaced or pushed outward, rotating the rocker arm 532 which then pulls the pin 491 upwardly/inwardly, thereby moving the pull rod 407 upwardly and also moving the gate pawl 456 inwardly in order to clear the physical gates (see again FIG. 97) configured into the left and right sided shifter housings.

Figure 114:
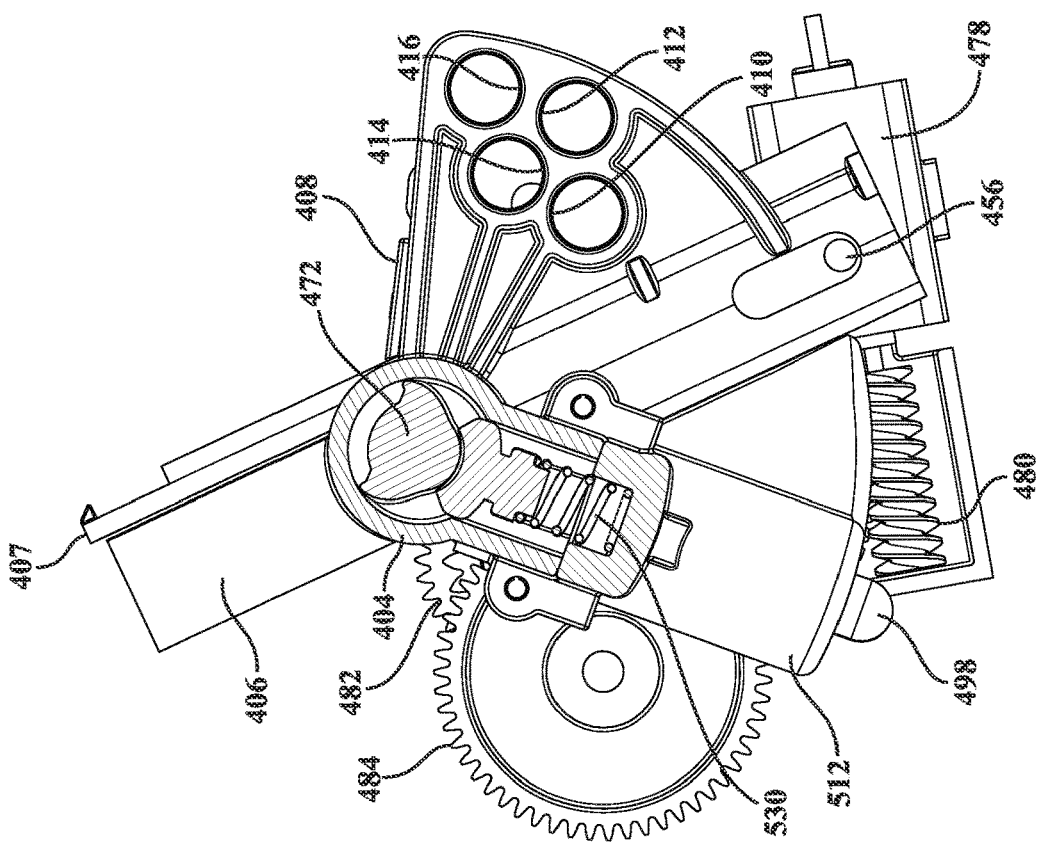
FIG. 114 is a further view similar view to FIG. 113 and illustrating the shift lever pawl in a disengaged/non-interfering position with the CAM shaft.

FIG. 113 is a rotated view of FIG. 112 and showing, in further cutaway, the detent pawls 496/498 engaged with the detent plates 518, concurrent with the detent cartridge 499 establishing an interface condition with the CAM shaft 472. FIG. 114 is a further view similar view to FIG. 113 and illustrating the shift lever pawl 498 in retracted and non-disengaged/non-interfering position with the CAM shaft.

Figure 115:
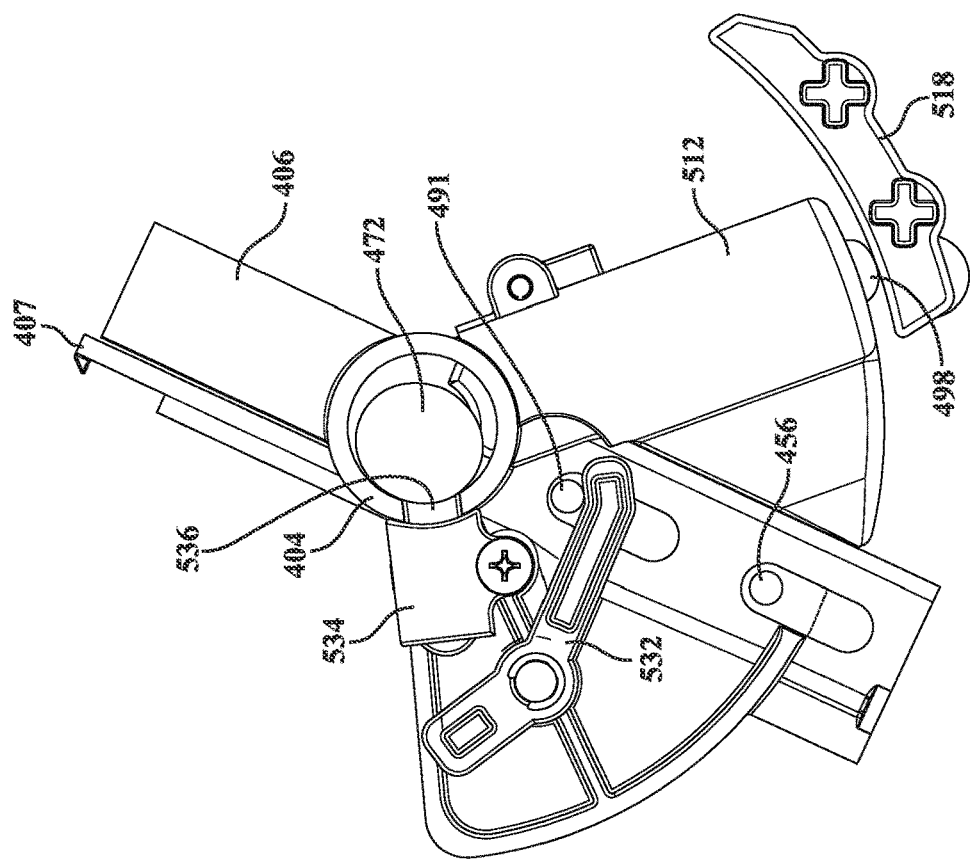
FIG. 115 is an illustration similar to FIG. 112 depicting the gear seeking CAM shaft in position with the detent cartridge and gate pawl retracted.
Figure 117:
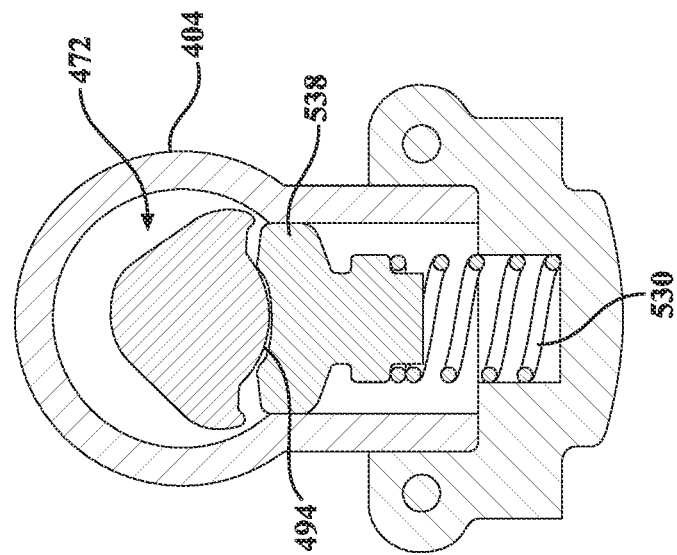
FIG. 117 presents a further cutaway view in which in which the shift lever pawl is engaged/interfering with the CAM shaft, this interface providing a positive connection between the CAM and shift lever, the shift lever rotating with the CAM to move the lever in the seek mode.
Figure 116:
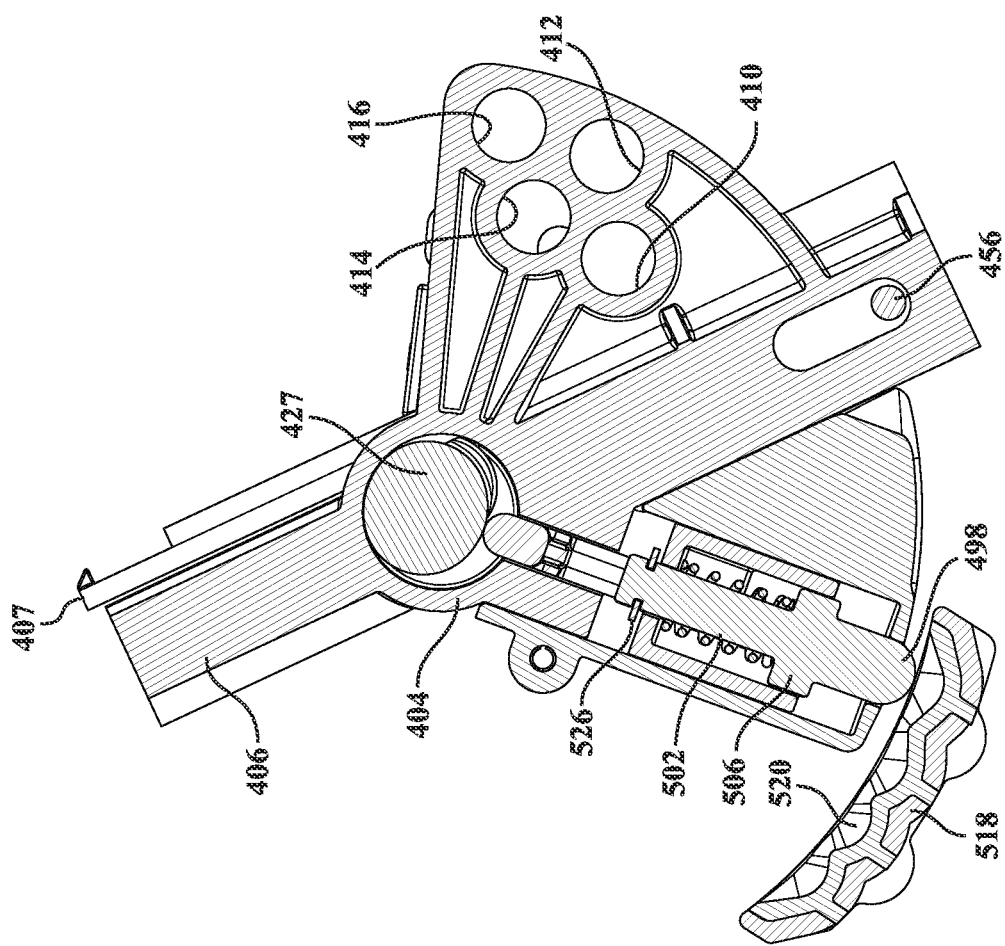
FIG. 116 is a further cutaway illustration of FIG. 115 in which the detent pawl is disengaged from the detent plate and cartridges forced toward the detent plates.

FIG. 115 is an illustration similar to FIG. 112 depicting the gear seeking CAM shaft 472 in position with the detent cartridge 499 and gate pawl 456 retracted, via the actuation of the rocker arm 532 to upwardly displace the pin 491. FIG. 116 is a further cutaway illustration of FIG. 115 in which the detent pawl (shown at 498) is disengaged from the detent plate 518 and the cartridges are forced away from the detent plates. FIG. 117 presents a further cutaway view in which in which the shift lever pawl is in an engaged/interfering condition with the CAM shaft 472, this interface providing a positive connection (see spring biased portion 538 influenced into contact with third CAM shaft profile 494) between the CAM and shift lever, the shift lever rotating with the CAM to move the lever in the seek mode.

Figure 118:
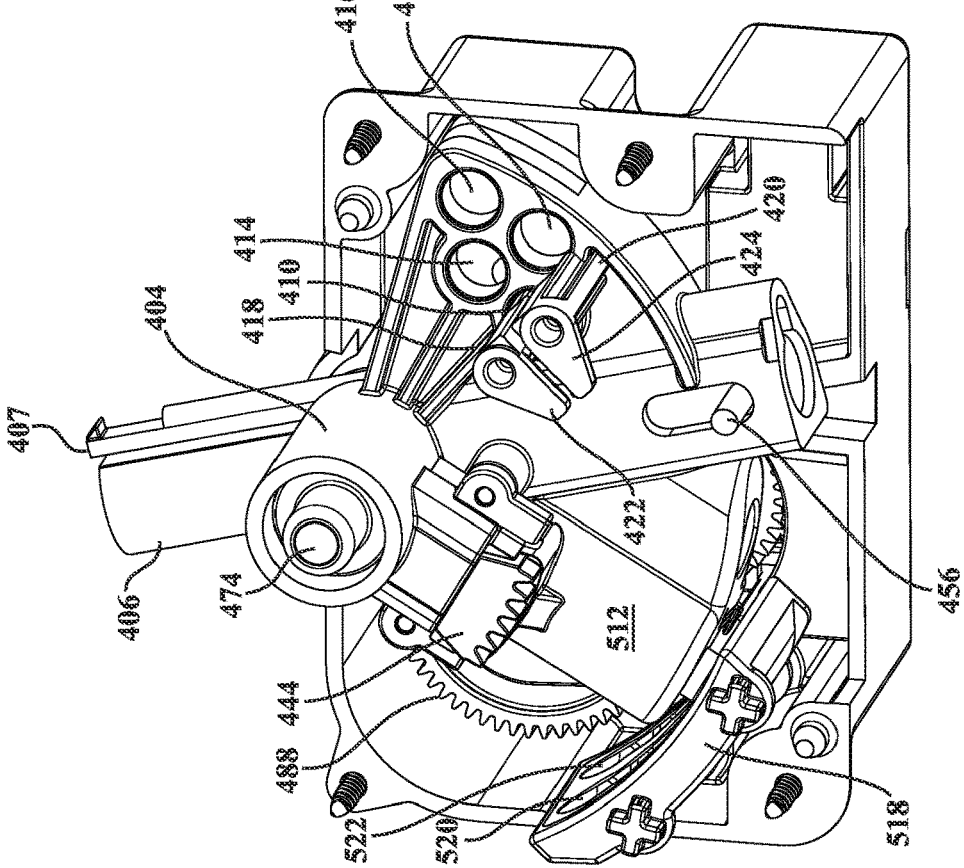
FIG. 118 is an illustration depicting the shifter base of the gear seeking shifter assembly, and showing the detent pawls engaged to the detent plate, the right plunger lock resting on the outer diameter of the shift lever, the left plunger lock engaged to the shift lever Park position bore, and the gate pawl engaged to the shifter in a standard operating position.

FIG. 118 is an illustration depicting the shifter base of the gear seeking shifter assembly, and showing the detent pawls (as previously described and hidden within integrated shifter sub-housing 512) engaged to the detent plate 518, the right plunger lock 420 resting on the outer diameter of the shift lever, and the left plunger lock 418 engaged to the shift lever Park position bore 410, and the gate pawl 456 engaged to the shifter in a standard operating position.

Figure 119:
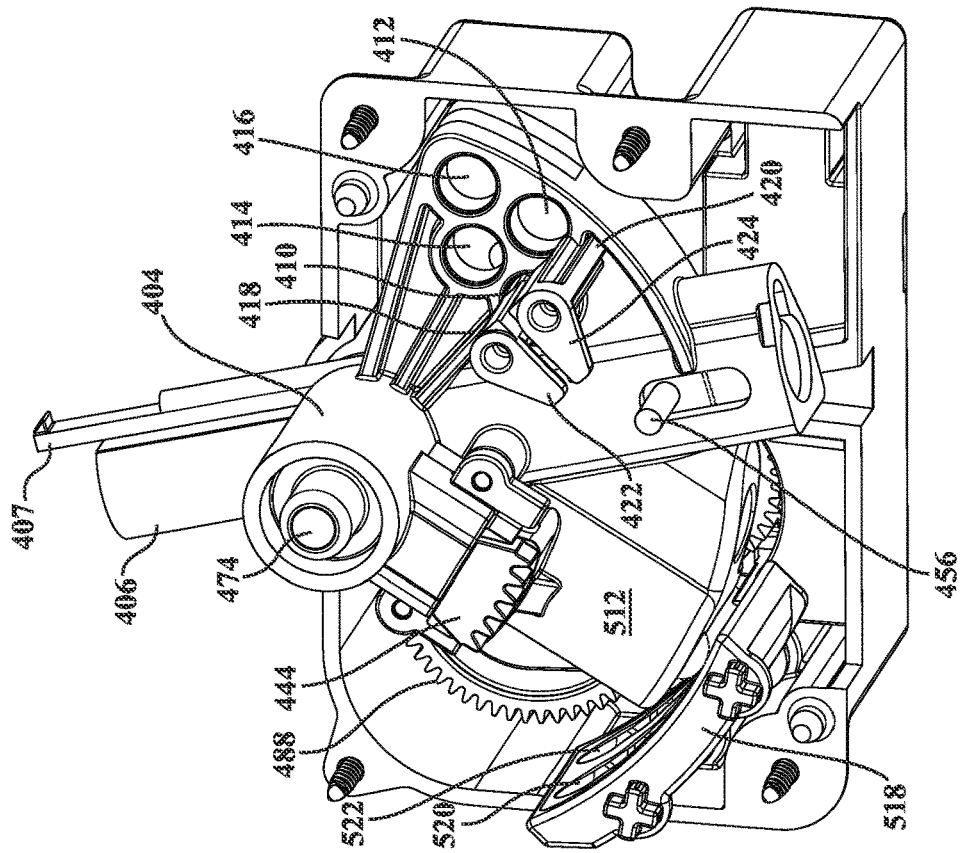
FIG. 119 is an illustration and by which the gear seeking motor is actuated and the cam shaft rotated to retract the gate and detent pawls, and which, upon the PCBA recognizing that the CAM is in the proper position (through signal from magnet/Hall sensor), deactivates the gear seeking motor with the left plunger lock engaged in the Park position and the right plunger lock resting on the outer diameter of the shift lever.

FIG. 119 is an illustration and by which the gear seeking motor 478 is actuated and the cam shaft 472 rotated to retract the gate 456 and detent 496/498 pawls, and which, upon the PCBA 450 recognizing that the CAM 472 is in the proper position (through signal from magnet/Hall sensor), deactivates the gear seeking motor 478 with the left plunger lock 418 engaged in the Park position bore 410 and the right plunger lock 420 resting on the outer face of the shift lever.

Figure 120:
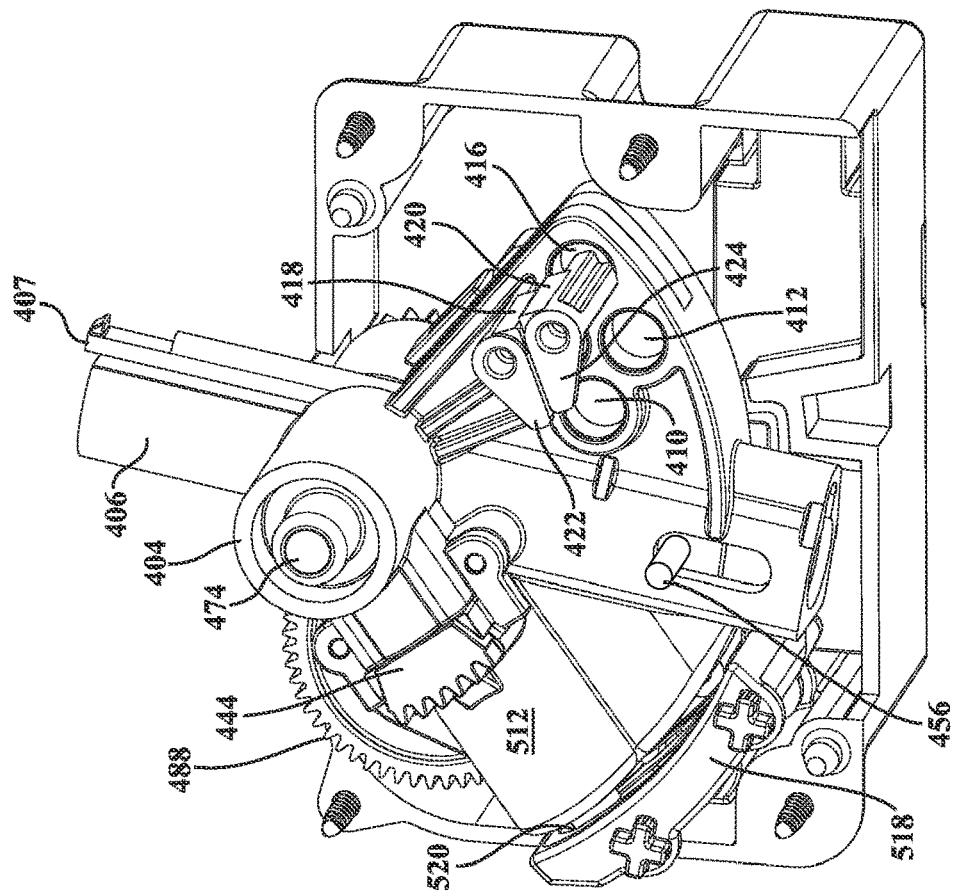
FIG. 120 succeeds shown in FIG. 119 and, upon the PCBA recognizing the cam shaft being in the proper position (i.e. again through the identified positioning of the magnet relative to the PCBA mounted hall sensor), the gate and detent pawls are both retracted (i.e. the detent pawls seat within the cam shaft valleys) and the gear seeking motor is deactivated, following which the lock motor unlocks the shift lever.

FIG. 120 succeeds shown in FIG. 119 and, upon the PCBA 450 recognizing the cam shaft 472 being in the proper position (i.e. again through the identified positioning of the magnet relative 474 to the PCBA mounted hall sensor), the gate 456 and detent 496/498 pawls are both retracted (i.e. the detent pawls seat within the cam shaft valleys depicted by annular profiles 492) and the gear seeking motor 478 is deactivated, following which the lock motor 430 unlocks the shift lever.

Figure 121:
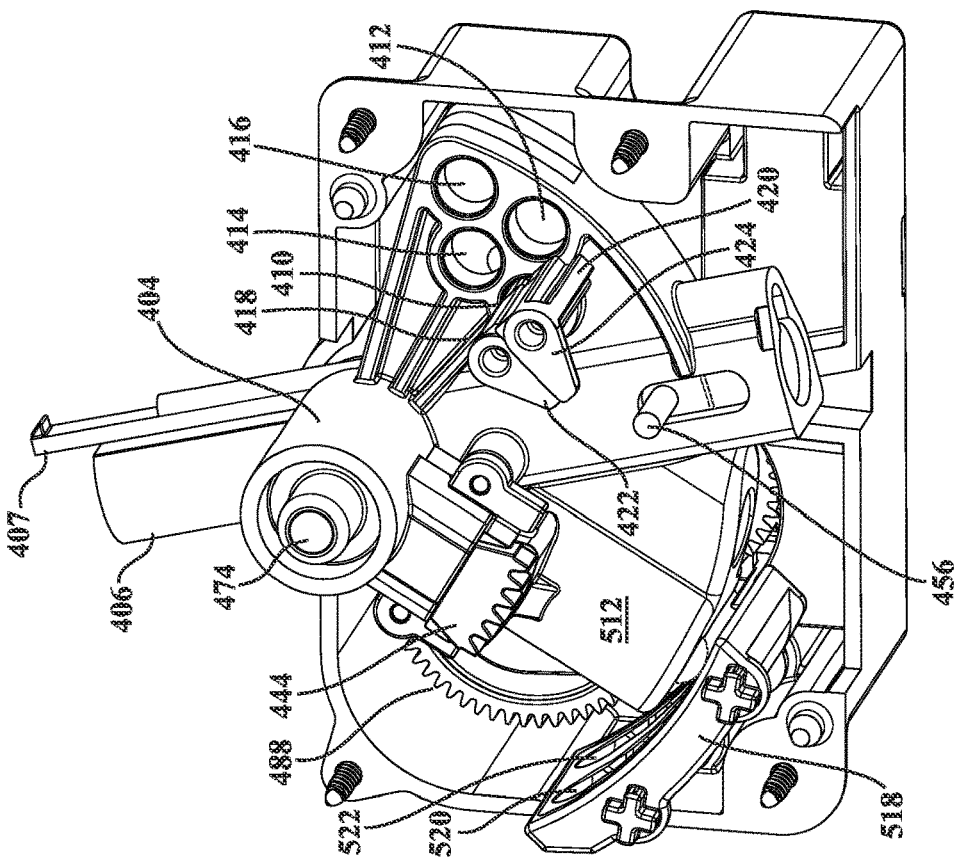
FIG. 121 is an illustration showing the gear seeking motor again being actuated to rotate in either direction (with the right plunger unlocked and left plunger retracted) to move the shift lever from a current position to a further position directed by the vehicle transmission/ECU, at which point both the cam shaft and shift lever rotate to the desired position, such as moving from the Park to the Dive position and which, upon the PCBA recognizing that the shift lever is at the desired position (again through interfacing of the magnet/Hall effect sensor), following which the gear seeking motor is deactivated.

FIG. 121 is an illustration showing the gear seeking motor 478 again being actuated to rotate in either direction (with the right plunger 420 unlocked and left plunger 418 retracted) to move the shift lever from a current position to a further position directed by the vehicle transmission/ECU, at which point both the cam shaft 472 and shift lever 406 rotate to the desired position, such as moving from the Park to the Dive position and which, upon the PCBA 450 recognizing that the shift lever is at the desired position (again through interfacing of the magnet/Hall effect sensor), following which the gear seeking motor 478 is deactivated.

Figure 122:
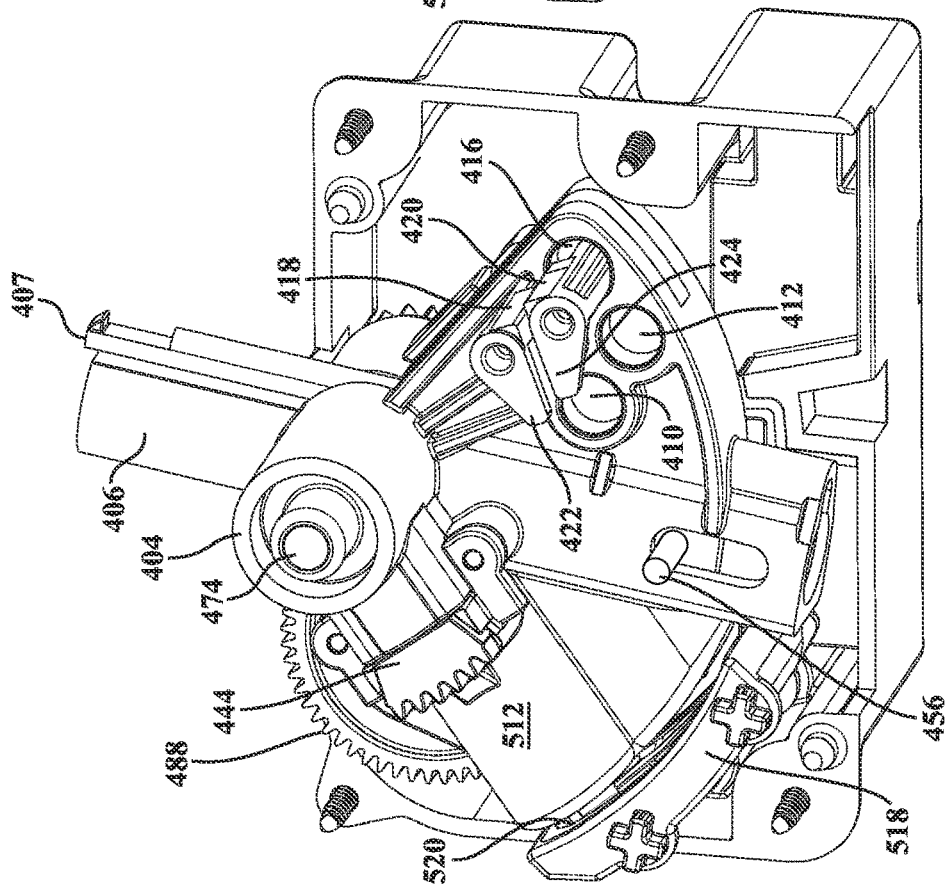
FIG. 122 further depicts the lock system being reengaged (through cam rotated re-engagement of the plungers so that the right plunger is engaged in the Drive position (locked) and the left plunger is resting on the outer diameter of the shift lever, in order to stop shift lever assembly movement at which ever position is sought.

FIG. 122 further depicts the lock system being reengaged (through cam rotated re-engagement of the plungers 418/420 so that the right plunger 420 is engaged in the Drive position 416 (locked) and the left plunger 418 is resting on the outer diameter of the shift lever, in order to stop shift lever assembly movement at which ever position is sought.

Figure 123:
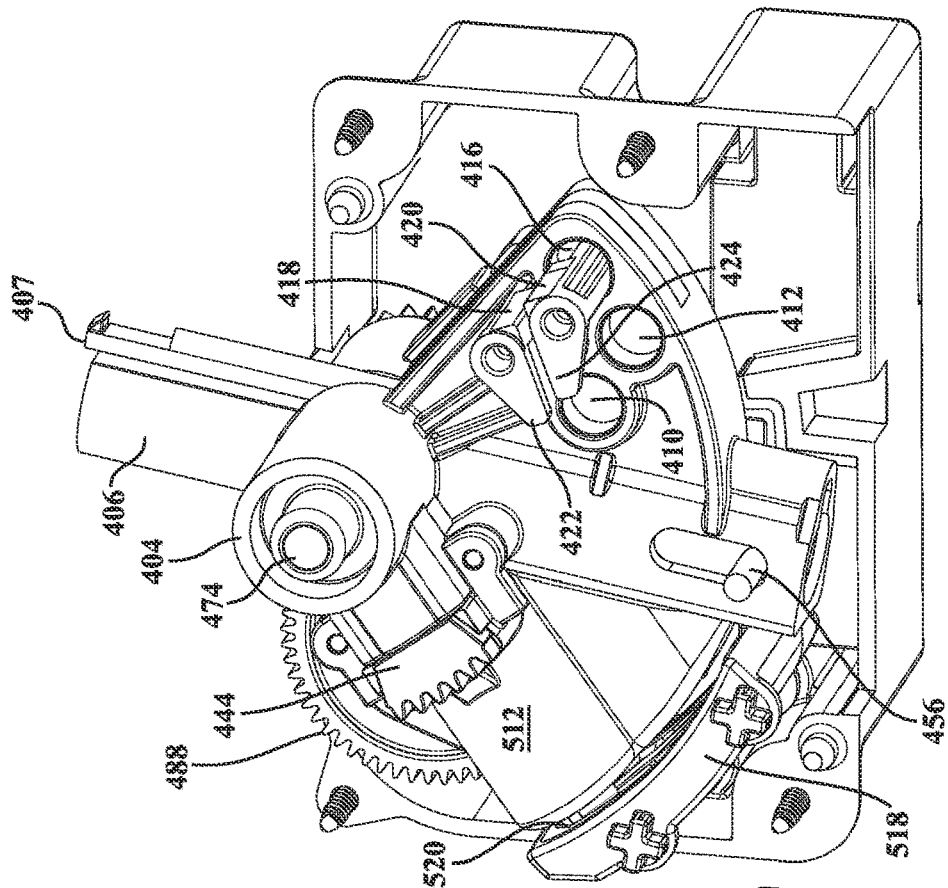
FIG. 123 presents another view of the gear seeking shifter assembly and showing the gear seeking motor actuated to rotate the cam shaft to the reset the position of the detent pawls and gate pawl and which, upon the PCBA recognizing that the CAM is at the reset (standard shift operating) position, the gear seeking motor is deactivated, thereby completing the gear seeking operation.

Finally, FIG. 123 presents another view of the gear seeking shifter assembly and showing the gear seeking motor 478 actuated to rotate the cam shaft 472 to the reset the position of the detent pawls 496/498 and gate pawl 456 and which, upon the PCBA 450 recognizing that the CAM is at the reset (standard shift operating) position, the gear seeking motor 478 is deactivated, thereby completing the gear seeking operation.

In operation according to each of the above-described embodiments, the shift lever is held in position using the lock mechanism previously described and to allow the gear seeking motor to continue to rotate and move the shift lever to the commanded position. Once the position is found, and autonomous commands are no longer necessary, the lock plunger is engaged into whichever gear the lever is positioned, with the CAM shaft rotated to reset the engagement of the gate pawl and detent pawls according to any of the previously described embodiments, thereby ending the gear seeking operation and restoring standard shift functionality.

Having described my invention, other and additional preferred embodiments will become apparent to those skilled in the art to which it pertains, and without deviating from the scope of the appended claims. The detailed description and drawings are further understood to be supportive of the disclosure, the scope of which being defined by the claims. While some of the best modes and other embodiments for carrying out the claimed teachings have been described in detail, various alternative designs and embodiments exist for practicing the disclosure defined in the appended claims.

The foregoing disclosure is further understood as not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, a person of ordinary skill in the art will recognize that changes may be made in form and detail without departing from the scope of the present disclosure. Thus, the present disclosure is limited only by the claims.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the disclosure. It is to be understood that the forms of disclosure herein shown and described are to be taken as representative embodiments. Equivalent elements, materials, processes or steps may be substituted for those representatively illustrated and described herein. Moreover, certain features of the disclosure may be utilized independently of the use of other features, all as would be apparent to one skilled in the art after having the benefit of this description of the disclosure. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

Further, various embodiments disclosed herein are to be taken in the illustrative and explanatory sense, and should in no way be construed as limiting of the present disclosure. All joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

Additionally, all numerical terms, such as, but not limited to, "first", "second", "third", "primary", "secondary", "main" or any other ordinary and/or numerical terms, should also be taken only as identifiers, to assist the reader's understanding of the various elements, embodiments, variations and/or modifications of the present disclosure, and may not create any limitations, particularly as to the order, or preference, of any element, embodiment, variation and/or modification relative to, or over, another element, embodiment, variation and/or modification.

It will also be appreciated that one or more of the elements depicted in the drawings/figures can also be implemented in a more separated or integrated manner, or even removed or rendered as inoperable in certain cases, as is useful in accordance with a particular application. Additionally, any signal hatches in the drawings/figures should be considered only as exemplary, and not limiting, unless otherwise specifically specified.

The invention claimed is:

1. A gear seeking shifter, comprising:
   a housing containing a shift lever having a rotatable base and an extending tube;
   a spring loaded inner push rod seated within said extending tube and including a gate pawl secured to said push rod which is biased into contact with any of PRND shifter position gates configured within said housing proximate an elongated track through which said shift lever extends;
   a shaft supported cam component rotatably supported to said base and driven by a gear seeking motor;
   at least one detent cartridge containing a detent pawl supported within said base of said shift lever in biasing contact with a detent plate profile configured upon an opposing inside surface of said housing; and
   said shaft supported cam component, upon being rotated by said gear seeking motor, displacing said detent pawl away from contact with said detent plate profile to permit said shaft supported cam component to rotate said shift lever between gear positions.

2. The shifter of claim 1, said shaft supported cam component further comprising each of a first profile for retracting said gate pawl from a selected one of said shifter position gates and a second profile for engaging and inwardly displacing said detent pawl from said detent profile.

3. The shifter of claim 1, further comprising a shift position sensor gear with end support magnet rotatably slaved to said shaft supported cam component, a printed circuit board assembly (PCBA) mounted within said housing in proximity to said sensor gear and including a sensor opposing a shaft end supported magnet of said sensor gear for instructing rotation of said gear seeking motor.

4. The shifter of claim 1, said shaft supported cam component further comprising first and second valleys for receiving said detent cartridges and for providing resistance between said shift lever and said detent cartridges and said shaft supported cam component to allow the shift lever to move to a commanded one of the gear positions.

5. The shifter of claim 4, said detent cartridges each further comprising a detent housing containing a detent spring loaded pawl biased in a direction toward said detent plate, said detent housing biased in an opposite direction by extension springs toward said shaft supported cam component.

6. The shifter of claim 1, further comprising a gate pawl retraction pin secured to said inner push rod below said upwardly biased gate pawl, a push rod spring seated within a pocket in said outer tube for upwardly biasing said gate pawl and said push rod.

7. The shifter of claim 1, said gear seeking motor further comprising a worm engaging a gear seeking worm gear for driving said shaft supported cam component.

8. The shifter of claim 1, said housing further comprising inter-assemblable left and right housing portions.

9. The shifter of claim 1, said rotatable base of said shift lever further comprising a plurality of notches or recesses configured within an arcuate surface and corresponding to said PRND positions.

10. The shifter of claim 9, further comprising a lock motor configured to rotate said shaft supported cam component for actuating at least one plunger biasingly supported within said housing and having an extending portion aligning with a selected one of said notches and such that, upon rotation of said cam component by said motor, said plunger being caused to displace to a disengaged position to permit gear seeking rotation of said shift lever.

11. The shifter of claim 10, said lock motor further comprising a worm shaft actuating a worm gear, said shaft supported cam component including an extending end in slaved relationship with said bevel gear so that actuation of the motor causes rotation of said cam component.

12. The shifter of claim 11, said at least one plunger further comprising each of a first plunger in aligning relationship with a first pair of said notches defining Park and Neutral shifter positions and a second plunger in aligning relationship with a second pair of notches defining Reverse and Drive positions associated with said lever shifter rotatable base.

13. The shifter of claim 12, further comprising first and second coil springs for biasing said first and second plungers in an engaged position relative to said shifter.

14. The shifter of claim 12, each of said plungers further comprising either of an angled end tab or an integral boomerang shaped portion influenced by a motor actuated eccentric cam for linearly actuating said plungers relative said shifter position notches.

15. The shifter of claim 12, further comprising a magnet supported upon an end of said shaft supported eccentric cam and, in response to rotation relative to a proximately located sensor integrated into a PCBA board, detecting a position of said cam.

16. The shifter of claim 1, said rotatable base of said shift lever further comprising a wedge shape pivotally secured externally to said housing, said plurality of notches or recesses further defining bores which are formed in said wedge shape.

17. A gear seeking shifter, comprising:
a housing containing a shift lever with a rotatable base and fixed outer tube supporting an upwardly extending and depressible inner push rod;
a shaft supported cam component being driven by a gear seeking motor;
an upwardly biased gate pawl secured to said inner push rod into contact with any of a PRND shifter position gates configured along an opposing underside of said housing;
at least one detent cartridge containing a pawl supported within said rotatable base of said shift lever in biasing contact with a detent plate profile configured upon an opposing inside surface of said housing; and
said shaft supported cam component, upon being rotated by said gear seeking motor, including each of a first profile for retracting said gate pawl and a second profile for engaging and inwardly displacing said detent pawl away from contact with said detent plate profile and to permit said shaft supported cam component to rotate said shift lever to a desired gear position.

18. A gear seeking shifter, comprising:
a housing against which is pivotally secured a shift lever, the shift lever having a rotatable wedge shaped base and an extending outer tube supporting a displaceable push rod;
a shaft supported cam component being driven by a gear seeking motor;
a gate pawl secured to said inner displaceable rod and biased into contact with any of a PRND shifter position gates configured within said housing;
at least one detent cartridge containing a pawl supported within said rotatable base of said shift lever in biasing contact with a detent plate profile configured upon an opposing inside surface of said housing; and
said shaft supported cam component, upon being rotated by said gear seeking motor, including each of a first profile for retracting said gate pawl and a second profile for engaging and inwardly displacing said detent pawl away from contact with said detent plate profile and to permit said shaft supported cam component to rotate said shift lever to a desired gear position.

19. The shifter of claim 18, further comprising a plurality of recessed bores formed into said wedge shape base and facing said housing.

20. The shifter of claim 19, further comprising a lock motor configured to rotate said shaft supported cam component for actuating first and second plungers biasingly supported within said housing and having an extending portion aligning with a selected one of said recessed bores and such that, upon rotation of said cam by said motor, said plunger being caused to displace to a disengaged position to permit gear seeking rotation of said shift lever.

21. The shifter of claim 20, further comprising first and second coil springs for biasing said first and second plungers in an engaged position relative to said shifter.

22. The shifter of claim 20, further comprising a magnet supported upon an end of said shaft supported cam component and, in response to rotation relative to a proximately located sensor integrated into a PCBA board, detecting a position of said shaft supported cam component.

* * * * *